(12) United States Patent
Thomason

(10) Patent No.: US 11,922,074 B1
(45) Date of Patent: Mar. 5, 2024

(54) SYSTEMS AND METHODS FOR A CONTENT-ADDRESSABLE PEER-TO-PEER STORAGE NETWORK

(71) Applicant: EDJX, Inc., Raleigh, NC (US)

(72) Inventor: James A. Thomason, Las Vegas, NV (US)

(73) Assignee: EDJX, INC., Raleigh, NC (US)

( * ) Notice: Subject to any disclaimer, the term of this patent is extended or adjusted under 35 U.S.C. 154(b) by 35 days.

(21) Appl. No.: 17/496,437

(22) Filed: Oct. 7, 2021

Related U.S. Application Data

(60) Provisional application No. 63/090,265, filed on Oct. 11, 2020.

(51) Int. Cl.
| | |
|---|---|
| *G06F 3/06* | (2006.01) |
| *G06F 12/0802* | (2016.01) |
| *H04L 9/32* | (2006.01) |
| *H04L 67/1021* | (2022.01) |
| *H04L 67/104* | (2022.01) |
| *H04L 67/568* | (2022.01) |

(52) U.S. Cl.
CPC ............ *G06F 3/067* (2013.01); *G06F 3/0604* (2013.01); *G06F 3/0655* (2013.01); *G06F 12/0802* (2013.01); *H04L 9/3236* (2013.01); *H04L 67/1021* (2013.01); *H04L 67/104* (2013.01); *H04L 67/568* (2022.05); *G06F 2212/263* (2013.01)

(58) Field of Classification Search
CPC .......................... H04L 67/1021; H04L 67/568
See application file for complete search history.

(56) References Cited

U.S. PATENT DOCUMENTS

| | | | |
|---|---|---|---|
| 9,104,326 B2 | 8/2015 | Frank et al. | |
| 9,444,858 B1 | 9/2016 | Boyle et al. | |
| 9,713,000 B2 | 7/2017 | Oertle et al. | |
| 9,880,756 B2 | 1/2018 | Mutalik et al. | |
| 9,904,603 B2 | 2/2018 | Mutalik et al. | |
| 10,445,698 B2 | 10/2019 | Hunn | |
| 10,559,202 B2 | 2/2020 | Yang et al. | |
| 10,575,244 B1 | 2/2020 | Gustafson et al. | |
| 2004/0064693 A1 | 4/2004 | Pabla et al. | |
| 2005/0210149 A1* | 9/2005 | Kimball | H04L 61/00 709/245 |
| 2005/0273593 A1 | 12/2005 | Seminaro et al. | |
| 2008/0060054 A1* | 3/2008 | Srivastava | H04L 63/14 726/2 |

(Continued)

FOREIGN PATENT DOCUMENTS

| | | | |
|---|---|---|---|
| CN | 111226429 A | 6/2020 | |
| KR | 101823293 B1 | 1/2018 | |
| KR | 101925268 B1 | 2/2019 | |

*Primary Examiner* — Bryan Y Lee

(74) *Attorney, Agent, or Firm* — NEO IP

(57) ABSTRACT

The present invention provides systems and methods for a content-addressable peer-to-peer storage network. The content-addressable peer-to-peer storage network includes a plurality of nodes. A node generates a new data block, which is witnessed by peer nodes to increase the integrity of the data. Each peer node responds to the node's signature request with an encoded digital signature of the data using a private key. The node appends the signature from each witness node to the data block and then generates a cryptographic hash of the entire data block, which is used as the identity of the block.

12 Claims, 48 Drawing Sheets

(56) References Cited

U.S. PATENT DOCUMENTS

| | | |
|---|---|---|
| 2010/0223364 A1 | 9/2010 | Wei |
| 2012/0076134 A1 | 3/2012 | Brownrigg |
| 2012/0221652 A1 | 8/2012 | Sainio et al. |
| 2013/0111024 A1 | 5/2013 | Setia et al. |
| 2013/0297669 A1 | 11/2013 | Wang |
| 2013/0332559 A1* | 12/2013 | Mas .................... H04L 67/52 709/216 |
| 2014/0164563 A1* | 6/2014 | Leekley ............ H04L 67/1063 709/217 |
| 2015/0074296 A1 | 3/2015 | Eidelman et al. |
| 2017/0366591 A1 | 12/2017 | Thomas |
| 2018/0130098 A1 | 5/2018 | Swanson et al. |
| 2018/0302440 A1 | 10/2018 | Hu et al. |
| 2018/0331832 A1 | 11/2018 | Pulsifer |
| 2019/0036764 A1 | 1/2019 | Canessa et al. |
| 2019/0188581 A1 | 6/2019 | Chabin et al. |
| 2019/0327180 A1 | 10/2019 | Todd et al. |
| 2019/0386995 A1 | 12/2019 | Chafe et al. |
| 2020/0008007 A1 | 1/2020 | Belghoul et al. |
| 2020/0019626 A1 | 1/2020 | Todd et al. |
| 2020/0125604 A1 | 4/2020 | Canessa et al. |
| 2020/0153786 A1 | 5/2020 | Ward et al. |
| 2020/0259836 A1 | 8/2020 | Kumar |
| 2020/0296155 A1 | 9/2020 | McGrath et al. |
| 2021/0233045 A1 | 7/2021 | Singh et al. |
| 2021/0400485 A1 | 12/2021 | Ergen et al. |
| 2022/0201056 A1 | 6/2022 | Zajac et al. |
| 2022/0224759 A1 | 7/2022 | Khosrowpour et al. |

\* cited by examiner

```
Block
QmVUdHfpo9hyC8wXmgd2frRrsp83iRvuL8HWyp1LPzjsPq => []

Where [] =
{
    "Links": [
            {
            "Name": "index.html",
            "Hash": "QmYftndCvcEiuSZRX7njywX2AGSeHY2ASa7VryCq1mKwEw",
            "Size": 1700
        },
        {
            "Name": "static",
            "Hash": "QmdtWFiasJeh2ymW3TD2cLHYxn1ryTuWoNpwieFyJriGTS",
            "Size": 2428803
        }
    ],
    "Data": "CAE=",
    "Signatures": [
        {
            "Node": "QmfNy1th16zscbpxe8Q2EQdQkNFn7Y3Rp9kGZWL1EQDyw6"
            "Signature": "PYM5Ls9NKcGdHKwjlKlBt2Va4aYrhiSw3+5+zUh1AQPSqzJB
nW5GQCuGY7uBbkP/xLtihbtKhZNh2ncxVKJ0GQ=="
        }
    ]
}

Node
QmfNy1th16zscbpxe8Q2EQdQkNFn7Y3Rp9kGZWL1EQDyw6 => []

Where [] =
{
    "ID": "QmfNy1th16zscbpxe8Q2EQdQkNFn7Y3Rp9kGZWL1EQDyw6",
    "PublicKey": "Xg8Y1132wpr6HN9nLiPlT3fmcn3rG/+VKkjGEsDj+BQ=,
    "Addresses": [

"/ip4/127.0.0.1/tcp/4001/QmfNy1th16zscbpxe8Q2EQdQkNFn7Y3Rp9kGZWL1EQDyw6",
"/ip4/172.19.0.2/tcp/4001/QmfNy1th16zscbpxe8Q2EQdQkNFn7Y3Rp9kGZWL1EQDyw6"
    ],
    "AgentVersion": "edjx/0.0.1/ac3ef2",
    "ProtocolVersion": "edjx/0.0.1"
}
```

FIG. 36

SYSTEMS AND METHODS FOR A CONTENT-ADDRESSABLE PEER-TO-PEER STORAGE NETWORK

CROSS REFERENCES TO RELATED APPLICATIONS

This application is related to and claims priority from U.S. Provisional Patent Application No. 63/090,265, filed Oct. 11, 2020, which is incorporated herein by reference in its entirety.

BACKGROUND OF THE INVENTION

1. Field of the Invention

The present invention relates to content-addressable storage, and more specifically to a content-addressable peer-to-peer storage network.

2. Description of the Prior Art

It is generally known in the prior art that a storage device may be location-addressed or content-addressed. In a location-based storage system, a unit of data may be stored on a physical medium, and the location recorded for later use using a Unique Resource Identifier (URI). For example, the Uniform Resource Identifier may identify the physical storage device by its DNS name or IP address, as well as the path to the physical location of the unit of data on the storage device. In contrast, in a content-addressed storage (CAS) system, a unit of data is assigned a globally unique identifier which is derived from the content of the unit of data itself, and the unit of data is accessed using this unique identifier. In a decentralized content-addressed storage system, location information is exchanged dynamically between storage devices on a network, permitting autonomous ad-hoc access to the unit of data. For example, the unit of data may be provided as the input to a hashing function, the resulting hash of which is used as the content-address of the unit of data.

Prior art patent documents include the following:

U.S. Patent Publication No. 20200019626 for Decentralized data management via geographic location-based consensus protocol by inventors Todd, et al., filed Jul. 12, 2018 and published Jan. 16, 2020, is directed to decentralized data management using a geographic location-based consensus protocol in a network of computing resources such as, by way of example, a highly distributed system. For example, at a given consensus node of a consensus network comprising a plurality of consensus nodes configured to participate in a consensus protocol wherein at least a portion of the consensus nodes are mobile, a list is obtained of at least a subset of the plurality of consensus nodes that are predicted to be currently available to participate in the consensus protocol based on geographic location information. A message comprising a transaction to be validated is sent from the given consensus node to the subset of the plurality of consensus nodes in the obtained list. Techniques are also disclosed for adjusting a data protection policy based on the number of computing nodes, some of which are mobile, available to participate.

U.S. Patent Publication No. 20190327180 for Decentralized data management across highly distributed systems by inventors Todd, et al., filed Apr. 23, 2018 and published Oct. 24, 2019, is directed to a system environment including a plurality of computing resources, wherein at least a portion of the computing resources are mobile, a method maintains a decentralized messaging network of interconnected messaging nodes and a decentralized data network of interconnected data nodes. Each of the plurality of computing resources is associated with a given messaging node and a given data node. The method manages transfer of a data set between the plurality of computing resources in association with the decentralized messaging network and the decentralized data network. Managing transfer of the data set comprises inserting a policy file into the decentralized data network specifying one or more policies for managing the transfer of the data set and inserting a message into the decentralized messaging network instructing implementation of the one or more policies.

U.S. Pat. No. 10,445,698 for System and method for forming, storing, managing, and executing contracts by inventor Hunn, filed Jun. 30, 2017 and issued Oct. 15, 2019, is directed to a system and method for computable contracts that includes a contract management system accessible by involved parties, managing a formation stage of a contract document by obtaining object components, assembling a contract object graph from the object components, and committing the contract object graph to post formation execution; and in an execution environment during a post-formation stage, executing the contract object graph where instances of execution include receiving a contract state update, and appending at least one update object component to the contract object graph in accordance with the contract state update. Variations of the system and method may apply peer-to-peer negotiation and execution, use a cryptographic directed acyclic contract object graph, and/or interface with distributed ledgers.

U.S. Patent Publication No. 20200153786 for Mapping database system for use with content chunks and methods of routing to content in an IP network by inventors Ward, et al., filed Apr. 17, 2017 and published May 14, 2020, is directed to method of retrieving content in an Internet Protocol version 6 (IPv6) network, including receiving from a network node a lookup request associated with content at a server comprising a mapping database. A response is generated including an IPv6 address, the IPv6 address comprising a content identifier and an indication of a location of the content. The response is transmitted to the network node. A method including receiving at a mapping database a lookup request associated with content and returning a text record comprising an ordered list of addresses for use in segment routing to the content is also described.

U.S. Patent Publication No. 20180331832 for Cryptographic Transactions System by inventor Pulsifer, filed Nov. 4, 2016 and published Nov. 15, 2018, is directed to a system for processing transactions with a cryptographic currency. The system uses a blockchain protocol as a public record of transactions to ensure only valid tokens can be used as transaction inputs, and that they can be used only once. Witnesses assemble transactions into a blockchain. Once enough witnesses confirm a block, it becomes a permanent and indelible part of the blockchain.

U.S. Pat. No. 10,559,202 for Ubiquitous visual computing witness by inventors Yang, et al., filed Jun. 8, 2018 and issued Feb. 11, 2020, is directed to a an apparatus comprises a memory and a processor. The memory is to store sensor data captured by one or more sensors associated with a first device. Further, the processor comprises circuitry to: access the sensor data captured by the one or more sensors associated with the first device; determine that an incident occurred within a vicinity of the first device; identify a first collection of sensor data associated with the incident, wherein the first collection of sensor data is identified from the sensor data captured by the one or more sensors; preserve, on the memory, the first collection of sensor data associated with the incident; and notify one or more second devices of the incident, wherein the one or more second devices are located within the vicinity of the first device.

U.S. Pat. No. 9,104,326 for Scalable block data storage using content addressing by inventors Frank, et al., filed Nov. 15, 2010 and issued Aug. 11, 2015, is directed to a device for scalable block data storage and retrieval that uses content addressing. Data storage devices store data blocks, and are connected over a network to computing modules. The modules comprise control modules and data modules and carry out content addressing for both storage and retrieval. The network defines separate control paths via the control modules and data paths via the data modules.

U.S. Patent Publication No. 20190386995 for Apparatus, system and method to limit access to open networks by requiring the consensus of pre-existing nodes to admit candidate nodes by inventors Chafe, et al., filed Jun. 12, 2019 and published Dec. 19, 2019, is directed to systems and methods govern participation in and enforce a limit on the number of nodes that can participate in a cryptocurrency or other distributed computing network. Unlike other approaches, systems and methods herein do not require excessive use of resources. Admission of a node to a network is governed by the consensus of pre-existing nodes using a process or physical characteristic of the candidate node to determine its eligibility. One instantiation uses physical location as the unique physical characteristic, with a distance constraint to force geographic separation between nodes. Another uses signal response time over the network as a proxy for distance, relying on the fact that network nodes cannot respond to an interrogation before it is received. Combined with an appropriate time constraint, this enables network space to be used as an analog for geographic space, despite the fact that network transmission speeds and paths are variable.

U.S. Patent Publication No. 20190036764 for Event notification in interconnected content-addressable storage systems by inventors Canessa, et al., filed Jan. 24, 2018 and published Jan. 31, 2019, is directed to a seamless cloud of storage. This storage may be content-addressable storage. An end application may or may not be exposed to the fact that content-addressable storage is used. The publication discloses providing event notification, which may allow applications or users to subscribe to particular events (such as storage of an X-ray by a particular entity). The publication also discloses providing for a shared archive. A shared archive may provide homogeneous access to medical data, etc. that was previously stored into the CAS cloud by heterogeneous applications, varied data types, etc. Additionally, embodiments herein allow for the creation and distribution of virtual packages. For example, a user may create a virtual package for all images related to a patient so that she may have a virtual package of all of her medical data to present to a referring physician.

U.S. Patent Publication No. 20200125604 for System and methods for metadata management in content addressable storage by inventors Canessa, et al., filed Oct. 24, 2019 and published Apr. 23, 2019, is directed to a content addressable storage (CAS) system that allows a user to request, either through an application server or directly to one or more CAS servers, files and content related to a query. The publication discloses that content can be discovered by searching previously-stored metadata related to each file at the content addressable storage server. The search can also be replicated across multiple content addressable storage servers in order to obtain varied results and redundant results. Duplicate results may be flagged or omitted, and the results are returned to the requester.

U.S. Pat. No. 9,880,756 for Successive data fingerprinting for copy accuracy assurance by inventors Mutalik, et al., filed Mar. 10, 2015 and issued Jan. 30, 2018, is directed to systems and methods for checking the data integrity of a data object copied between storage pools in a storage system by comparing data fingerprints of data objects, by scheduling a series of successive copy operations over time for copying a data object from a source data store to a target data store; generating a partial fingerprint of the data object at the source data store using a data fingerprinting operation that creates a fingerprint from a subset of data of the data object; sending the partial fingerprint of the data object to the target data store; sending any new data contents for the data object to the target data store; and creating a partial fingerprint of the data object at the target data store and comparing it to the partial fingerprint sent to the target data store to determine if they differ.

U.S. Pat. No. 9,904,603 for Successive data fingerprinting for copy accuracy assurance by inventors Mutalik, et al., filed Nov. 18, 2014 and issued Feb. 27, 2018, is directed to systems and methods for checking data integrity of a data object copied between storage pools in a storage system by comparing data samples copied from data objects. A series of successive copy operations are scheduled over time for copying a data object from a source data store to a target data store. A first data sample is generated based on a sampling scheme comprising an offset and a period. A second data sample is generated using a similar sampling scheme. The blocks of data in the first data sample and the second data sample are compared to determine if they differ to thereby indicate that the data object at the target store differs from the corresponding data object at the source data store.

SUMMARY OF THE INVENTION

The present invention relates to content-addressable storage systems, and more specifically to a content-addressable peer-to-peer storage network.

It is an object of this invention to provide a content-addressed peer-to-peer network with data integrity.

In one embodiment, the present invention provides a method of retrieving data in a content-addressable peer-to-peer storage network including providing at least one cloud platform in network communication with a plurality of server nodes, wherein information associated with each of the plurality of server nodes is stored in a node database on the at least one cloud platform, entering a request for a Unique Resource Identifier (URI) into a user device, the user device making a Domain Name System (DNS) query to the URI, wherein the URI points to at least one DNS server on one of the plurality of server nodes, the at least one DNS server geolocating the user device to determine a nearest node of the plurality of server nodes, transmitting a location of the nearest node to the user device, the user device connecting to the nearest node, the nearest node determining if the request is already in a cache on the nearest node or if the request is operable to be resolved using at least one peer node of the plurality of server nodes, and the nearest node returning content to the user device.

In another embodiment, the present invention provides a method of retrieving data in a content-addressable peer-to-peer storage network including providing at least one cloud platform in network communication with a plurality of server nodes, wherein information associated with each of the plurality of server nodes is stored in a node database on the at least one cloud platform, entering a request for a Unique Resource Identifier (URI) into a user device, the user device making a Domain Name System (DNS) query to the URI, wherein the URI points to at least one DNS server on one of the plurality of server nodes, the at least one DNS server traversing a DNS root feed to find a domain for the URI and searching a domain feed for the domain and finding a policy for the URI, the at least one DNS server geolocating the user device to determine a nearest node of the plurality of server nodes, transmitting a location of the nearest node to the user device, the user device connecting to the nearest node, the nearest node determining that the request relates to executing a function, determining if the nearest node has a root block for the function locally or if the nearest node needs to fetch the root block and children of the root block before the nearest node is operable to execute the function, and the nearest node loading the function into a secure execution environment.

In yet another embodiment, the present invention provides a system for retrieving data in a content-addressable peer-to-peer storage network including at least one cloud platform in network communication with a plurality of server nodes, wherein information associated with each of the plurality of server nodes is stored in a node database on the at least one cloud platform, and a user device in network communication with the at least one cloud platform, wherein the user device is operable to receive a request for a Unique Resource Identifier (URI), wherein the user device is operable to make a Domain Name System (DNS) query to the URI, wherein the URI points to at least one DNS server on one of the plurality of server nodes, wherein the at least one DNS server is operable to geolocate the user device to determine a nearest node of the plurality of server nodes, wherein the at least one DNS server is operable to transmit a location of the nearest node to the user device, wherein the user device is operable to connect to the nearest node, wherein the nearest node is operable to determine if the request is already in a cache on the nearest node or if the request is operable to be resolved using at least one peer node of the plurality of server nodes, and wherein the nearest node is operable to return content related to the request to the user device.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 36 illustrates an example block that consists of a data structure together with its cryptographic hash.

DETAILED DESCRIPTION

Figure 1:
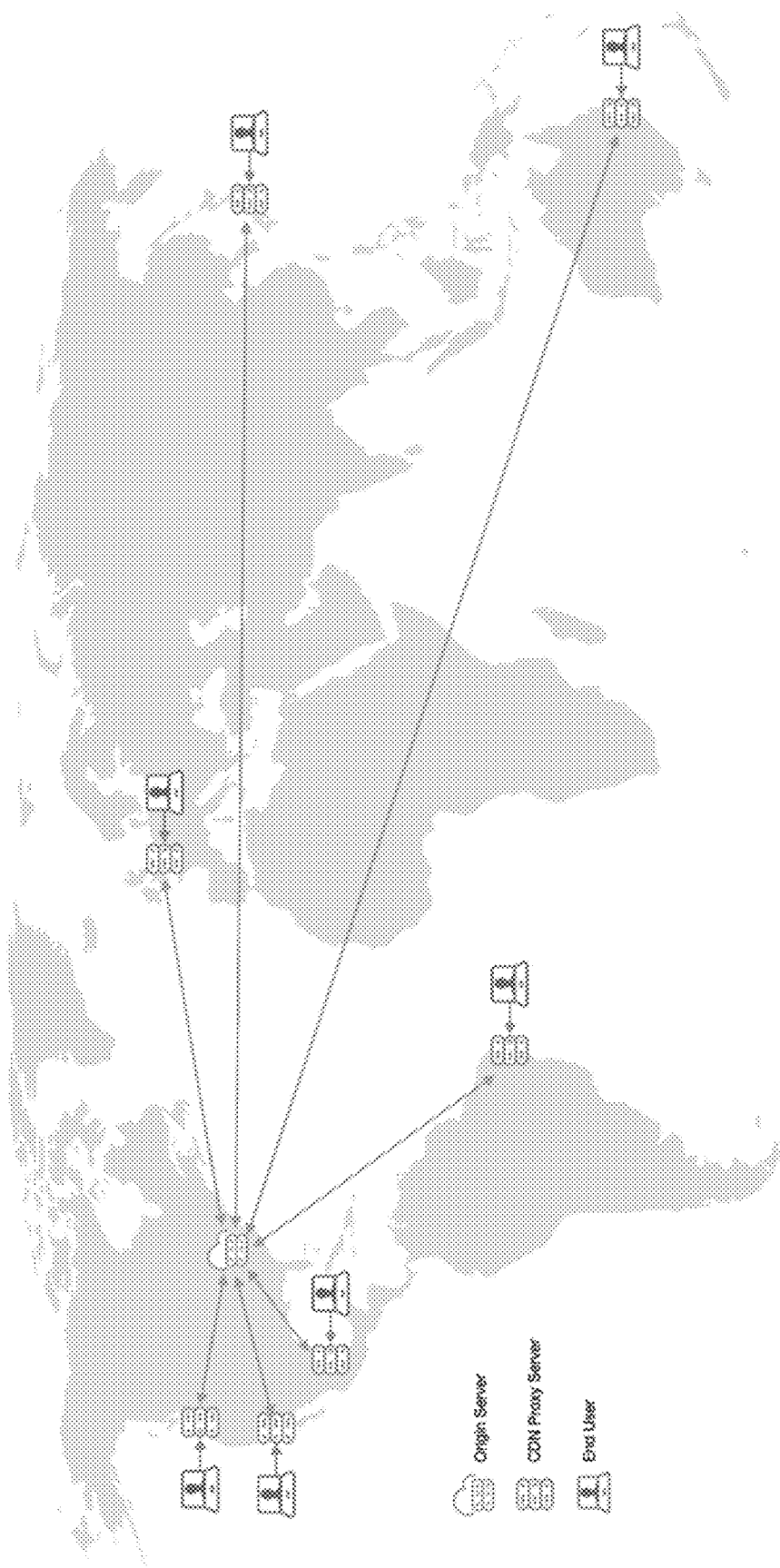
FIG. 1 is an example of a global content delivery network (CDN).

The present invention relates to content-addressable storage systems, and more specifically to a content-addressable peer-to-peer storage network.

In one embodiment, the present invention provides a method of retrieving data in a content-addressable peer-to-peer storage network including providing at least one cloud platform in network communication with a plurality of server nodes, wherein information associated with each of the plurality of server nodes is stored in a node database on the at least one cloud platform, entering a request for a Unique Resource Identifier (URI) into a user device, the user device making a Domain Name System (DNS) query to the URI, wherein the URI points to at least one DNS server on one of the plurality of server nodes, the at least one DNS server geolocating the user device to determine a nearest node of the plurality of server nodes, transmitting a location of the nearest node to the user device, the user device connecting to the nearest node, the nearest node determining if the request is already in a cache on the nearest node or if the request is operable to be resolved using at least one peer node of the plurality of server nodes, and the nearest node returning content to the user device. In one embodiment, the request is not already in a cache and is not operable to be resolved using at least one peer node, further including fetching the content from an origin server and caching the content in the nearest node before returning the content to the user device. In one embodiment, the method further includes the at least one DNS server traversing a DNS root feed to find a domain for the URI. In one embodiment, the domain is found in the DNS root feed, further including searching a domain feed for the domain and finding a policy for the URI. In one embodiment, the content is returned in near real time. In one embodiment, one or more of the plurality of server nodes includes a user feed, an applications feed, an objects feed, a blocks feed, a policy feed, a proxy feed, a bucket feed, a DNS feed, a certificate feed, a files mapping feed, a bucket feed, and/or a domain configuration feed. In one embodiment, the user device makes a Hypertext Transfer Protocol (HTTP) connection to the nearest node. In one embodiment, the request is to execute a function, further including determining if the nearest node has a root block for the function locally or if the nearest node needs to fetch the root block and children of the root block before the nearest node is operable to execute the function. In one embodiment, the method further includes the nearest node loading the function into a secure execution environment. In one embodiment, each of the plurality of server nodes has an intermediate certificate.

In another embodiment, the present invention provides a method of retrieving data in a content-addressable peer-to-peer storage network including providing at least one cloud platform in network communication with a plurality of server nodes, wherein information associated with each of the plurality of server nodes is stored in a node database on the at least one cloud platform, entering a request for a Unique Resource Identifier (URI) into a user device, the user device making a Domain Name System (DNS) query to the URI, wherein the URI points to at least one DNS server on one of the plurality of server nodes, the at least one DNS server traversing a DNS root feed to find a domain for the URI and searching a domain feed for the domain and finding a policy for the URI, the at least one DNS server geolocating the user device to determine a nearest node of the plurality of server nodes, transmitting a location of the nearest node to the user device, the user device connecting to the nearest node, the nearest node determining that the request relates to executing a function, determining if the nearest node has a root block for the function locally or if the nearest node needs to fetch the root block and children of the root block before the nearest node is operable to execute the function, and the nearest node loading the function into a secure execution environment. In one embodiment, the policy is proxy, deny, redirect, cache, or return content not found. In one embodiment, the DNS root feed comprises a Merkle tree.

In yet another embodiment, the present invention provides a system for retrieving data in a content-addressable peer-to-peer storage network including at least one cloud platform in network communication with a plurality of server nodes, wherein information associated with each of the plurality of server nodes is stored in a node database on the at least one cloud platform, and a user device in network communication with the at least one cloud platform, wherein the user device is operable to receive a request for a Unique Resource Identifier (URI), wherein the user device is operable to make a Domain Name System (DNS) query to the URI, wherein the URI points to at least one DNS server on one of the plurality of server nodes, wherein the at least one DNS server is operable to geolocate the user device to determine a nearest node of the plurality of server nodes, wherein the at least one DNS server is operable to transmit a location of the nearest node to the user device, wherein the user device is operable to connect to the nearest node, wherein the nearest node is operable to determine if the request is already in a cache on the nearest node or if the request is operable to be resolved using at least one peer node of the plurality of server nodes, and wherein the nearest node is operable to return content related to the request to the user device. In one embodiment, the request is not already in a cache and is not operable to be resolved using at least one peer node, and wherein the nearest node is operable to fetch the content from an origin server and cache the content before returning the content to the user device. In one embodiment, the at least one DNS server is operable to traverse a DNS root feed to find a domain for URI. In one embodiment, the domain is found in the DNS root feed, and wherein the at least one DNS server is operable to search a domain feed for the domain and find a policy for the URI. In one embodiment, one or more of the plurality of server nodes includes a user feed, an applications feed, an objects feed, a blocks feed, a policy feed, a proxy feed, a bucket feed, a DNS feed, a certificate feed, a files mapping feed, a bucket feed, and/or a domain configuration feed. In one embodiment, the user device makes a Hypertext Transfer Protocol (HTTP) connection to the nearest node. In one embodiment, the request is to execute a function, wherein the nearest node determines if the nearest node has a root block for the function locally or if the nearest node needs to fetch the root block and children of the root block before the nearest node is operable to execute the function. In one embodiment, each of the plurality of server nodes has an intermediate certificate.

Referring now to the drawings in general, the illustrations are for the purpose of describing one or more preferred embodiments of the invention and are not intended to limit the invention thereto.

A content delivery network (CDN) is a network of proxy servers and data centers geographically distributed over an area. CDNs increase availability and performance by locating services closer to end users. CDNs provide Internet content including, but not limited to, web objects (e.g., text, images, scripts), downloadable objects (e.g., media files, software, documents), applications, streaming media (e.g., live, on demand), and social media sites.

FIG. 1 is an example of a global content delivery network (CDN). A plurality of end users access content via a plurality of CDN proxy servers connected to an origin server.

Modern CDNs operate with tens to hundreds of points of presence (POPs) in major metropolitan areas. These POPs are generally co-located in carrier-neutral data centers. The CDNs provide value by caching content in these POPs and servicing users in the general vicinity through local last-mile networks.

The CDN of the present invention extends even further from these POPs to get closer to end users and devices than previously possible. The POPs of the present invention not only include carrier-neutral data centers, but office buildings, residential buildings, industrial sites, 5G microcells and femtocells, WI-FI access points, etc. The CDN of the present invention forms a "far edge" at the extreme border of the network (e.g., on the same local area network (LAN) or 5G cell as a user or smart device).

A key weakness of modern CDNs is that POPs are essentially islands of infrastructure. There is no intelligent network between nodes in a CDN-POP. Therefore, cache misses to a POP always result in origin fetches, even if another nearby CDN-POP already has a cached copy of the data.

The CDN of the present invention is formed of not only data center POPs, but tiny points of presence deployed across an area (e.g., city). Nodes in the present invention cooperate intelligently as a network to overcome the limitations of modern CDNs and clouds. The nodes form a decentralized cache, eliminating origin prefetches when nearby nodes have copies of the data or fragments of the data.

Figure 2:
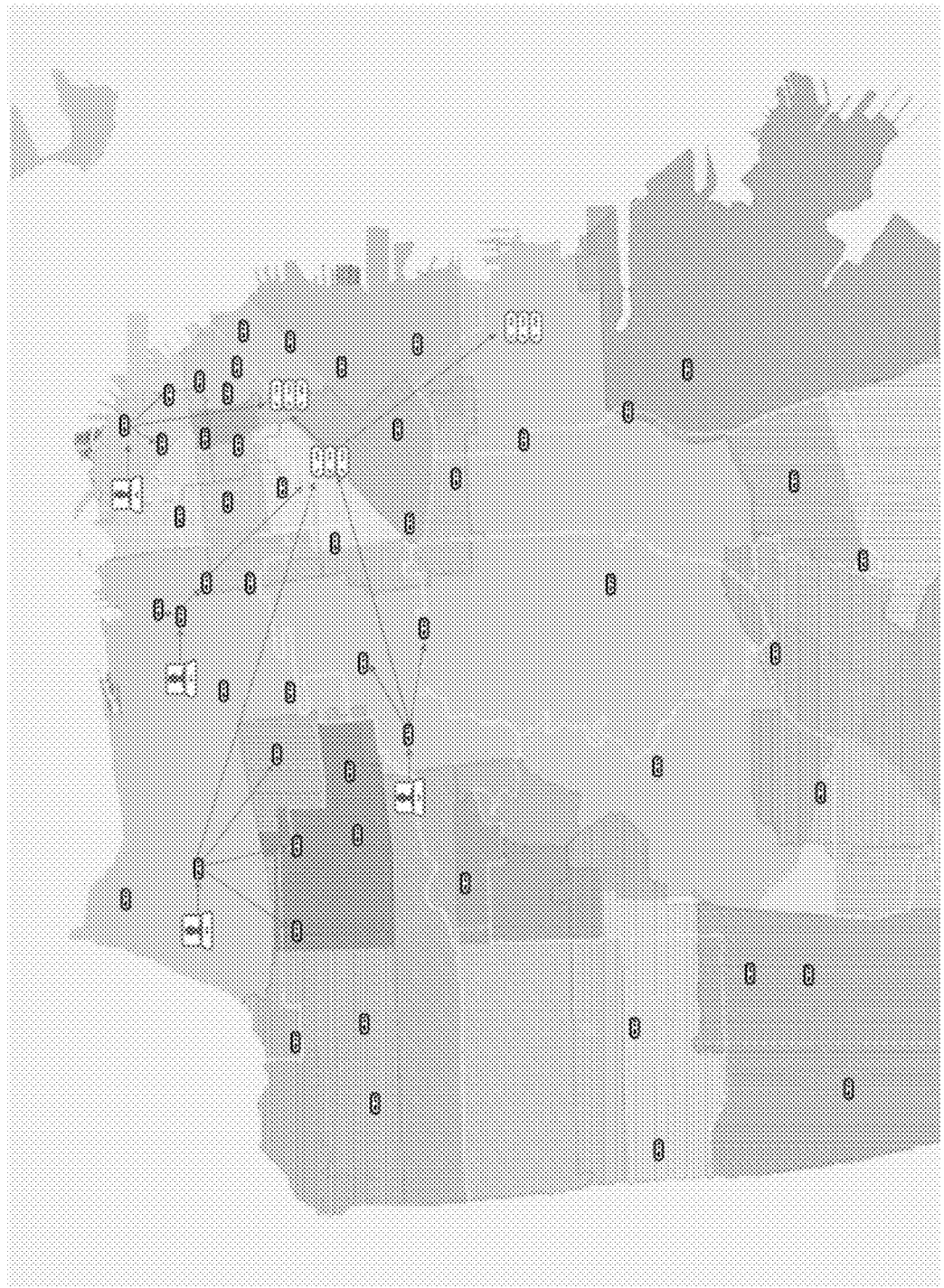
FIG. 2 illustrates an example of nodes forming a decentralized cache.

FIG. 2 illustrates an example of nodes forming a decentralized cache.

Another problem in modern CDNs is the origin fetch itself. The further the origin server is from the CDN proxy, the higher the latency, and the longer it takes to establish a connection and retrieve data for a user. Advantageously, the nodes of the present invention are operable to cooperate to maintain a pool of persistent connections to as many other proxy nodes as reasonable, which are then operable to be used for proxy requests.

Figure 3:
FIG. 3 illustrates a typical origin fetch compared to a proxy-to-proxy fetch of the present invention.

FIG. 3 illustrates a typical origin fetch compared to a proxy-to-proxy fetch of the present invention.

Figure 4:
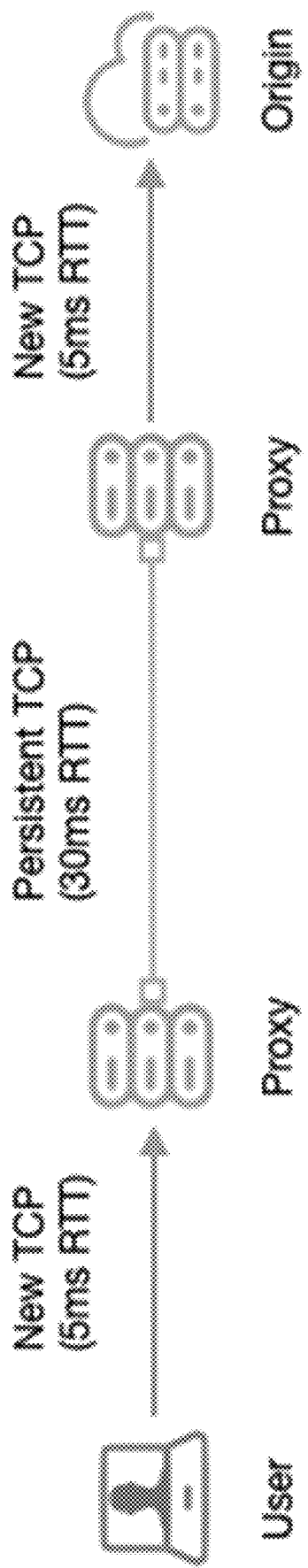
FIG. 4 illustrates an example of HTTP requests tunneled proxy-to-proxy over a persistent Transmission Control Protocol (TCP) connection.

FIG. 4 illustrates an example of HTTP requests tunneled proxy-to-proxy over a persistent Transmission Control Protocol (TCP) connection. Using proxy-to-proxy persistent connections reduces time between the first and last byte over the network in all cases because a) slow-start runs on low latency links and b) the probability of congestion control is reduced. Advantageously, the present invention uses a peer-to-peer network as a basis for the CDN to reduce latency and increase throughput by having peers cooperate to serve requests.

The present invention utilizes serverless computing. Serverless computing is a cloud computing execution model wherein a cloud provider runs the server and dynamically allocates machine resources. The process of deploying code into production is simplified because the developer or operator does not have visibility to scaling, capacity planning, and maintenance operations.

The present invention also utilizes object storage, which is a computer data storage architecture that manages data as an object. Each object includes the data, metadata, and a globally unique identifier. This is in contrast to other computer data storage architectures, such as file systems, which manage data as a file hierarchy, or block storage, which manages data as blocks.

Figure 5:
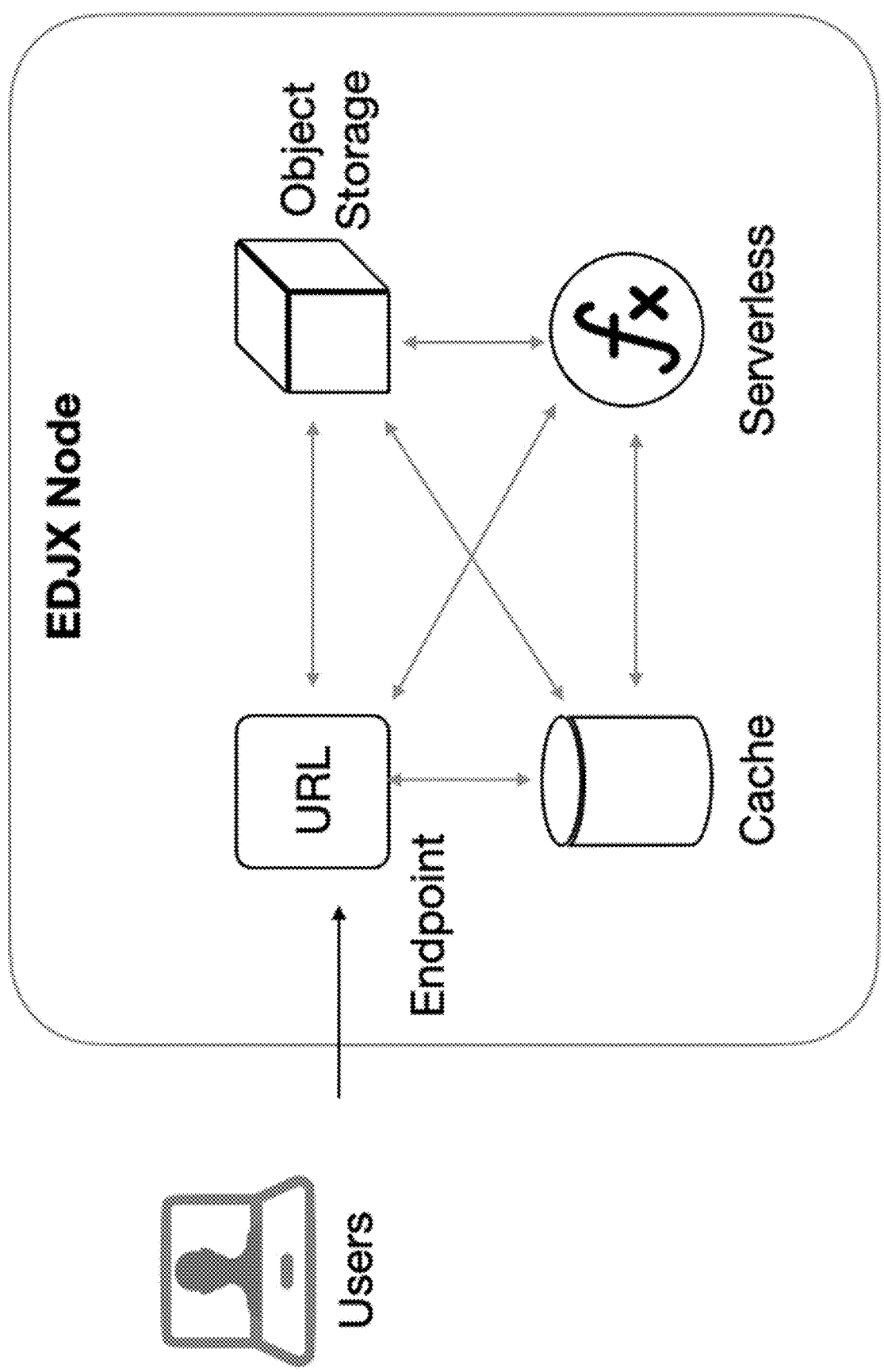
FIG. 5 illustrates an example of a node with object storage and serverless computing.

FIG. 5 illustrates an example of a node with object storage and serverless computing.

Current attempts to create edge clouds are based on forward-deploying the same technologies used to create and manage hyperscale infrastructures. However, technologies like AZURE STACK, KUBERNETES, and DOCKER SWARM include built-in assumptions that make creating edge infrastructures and applications difficult. Typical clouds have centralized data, high bandwidth, high latency, a reliable network, a static deployment, infinite resources, long-tail access, and secure hardware. In contrast, edge clouds have decentralized data, low bandwidth, low latency, an unreliable network, a dynamic deployment, constrained resources, short-tail access, and insecure hardware.

Hyperscale cloud providers rely on a single source of truth or limited data replication strategies designed to operate under the hyperscale set of assumptions herein. Edge locations must be able to operate independently of centralized state, yet synchronize when necessary (or able) with remote networks.

Hyperscale cloud providers enjoy high bandwidth interconnects all the way to the edge of their network and between facilities. Edge locations may have high bandwidth locally and extremely limited bandwidth over the wide area.

Hyperscale infrastructure assumes web-like request-response patterns. Although latency is always a key metric, hyperscale cloud providers measure in tens of milliseconds, not single digit milliseconds. Edge infrastructure may be low latency locally, but high latency over the wide area network.

Hyperscale facilities enjoy fiber optic, copper, and other dedicated telecommunications networks. Edge devices are frequently wireless or suffer from intermittent connectivity disruptions.

In hyperscale scenarios, infrastructure resources (and software) are provisioned in advance of utilization across large pools of resources, and scale-to-zero is supported at the cluster level. In the edge scenario every application must necessarily scale-to-zero to afford multi-tenancy on resource constrained hardware.

Hyperscale cloud providers have designed their platforms to absorb large bursts and scale-out their resources (e.g., virtual machines, containers, etc.) accordingly across large pools of resources. In the far-edge use case, resources may be limited to a single computing device.

In hyperscale infrastructure, data access is likely to be random very long tails (e.g., streaming video). There may be hot spots for data, but overall the access is long tailed. In a small edge deployment, access patterns (between requests) are much more likely to be correlated.

Physical access to hardware infrastructure is secure in the hyperscale datacenter environment. Such facilities enjoy armed security, access logs, key-restricted access to cages and cabinets, which are not present in edge locations.

The present invention utilizes a distributed edge computing platform (sometimes referred to as "EDJX") to reduce latency and increase network throughput to Hypertext Transfer Protocol (HTTP) clients (edge devices) by locating server nodes in close proximity to edge devices. The edge platform of the present invention is operable to write, test, and deploy low-latency edge applications. The edge platform is further operable to execute serverless functions or otherwise retrieve data from the platform compute nodes located in close proximity to the client. The edge platform is Application Programming Interface (API) compatible with cloud infrastructures including, but not limited to, GOOGLE CLOUD PLATFORM, AMAZON WEB SERVICES (AWS), and MICROSOFT AZURE.

An edge device is any device which provides an entry point into enterprise or service provider core networks. Examples include, but are not limited to, routers, routing switches, integrated access devices (IADs), multiplexers, metropolitan area network (MAN) access devices, wide area network (WAN) access devices, IoT devices, sensors, industrial machines, personal computing devices, laptop computing devices, tablet computing devices, mobile computing devices, cameras, and any other device that produces and/or collects data.

The edge platform of the present invention overcomes current issues in the prior art, including latency and bandwidth limitations at the edge, by deploying serverless functions in close proximity to edge devices. The edge platform further enables edge devices to securely access and record data at the edge using blockchain technologies.

Advantageously, the present invention overcomes the operational deployment limitations of prior art edge clouds by incorporating the following: (1) serverless computing, (2) blockchain, (3) content addressing, and (4) conflict-free replicated data types.

A key aspect of serverless computing is functions. Functions are small, independent pieces of code that complete specific requests, providing developers with more operational flexibility and cost savings when building, deploying, and running applications. Serverless computing, also known as functions-as-a-service (FaaS), is a cloud computing execution model which dynamically manages the allocation of resources on-demand according to events. Serverless functions are instantiated just-in-time to respond to events within an environment (e.g., network requests) or the arrival or modification of data, and typically run to completion and then terminate, returning resources to the system. For building decentralized applications the serverless paradigm is nearly ideal, owing to a lack of infrastructure dependencies and artifacts. Virtualization solutions like virtual machines and containers provide excellent resource isolation, performance, and security. However, virtual machines and containers are managed entities requiring dedicated resources, orchestration, and configuration. As such, they are tightly coupled to the underlying infrastructure. Deploying applications in legacy virtualization systems necessarily means incorporating and accounting for infrastructure artifacts. Typically, this is accomplished through complex orchestration systems such as Kubernetes (open source). In contrast, in pure serverless environments, developers focus on the development of their functions in isolation, without respect to infrastructure, software libraries, or other dependencies. In effect, the system resolves such dependencies on behalf of the software, freeing developers from infrastructure management.

Although the term blockchain refers to a growing list of records, called blocks, which are linked cryptographically, more generally blockchain refers to an entire family of related Distributed Ledger Technologies (DLT) used to create and manage these complex distributed data structures. Namely, the DLT concepts like Merkle trees or hash trees, along with the related concept of a directed acyclic graph (DAG), and a number of new techniques for creating robust peer-to-peer networks, gossip dissemination of data, eventual consistency, and a host of other related concepts and learnings have been incorporated into the design and implementation of the platform. As security is a big concern for edge use cases, each serverless request is preferably validated by and recorded to a blockchain to create an immutable record of execution.

Referring to data by its content, rather than its location, is one of the most powerful concepts to emerge in distributed computing in the last decade. In content-addressed systems, a cryptographic checksum of the data is used as the address for the data, creating a self-validating scheme that assures data integrity. Rather than connecting to a location to request the data, content-addressed networks route the data to the location of the requestor, offloading protocol overhead to ad-hoc infrastructure.

In distributed computing, a conflict-free replicate data type (CRDT) is a data structure that can be replicated across multiple computers, where the replicas can be updated independently and concurrently without coordination between peers.

The platform of the present invention provides a content-addressed data network (sometimes referred to as "EdjNet"), which enables the transparent, opportunistic, and secure dissemination of data between nodes in a peer-to-peer network. The platform includes a peer-to-peer protocol that uses cryptographic identities, delegation of trust, and end-to-end encryption, to create a global namespace for self-validating data that runs transparently over IPv4 and/or IPv6 networks. In a preferred embodiment, the system encrypts data including, but not limited to, network traffic, stored data, and logs.

A node is a single unit of hardware with a defined minimal central processing unit (CPU), random access memory (RAM), disk storage, and network bandwidth configured to (i) support execution of functions, (ii) store content delivery network (CDN) content, and (iii) store information related to groups & policies for making authorization decisions.

Nodes in the distributed edge computing platform (sometimes referred to as "EDJX nodes") are zero-configuration nodes, meaning the nodes are operable to acquire any configuration dynamically and on-the-fly from the ad-hoc environment. Consequently, all nodes are identical from a software stack and configuration point of view, removing the need for orchestration and configuration management.

Figure 6:
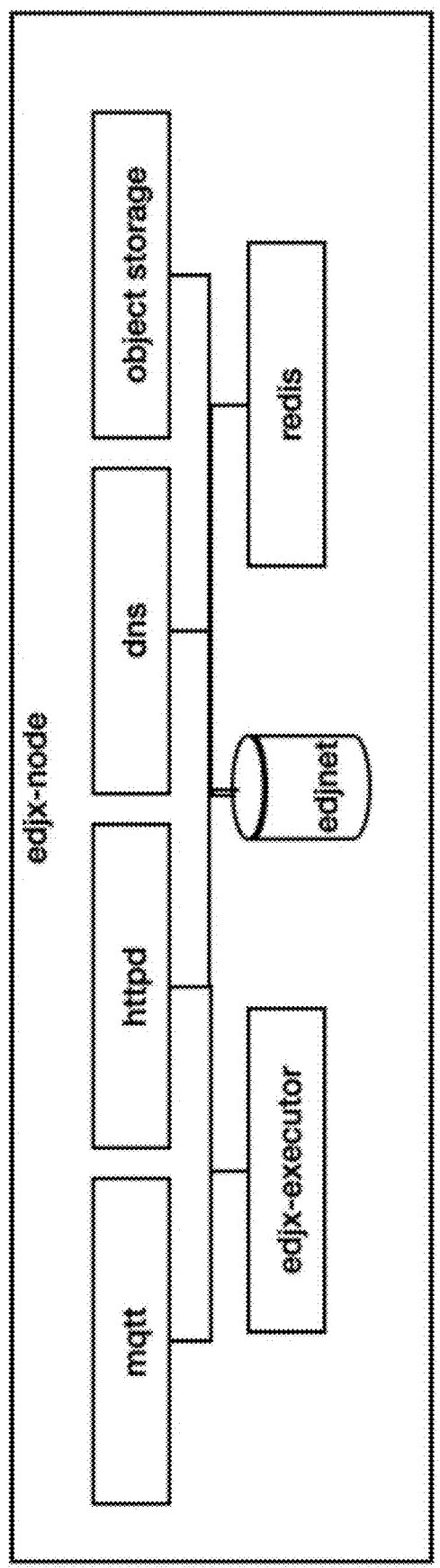
FIG. 6 illustrates one embodiment of a node according to the present invention.

Every node in the distributed edge computing platform exposes a number of protocol endpoints, based on network policy, to enable proximal cloud services: (1) HTTP and Hypertext Transfer Protocol Secure (HTTPS), (2) Message Queuing Telemetry Transport (MQTT), (3) Object Storage, and (4) Domain Name System (DNS). FIG. 6 illustrates one embodiment of a node including HTTP and HTTPS services on a web server (e.g., HTTPD), MQTT, object storage, and DNS. The node further includes a function executor service and a cache service (e.g., REDIS). The node preferably includes at least one database and a message bus.

Figure 7:
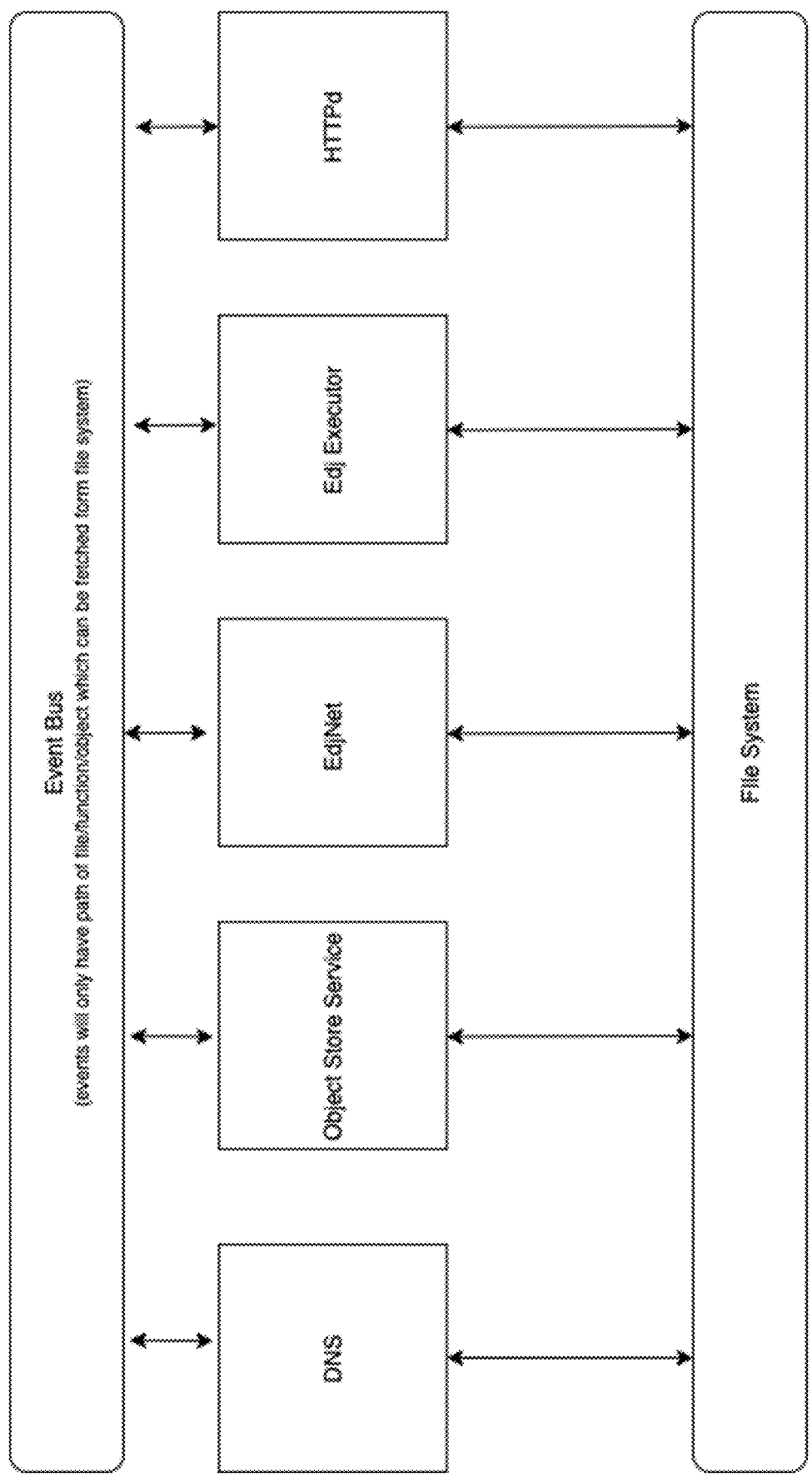
FIG. 7 illustrates another embodiment of a node according to the present invention.

In one embodiment, a node includes an event bus and a file system as shown in FIG. 7. Files are temporarily stored in a shared file system during upload and fetch events. The absolute path of a file, function, or object is shared using the event bus.

In another embodiment, a storage service application programming interface (API) fetches a temporary stored filed based on a universally unique identifier (ULM). The storage service is operable to stream data based on the ULM. The temporary stored file is downloaded using an API call. The storage service deletes the temporary stored file once it receives an event for deletion for a particular UUID.

Alternatively, blocks and/or chunks of data are shared using an event bus. Files are split and arranged using blocks. However, this may block and/or slow the event bus for large files with too many blocks and/or large block sizes.

HTTP and HTTPS services include, but are not limited to, request routing, rewriting, redirecting, and/or triggering serverless functions. The platform is preferably operable to perform proximity-based routing of HTTP and/or HTTPS requests to the closest content-addressed data network-enabled node. In one embodiment, the proximity-based routing is based on at least one proximity metric including, but not limited to, availability, performance, and/or other criteria. In one embodiment, the platform is operable to create global rewrite rules to transparently rewrite uniform resource identifiers (URIs). In one embodiment, the platform is operable to create global redirect rules to transparently redirect URIs. In one embodiment, the platform is operable to trigger serverless functions based on HTTP request, URI, etc.

MQTT services include, but are not limited to, global messaging and/or triggering serverless functions. In one embodiment, the platform is operable to extend MQTT across multiple geographic regions with no centralized messaging broker. In one embodiment, the platform is operable to trigger serverless functions based on MQTT events.

Object storage services include, but are not limited to, key-value storage, triggering serverless functions, durability, policies, and/or encryption. In one embodiment, the platform is operable to persist data using key-value storage under a single, global namespace over HTTP and HTTPS. In one embodiment, the platform is operable to trigger serverless functions based on creation, deletion, or updates to data objects. The platform preferably is operable to perform transparent and opportunistic replication of data ensuring durability through eventual consistency. In one embodiment, the platform controls access to data based on Identity and Access Management (IAM) policies which dynamically replicate. In one embodiment, the platform includes full end-to-end encryption of data in transit and at rest with optional encryption of payloads based on cryptographic identities tied to IAM policies. The platform preferably includes a log of where data originated, user(s) who have accessed the data, and how the data has changed over time.

Figure 8:
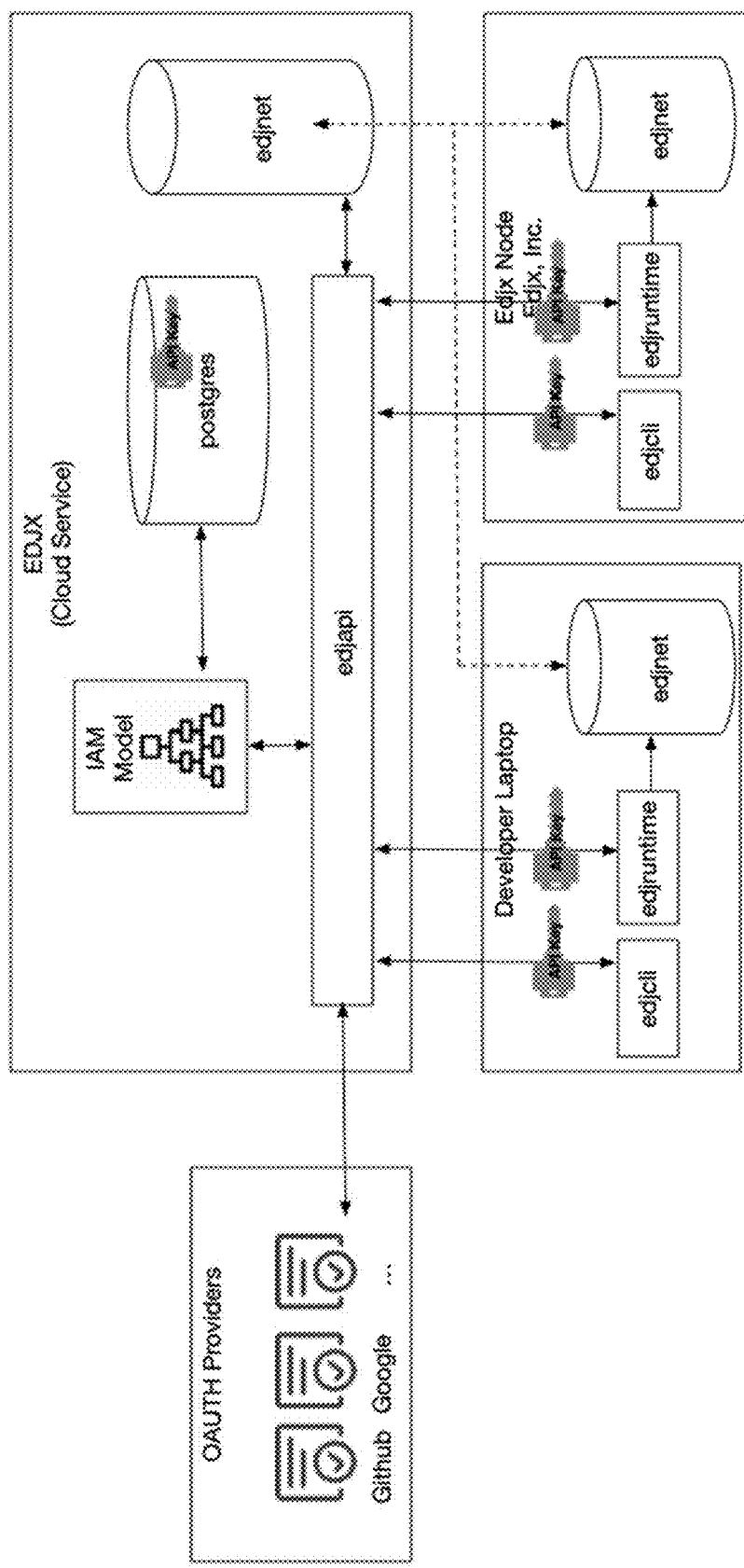
FIG. 8 illustrates one embodiment of a centralized API-based IAM architecture.

FIG. 8 illustrates one embodiment of a centralized API-based IAM architecture. All API consumers authenticate with a pre-shared key (API key) stored in a relational database. An API controller authorizes API calls by querying IAM models in the postgres database.

Figure 9:
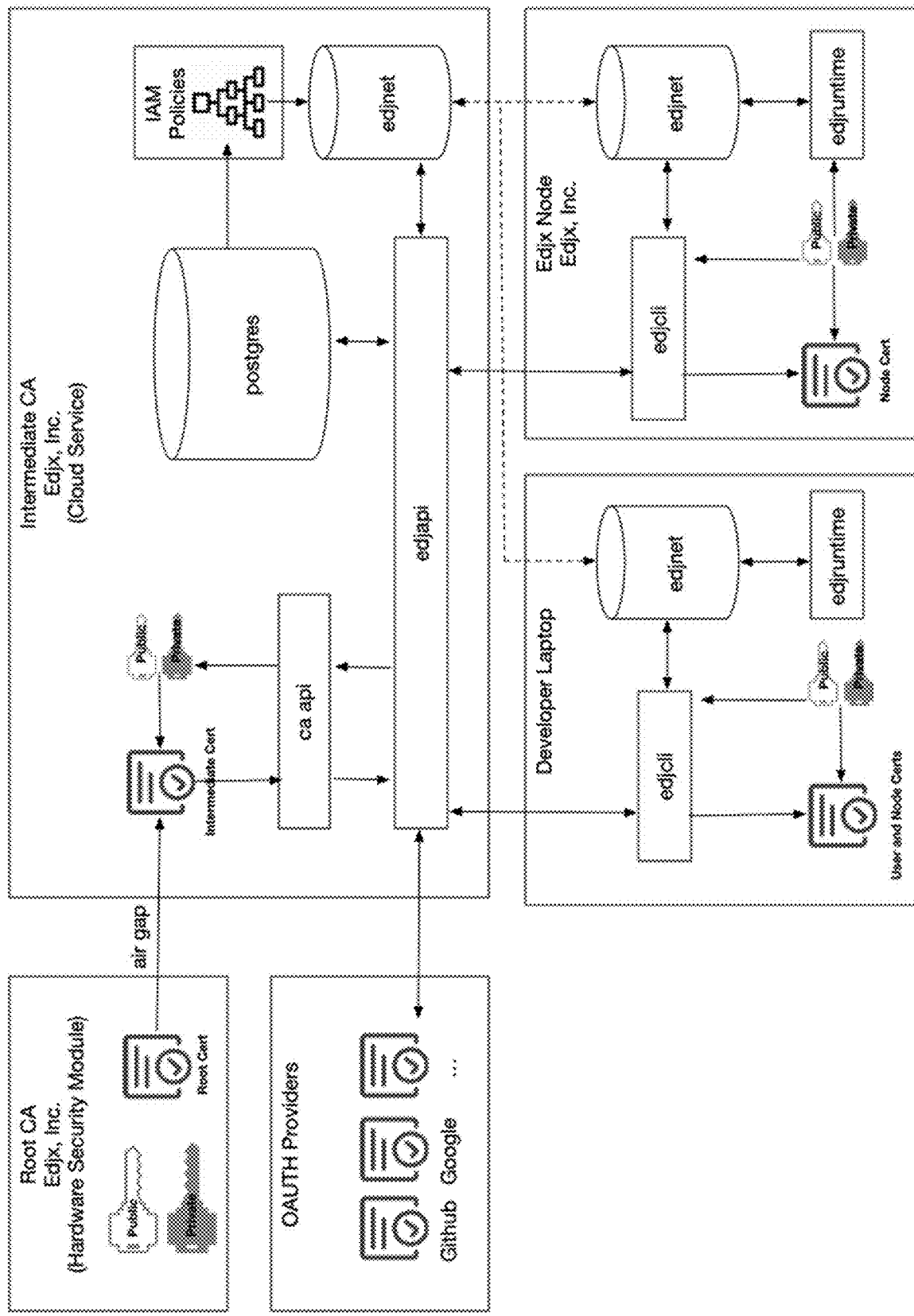
FIG. 9 illustrates one embodiment of a hierarchical trust model.

FIG. 9 illustrates one embodiment of a hierarchical trust model. In one embodiment, the hierarchical trust model is based on existing public-key infrastructure (PKI) standards overlaid onto the content-addressed data network. In this model, the root of trust is distributed edge computing platform (in the case of the public network), or otherwise a customer's root authority (in the case of a customer deployment of the entire distributed edge computing platform stack).

As a best practice, root authority keys are kept offline and air-gapped for security by creating an intermediate issuing authority. A key generation and certificate-signing process is a pre-requisite for turning up nodes through a centralized API. A copy of the certificate chain (e.g., root and intermediate) is shipped in the runtime distribution, and is configurable by the end user. The identity of nodes becomes the hash of the public key for the certificate. Nodes mutually authenticate by presently valid certificates signed by the configured intermediate issuing authority. Nodes also use their client certificate to authenticate with EdjAPI. Users keep their existing guid-based identity, but can be associated with a User Certificate for authentication. In one embodiment, the platform includes convenience commands for initializing the intermediate issuing authority.

Figure 10B:
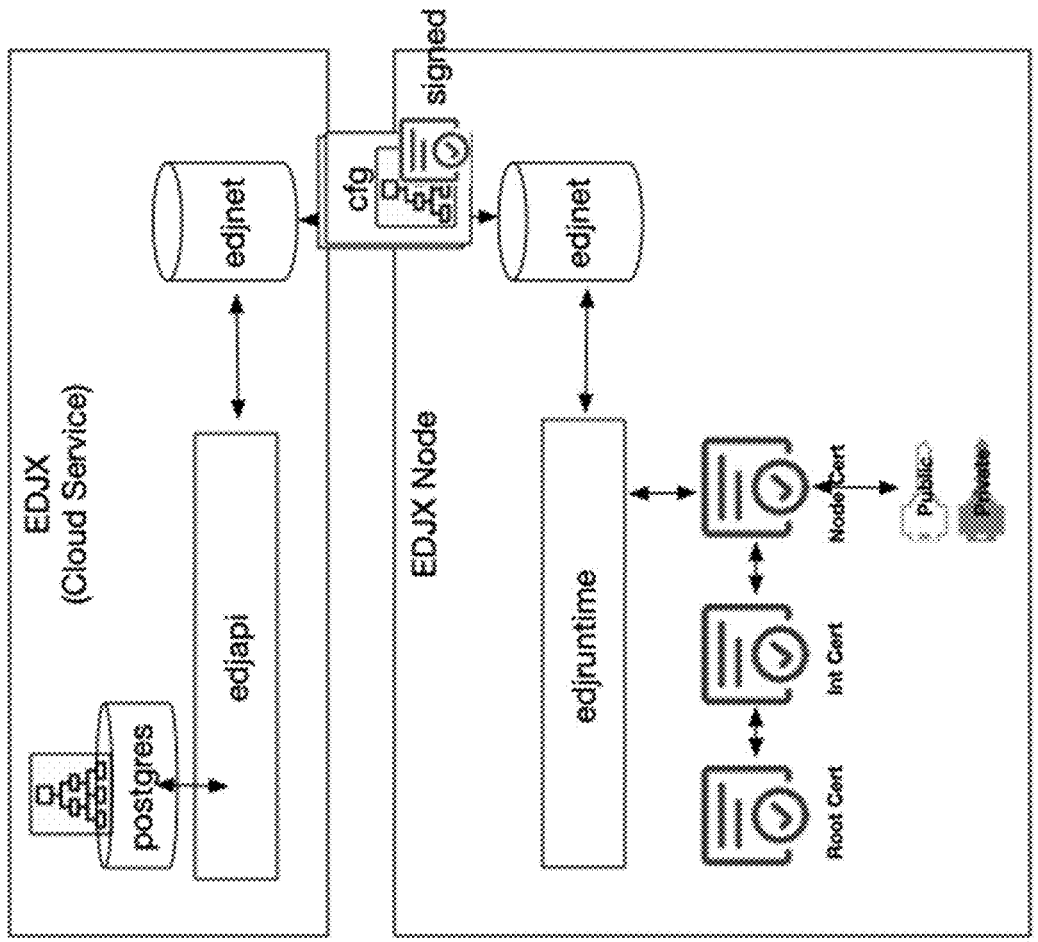
FIG. 10B illustrates another embodiment of IAM architecture.
Figure 10A:
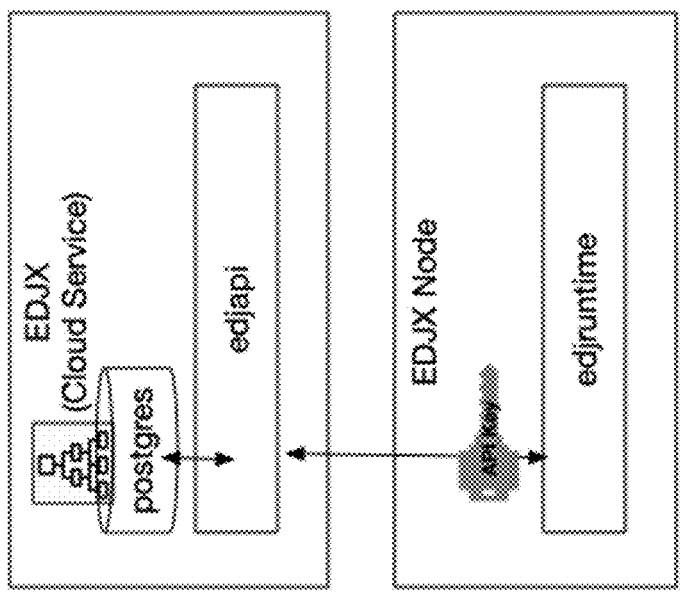
FIG. 10A illustrates one embodiment of IAM architecture.

FIG. 10A illustrates one embodiment of IAM architecture. An API key is shared between a node and the distributed edge computing platform.

FIG. 10B illustrates another embodiment of IAM architecture. The root certifying authority and intermediate certifying authority are the functional root of trust, and are the only entities authorized to create and manage high level entities and TAM policies. Therefore, the root certifying authority and intermediate certifying authority must delegate authority to other entities through policies. Policies are serialized as blocks by introducing the concept of a pub or feed to the content-addressed data network which is gossip-disseminated. By default, all feeds created by the root certifying authority or its delegates remain pinned to every node.

Figure 11:
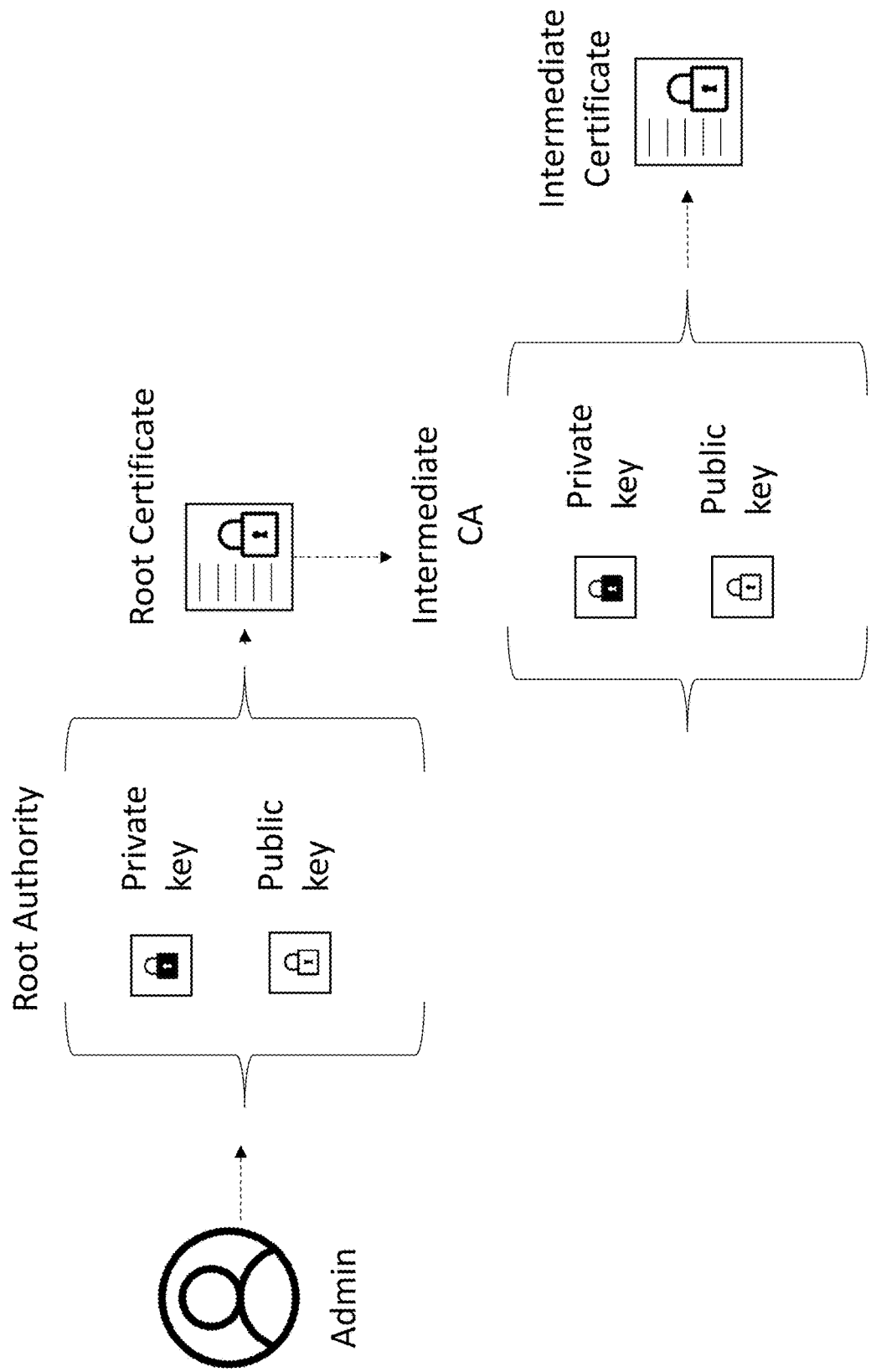
FIG. 11 illustrates one embodiment of generation of a public key and private key pair using a root authority.

An administrator generates a public key and private key pair using a root authority as shown in FIG. 11. The public key and private key pair is used to generate a root certificate. The root certificate is used to generate an intermediate certificate of authority (CA). The intermediate CA is used to generate an intermediate certificate. The intermediate certificate provides trust between nodes. The intermediate certificate preferably is a long expiring certificate or does not expire.

Figure 12:
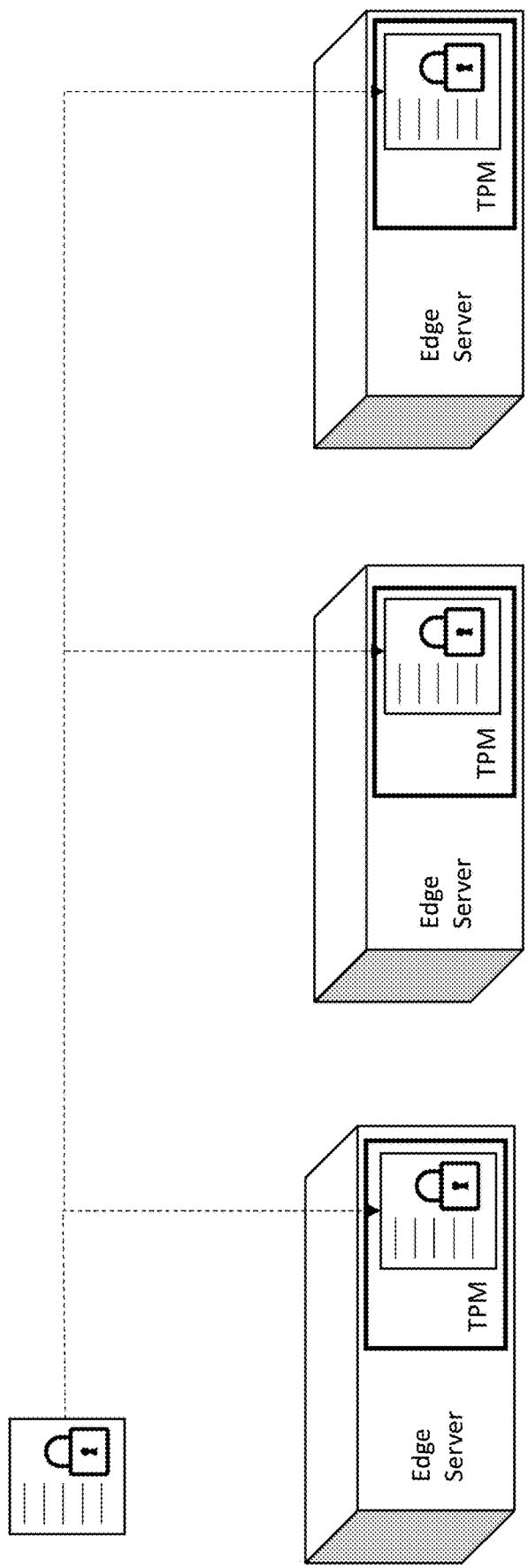
FIG. 12 illustrates one embodiment of an intermediate certificate stored on a trusted platform module (TPM) on a server.

In one embodiment, the intermediate certificate is stored on a trusted platform module (TPM) on a server as shown in FIG. 12. Alternatively, the intermediate certificate is stored in a file system. The intermediate certificate is preferably required to use the platform.

Figure 13:
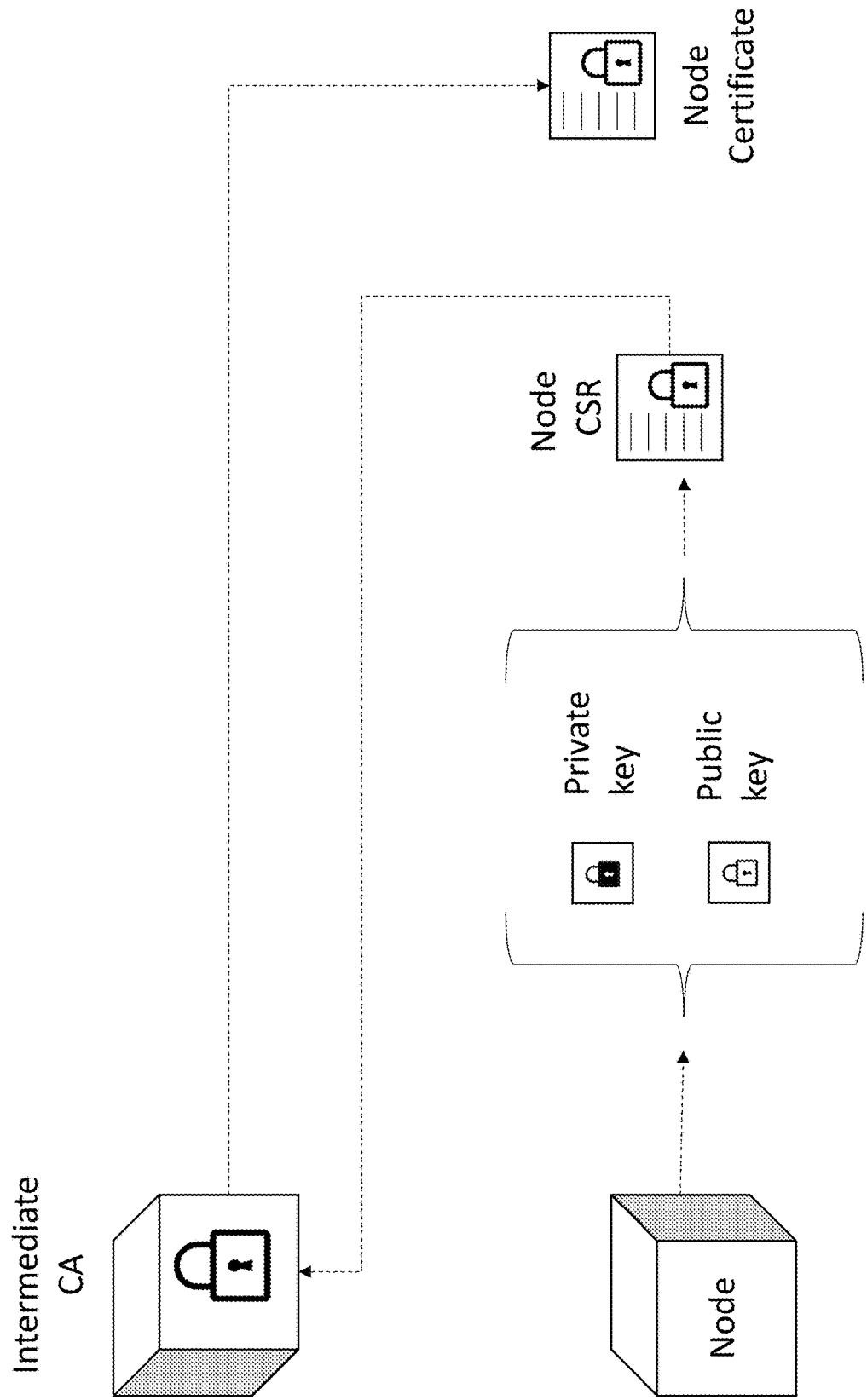
FIG. 13 illustrates one embodiment of generating a node certificate.

FIG. 13 illustrates one embodiment of generating a node certificate. As part of the node initialization process, the node generates a public key and private key pair, and transmits a node certificate signing request (CSR) to the intermediate CA. If the intermediate CA approves the CSR, it generates a node certificate.

Figure 14:
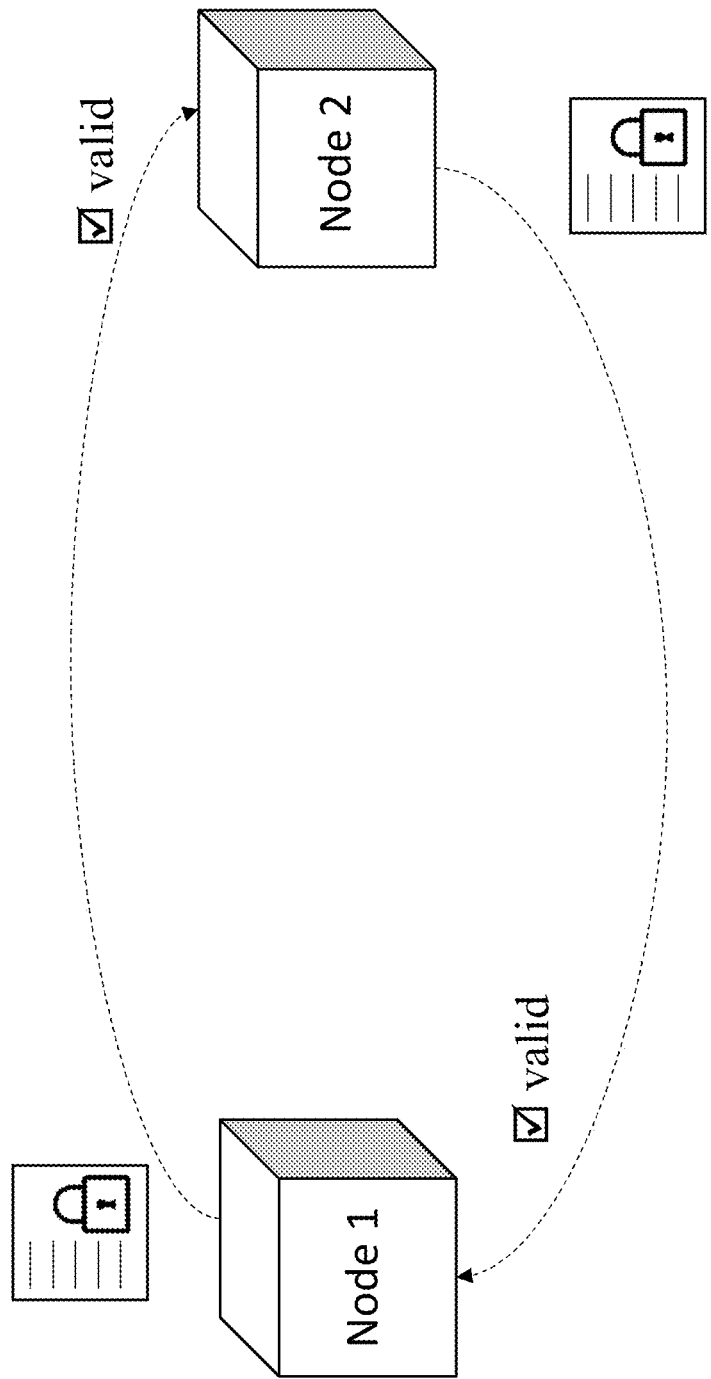
FIG. 14 illustrates one embodiment of node authentication.

FIG. 14 illustrates one embodiment of node authentication. When a first node and a second node discover each other on a network, the nodes connect to each other and try to authenticate. The first node confirms that the second node has a valid node certificate and that the valid node certificate was signed by the same CA as the node certificate on the first node. The second node confirms that the first node has a valid node certificate and that the valid node certificate was signed by the same CA as the node certificate on the second node. If the CA is different, the two nodes are not on the same network and will not be able to communicate. If the two nodes are on the same network, all communication between the first node and the second node are encrypted.

Figure 15:
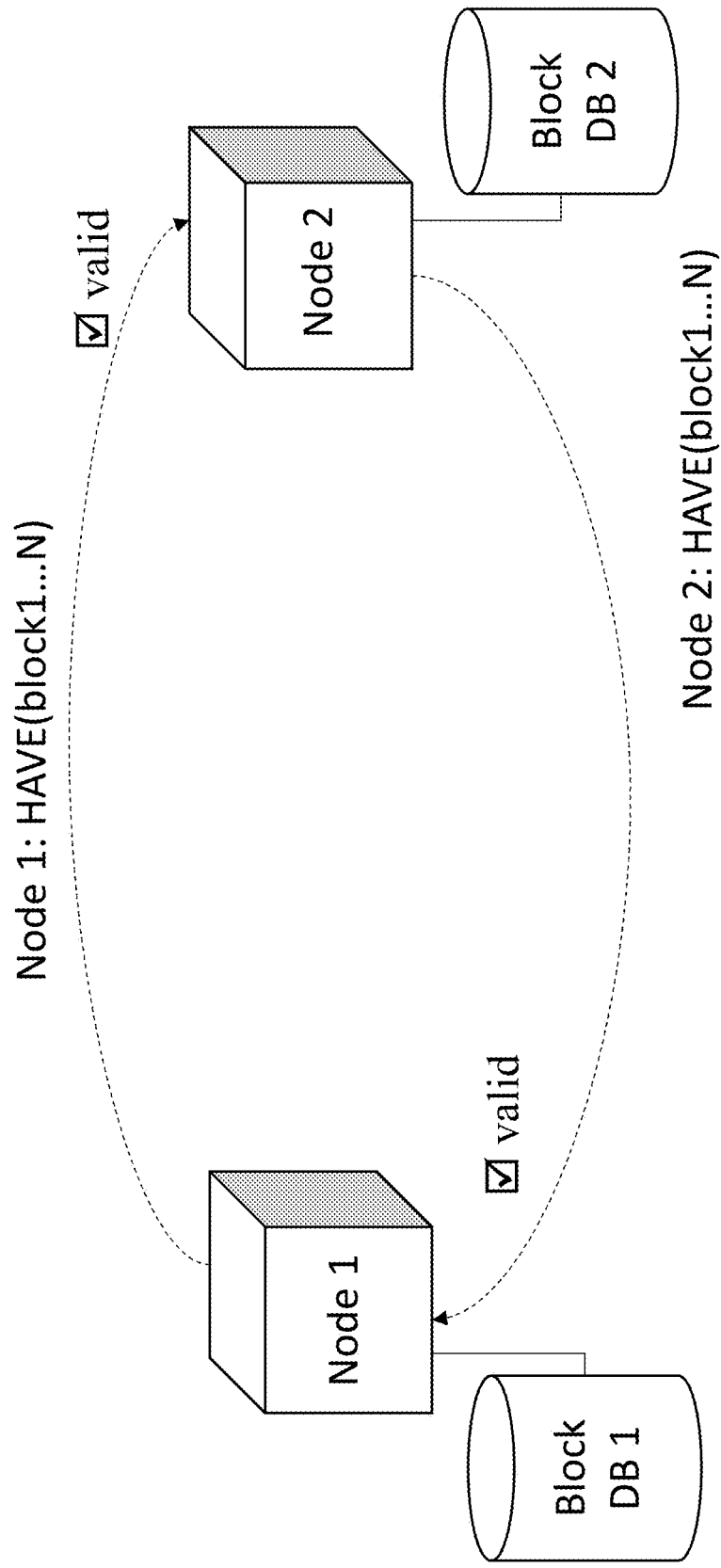
FIG. 15 illustrates one embodiment of two nodes exchanging block lists.

FIG. 15 illustrates one embodiment of two nodes exchanging block lists. The first node and the second node each have a block database (i.e., Block DB1 and Block DB2, respectively), which is persisted to its local storage (e.g., file system, attached storage on device). After authentication, nodes exchange a list of blocks in their database using a HAVE message. Each node is operable to request blocks not contained in the corresponding block database via a WANT message.

Figure 16:
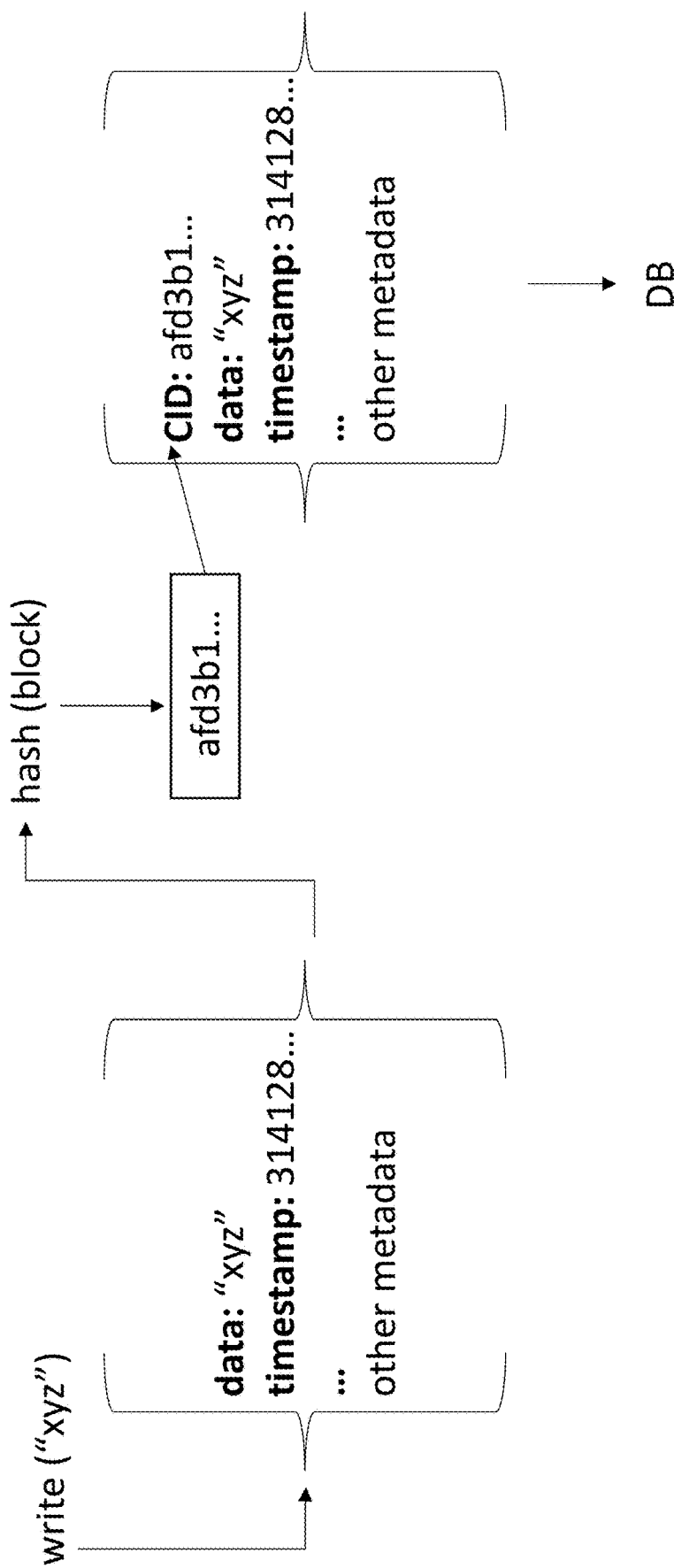
FIG. 16 illustrates an example of block creation.

A block is a data structure. FIG. 16 illustrates an example of block creation. Data is written (e.g., "xyz") with a timestamp and other metadata. A hash of all data in the block is used to derive an address. The output of the hash function is inserted as the content identifier (CID) in the block.

Figure 17:
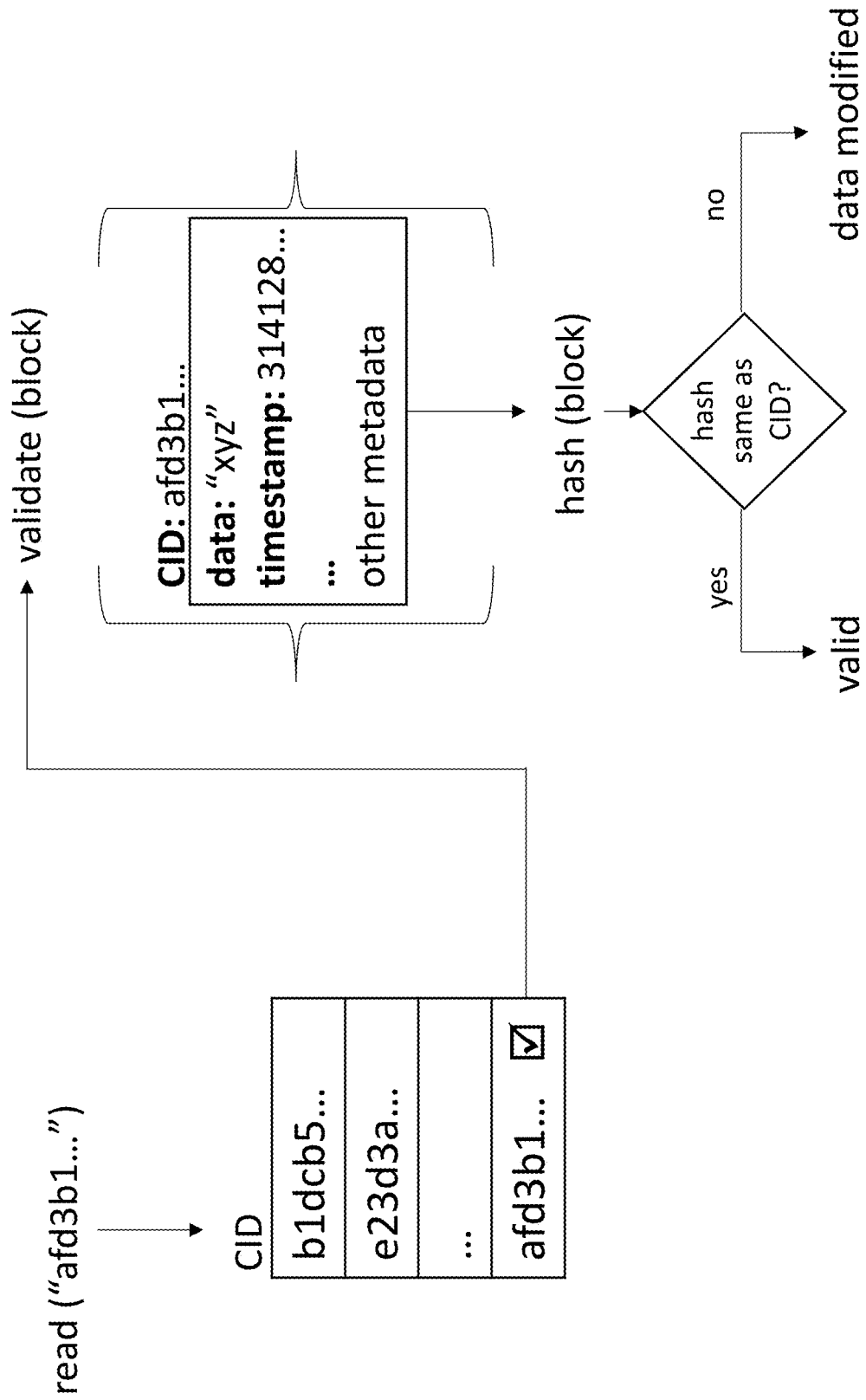
FIG. 17 illustrates one example of finding a block by CID.

FIG. 17 illustrates one example of finding a block by CID. To find a block by CID, a block database is searched for the CID and the associate block structure is retrieved. To validate that the block is correct, the hash of the data in the block is compared to the CID of the block. This verifies that the data in the block has not been modified. If a single bit in the data structure is changed, the output of the hash function would not match the CID.

Figure 18:
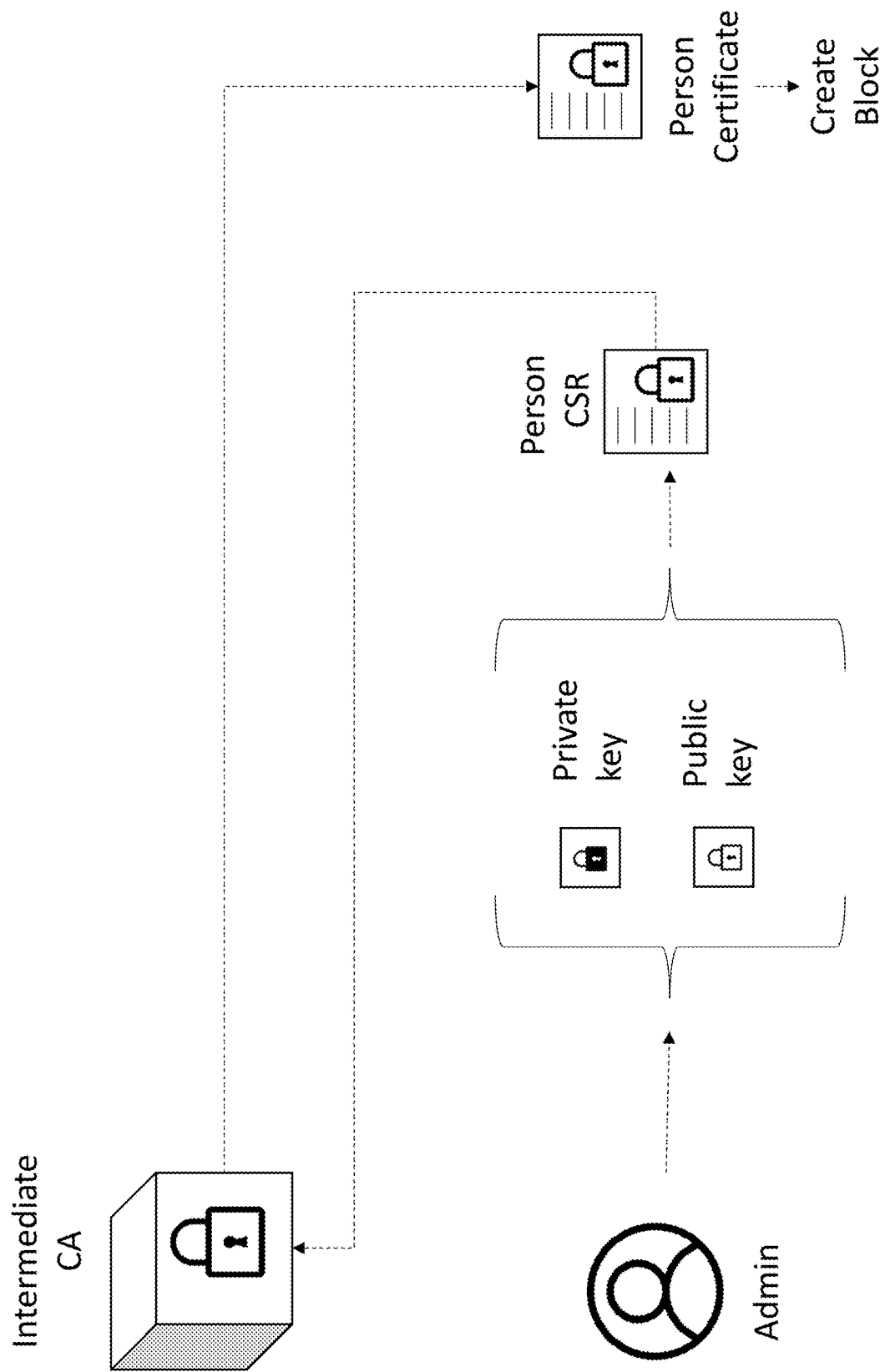
FIG. 18 illustrates an example of a person generating a block.

FIG. 18 illustrates an example of a person generating a block. An administrator generates a public key and private key pair, and sends a person CSR to the intermediate CA. The intermediate CA approves the CSR and generates a person certificate. Although an administrator is shown in FIG. 18, the system is operable to generate a person certificate for any person with appropriate permissions and access.

Figure 19:
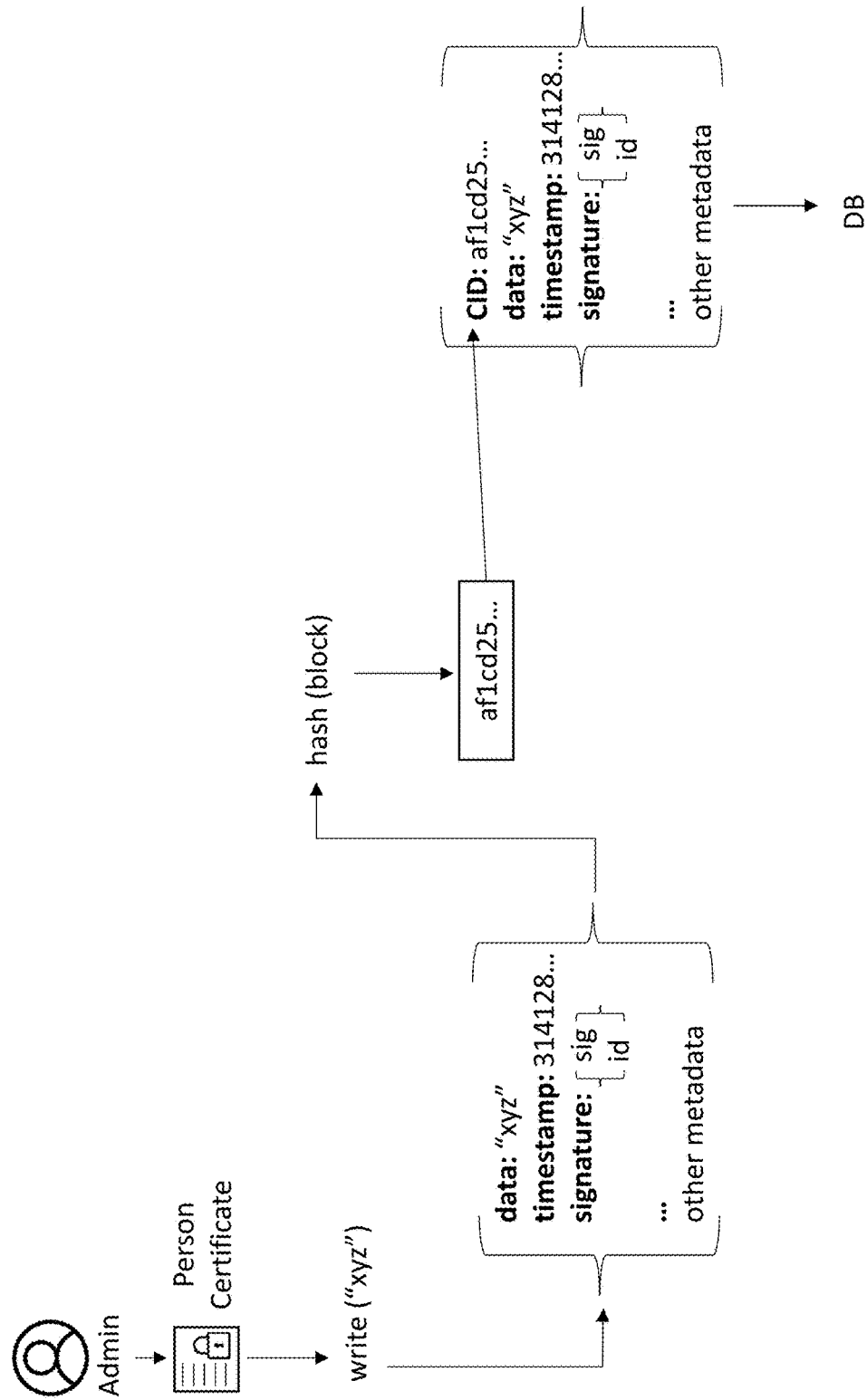
FIG. 19 illustrates a block with a signature.

FIG. 19 illustrates a block with a signature. The signature includes an identity of the signer and the signature itself. The signature is included in the data that is hashed. A complete block is generated with a CID that includes the signature. Therefore, it is possible to prove who created the block.

Figure 20:
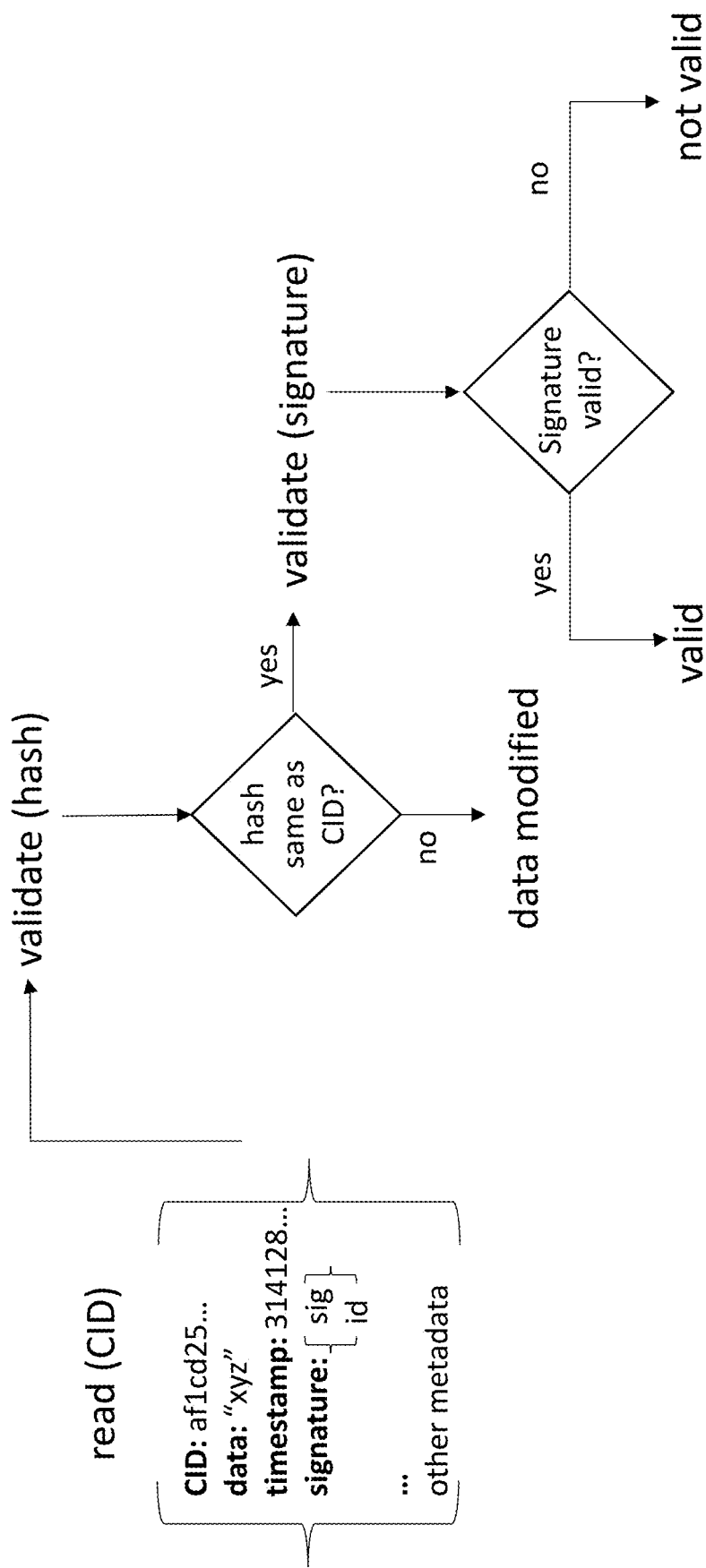
FIG. 20 illustrates validating the identity of a block creator.

FIG. 20 illustrates validating the identity of a block creator. A CID is read to fetch the block from data storage or the peer-to-peer network. The CID is validated via the process described in FIG. 17. The signature is then validated.

Figure 21:
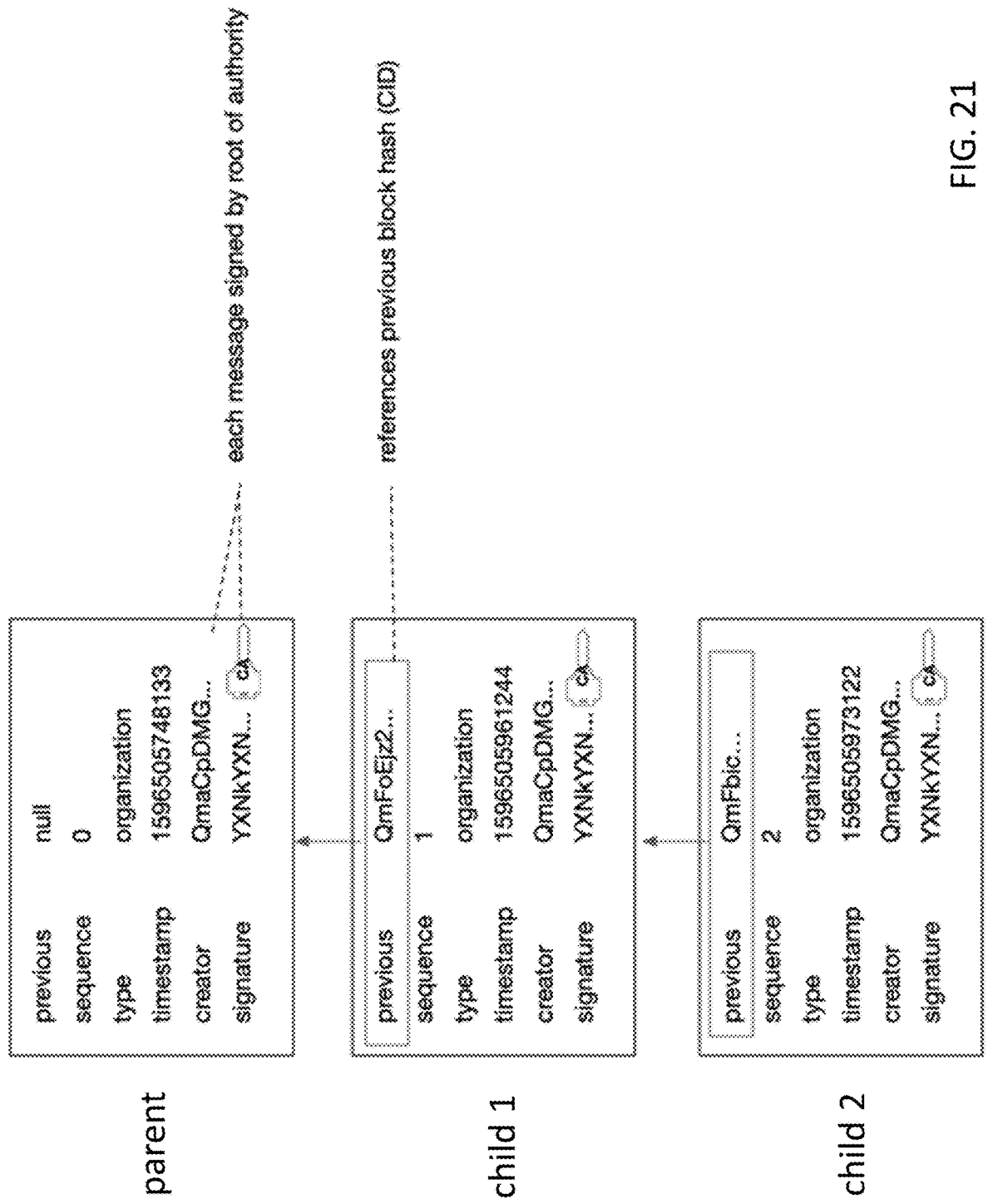
FIG. 21 illustrates an example of a feed according to the present invention.

Linked blocks (sometimes called a "feed") are used in the present invention to configure the network on each node. In one embodiment, the linked blocks are a Merkle tree. A feed is a list of all the blocks posted by a particular identity for a particular topic. The messages in the feed create an append-only log structure, where each message references the content-address (CID) of the previous block, forming a chain back to the original declaration. An example of a feed is shown in FIG. 21.

In one embodiment, the system provides a plurality of feeds including, but not limited to, a user feed, an applications feed, an objects feed, a blocks feed, a policy feed, a proxy feed, a bucket feed, a DNS feed, a certificate feed, a files mapping feed, a bucket feed, and/or a domain configuration feed. In a non-distributed system, these structures would be stored in a relational database. In contrast, the present invention provides a distributed database. The intermediate CA initializes each feed and signs the block.

Figure 22:
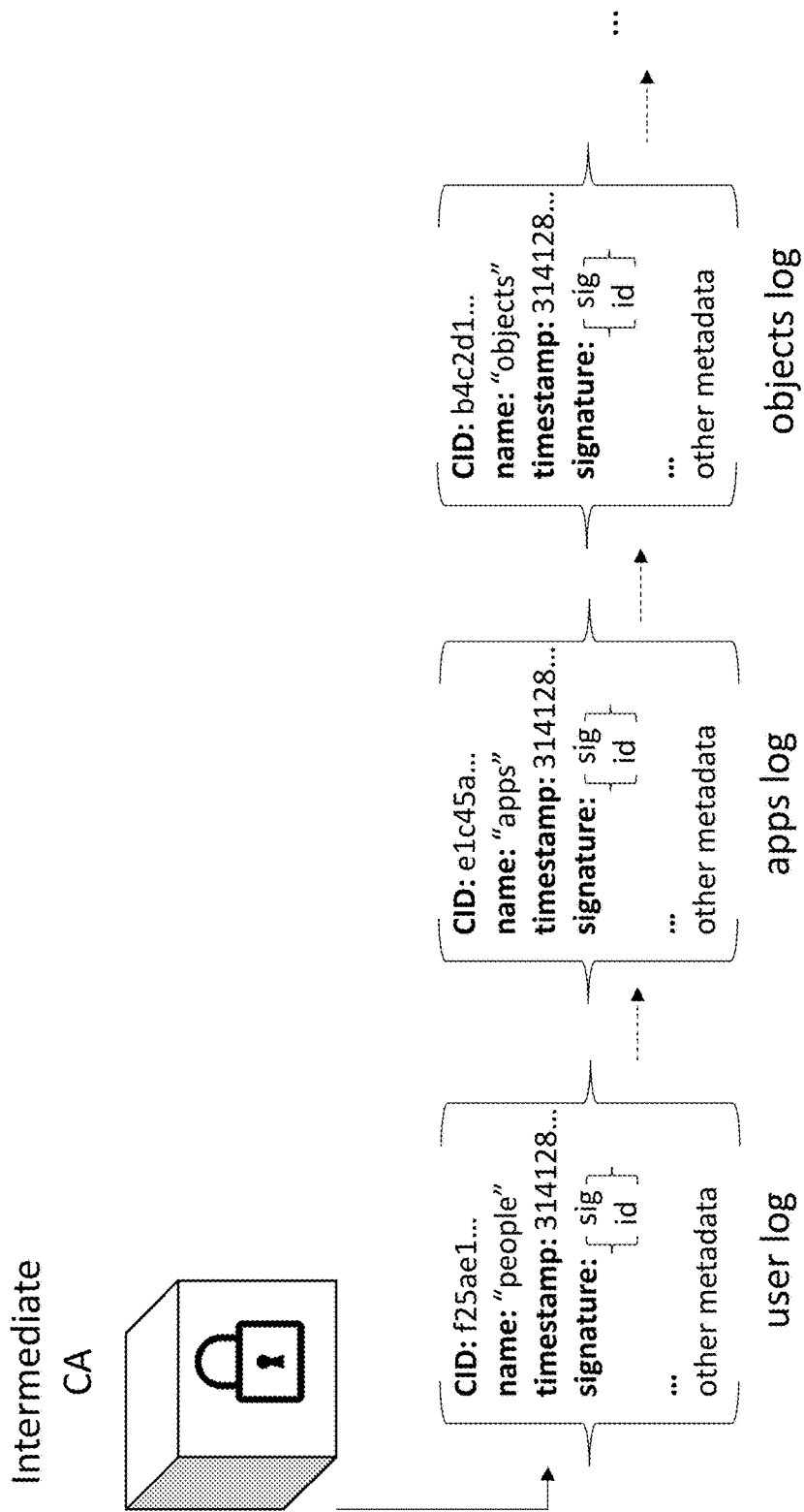
FIG. 22 shows an example of root feeds.

In a preferred embodiment, one or more of the plurality of feeds is included in the system as root feeds. FIG. 22 shows an example of root feeds. The root feeds include, but are not limited to, a user feed, an applications feed, an objects feed, a blocks feed, a policy feed, a proxy feed, a bucket feed, a DNS feed, a certificate feed, a files mapping feed, a bucket feed, and/or a domain configuration feed. When initialized by the intermediate CA, the root feeds are saved to the content-addressed data network.

When a first node is added, the first node has all of the root blocks. When a second node is connected, blocks are exchanged through the process described in FIGS. 3-4. The second node obtains the root feeds, all members of the root feeds, reconstructs the current network configuration by traversing the tree(s), and applies the current network configuration locally. The second node is then operable to exchange blocks with a third node. Therefore, each node is operable to find all root blocks for the intermediate CA, all child blocks, and apply the state on the local node. In a preferred embodiment, any node is operable to converge to a last known good state of the network.

Advantageously, this provides for opportunistic synchronization. For example, each individual in a vehicle is wearing an individual node. The vehicle includes a vehicle node, which is larger than the individual nodes. The vehicle is located near a building with building nodes larger than the vehicle node. The individual nodes, vehicle node, and building nodes communicate peer-to-peer over a network (e.g., WI-FI, mobile ad hoc network (MANET), etc.) and are operable to exchange data.

If a node is interested in a feed (e.g., the node is configured to look for the feed, a service the node is running wants access to the feed), the node will look for the feed in its records or interrogate the network. In one embodiment, the node interrogates the network by broadcasting a WANT message for at least one CID. In one embodiment, the WANT message is broadcast to peer nodes. In a preferred embodiment, the peer nodes broadcast the WANT message to their peer nodes for a configurable number of hops.

Figure 23:
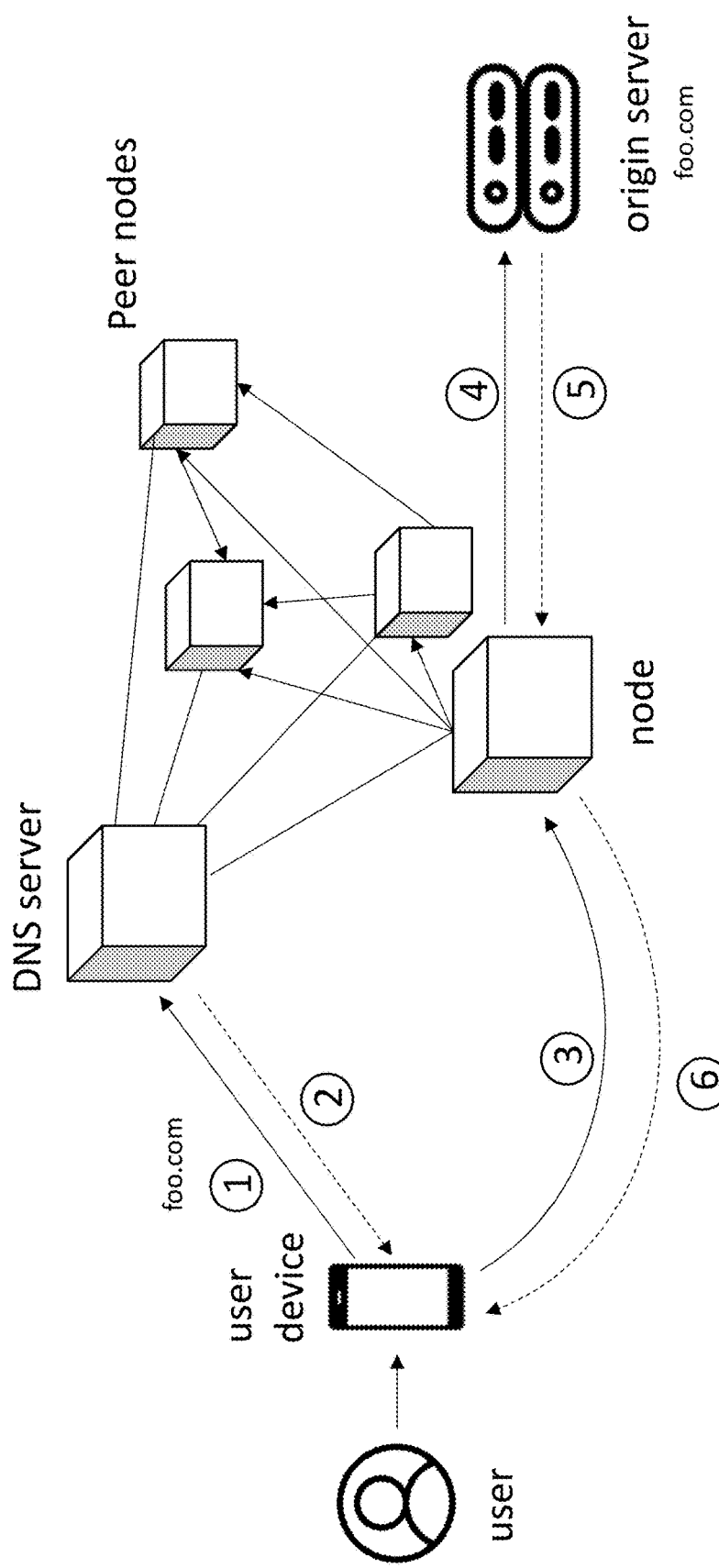
FIG. 23 illustrates one embodiment of a content delivery network.

As previously described, in one embodiment, the system provides a content delivery network as shown in FIG. 23. HTTP responses are cached at the edge of the network, which provides the responses faster and with lower latency and high bandwidth. A user enters a URI (e.g., foo.com) into a user device. The user device makes a DNS query to the URI (Step 1). In one embodiment, an administrator points the URI at least one DNS server. The at least one DNS server is operable to be on any node that is configured to be a DNS server. The DNS server geolocates an IP address of the user device to determine a nearest node. In one embodiment, the user device communicates the IP address directly to the DNS server. Alternatively, the IP address is communicated to the DNS server via an intermediary resolver, which includes a subnet for the user device. The nearest node is geographically proximal to the user device. An IP address for the nearest node is transmitted to the user device (Step 2).

The user device makes an HTTP connection to the nearest node (Step 3). The nearest node determines if the HTTP request is already in the cache or if the HTTP request is operable to be resolved using peer nodes. If the HTTP request is operable to be resolved by the nearest node (with or without the use of peer nodes), a response is returned to the user device (Step 6). If the HTTP request cannot be resolved by the nearest node, the content is fetched from the origin server (Step 4), cached (Step 5), and returned to the user device in near real time (Step 6).

Figure 24:
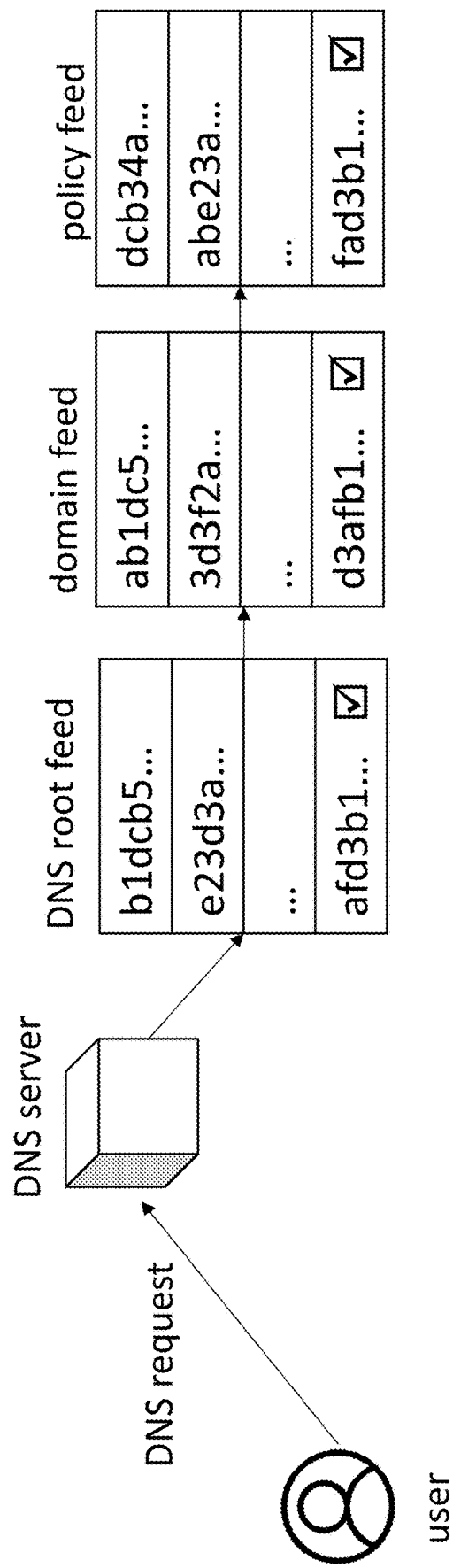
FIG. 24 shows additional details of the DNS request in FIG. 23.

FIG. 24 shows additional details of the DNS request in FIG. 23. A DNS request goes to a DNS server, which is operable to be any node in the distributed edge computing platform. The DNS server looks for a DNS root feed and traverses the DNS root feed to find the domain in question (e.g., foo.com). If the domain is found in the DNS root feed, a domain feed for the domain is searched and a policy is found for the desired page (e.g., proxy, deny, redirect, cache, return content not found). The policy is configurable by an administrator, and is synchronized across the content-addressed data network on the root feeds. A response to the DNS request is sent by the DNS server in near real time.

Figure 25:
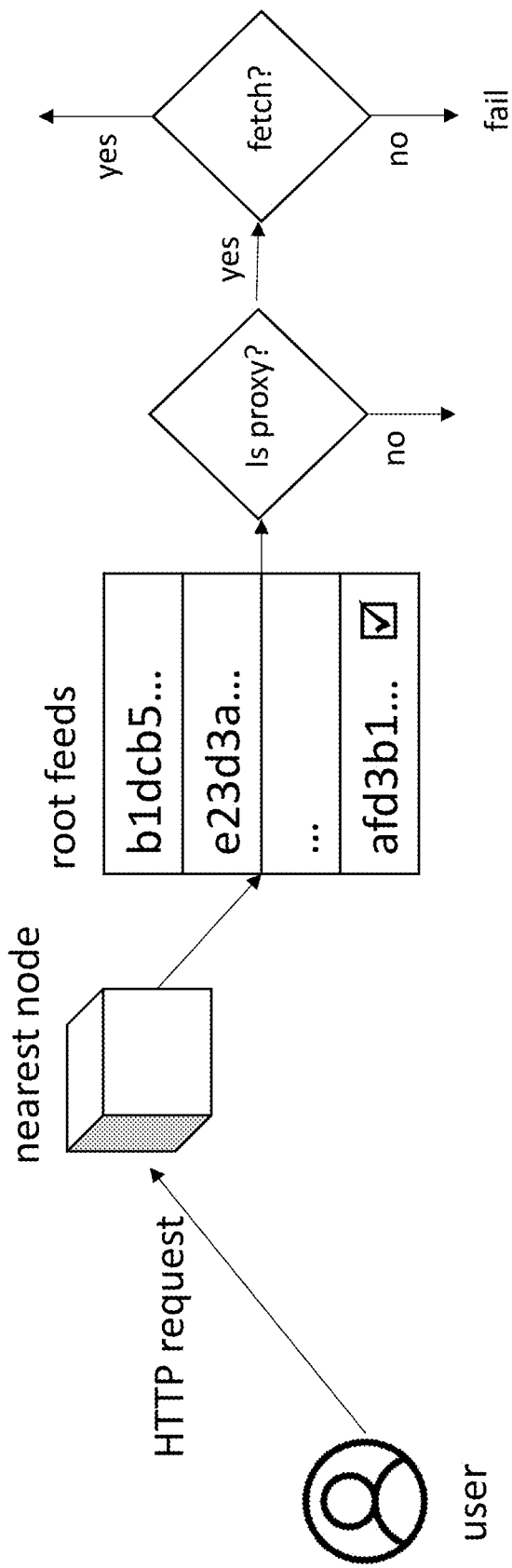
FIG. 25 shows additional details of the HTTP request in FIG. 23.

FIG. 25 shows additional details of the HTTP request in FIG. 23. The user device issues an HTTP request to the nearest node. The nearest node compares the CID embedded in the URI and looks up the root feed for the CID. The nearest node determines a type of request (e.g., proxy, function, etc.). The nearest node includes a policy engine in communication with the message bus. The nearest node returns the content associated with the CID to the user according to the policy.

Figure 26:
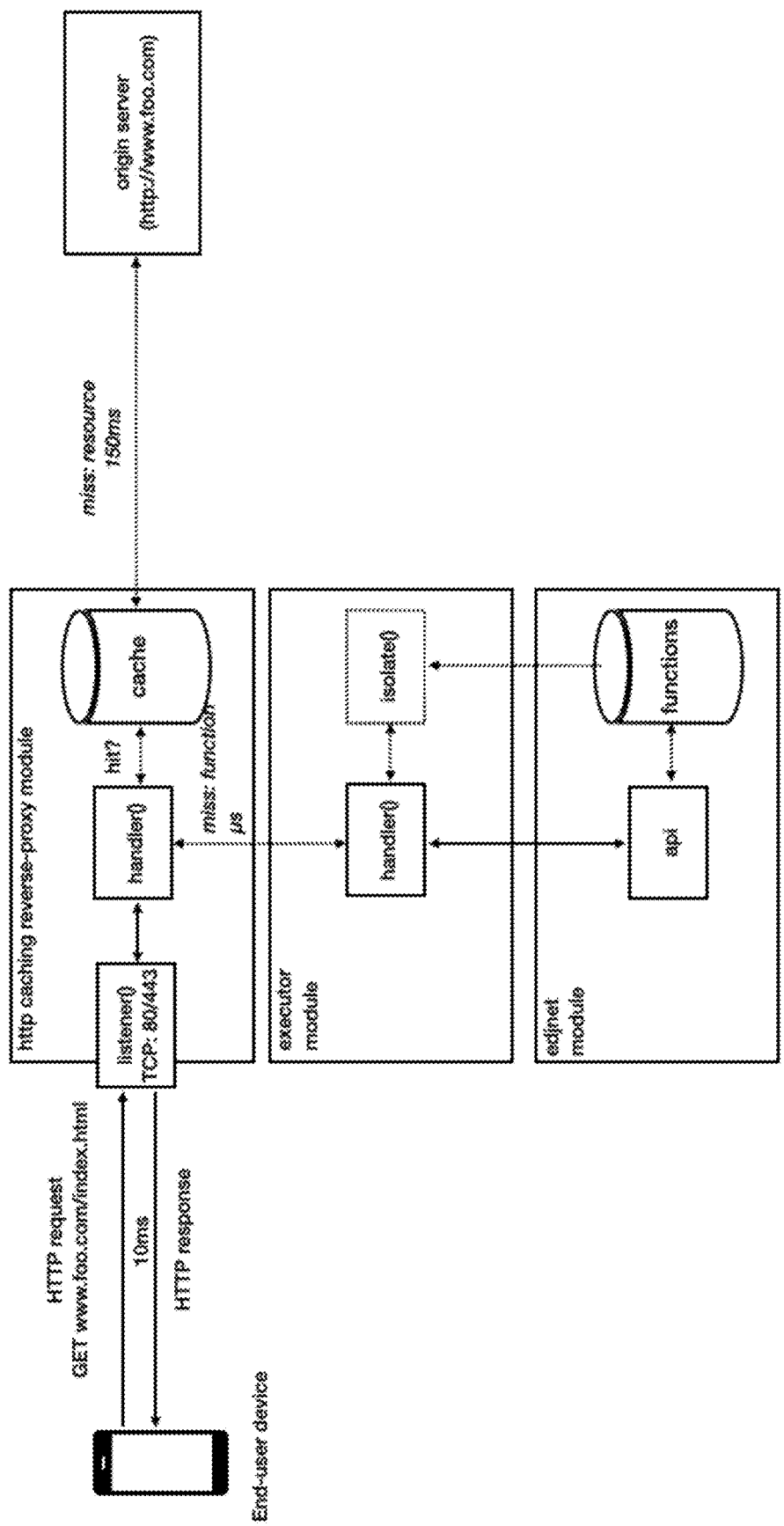
FIG. 26 illustrates additional details of the content delivery network.

Modern web and mobile applications are standardized on HTTP and REST architectures. IoT applications use many protocols, but the trend is toward standardizing on HTTP (~50% use) and MQTT (~50% use). Applications are starting to be built using the serverless paradigm, where function execution is pushed to the edge of the network and triggered by HTTP requests. Therefore, a critical feature of the present invention is that the platform is operable to accelerate HTTP applications and content delivery due to proximity, local execution, caching, and reverse proxy as shown in FIG. 26.

Proximity: Firstly, terminating HTTP sessions nearby to end-users and devices. Because HTTP uses TCP, simply terminating connections to a low-latency endpoint accelerates HTTP due to TCPs inherent slow start and congestion control features. In a preferred embodiment, the HTTP request is routed to the nearest node based on a geolocation of the user device.

Local execution (serverless): In the case of serverless computing, the intent is to execute a function as close as possible to the HTTP endpoint and return a response as fast as possible.

Caching: In the case of non-serverless requests (i.e., ordinary HTTP resource requests), it is desirable to deliver data from a locally cached copy when possible as in RFC 7234—Hypertext Transfer Protocol (HTTP/1.1): Caching, June 2014, which is incorporated herein by reference in its entirety.

Reverse-proxy: In the case of a non-serverless request and a cache miss, it is necessary to fetch the resource from the origin server as in RFC 3040—Interenet Web Replication, January 2001, and Caching Taxonomy and RFC 1919—Classical versus Transparent IP Proxies, March 1996, each of which is incorporated herein by reference in its entirety.

Figure 27:
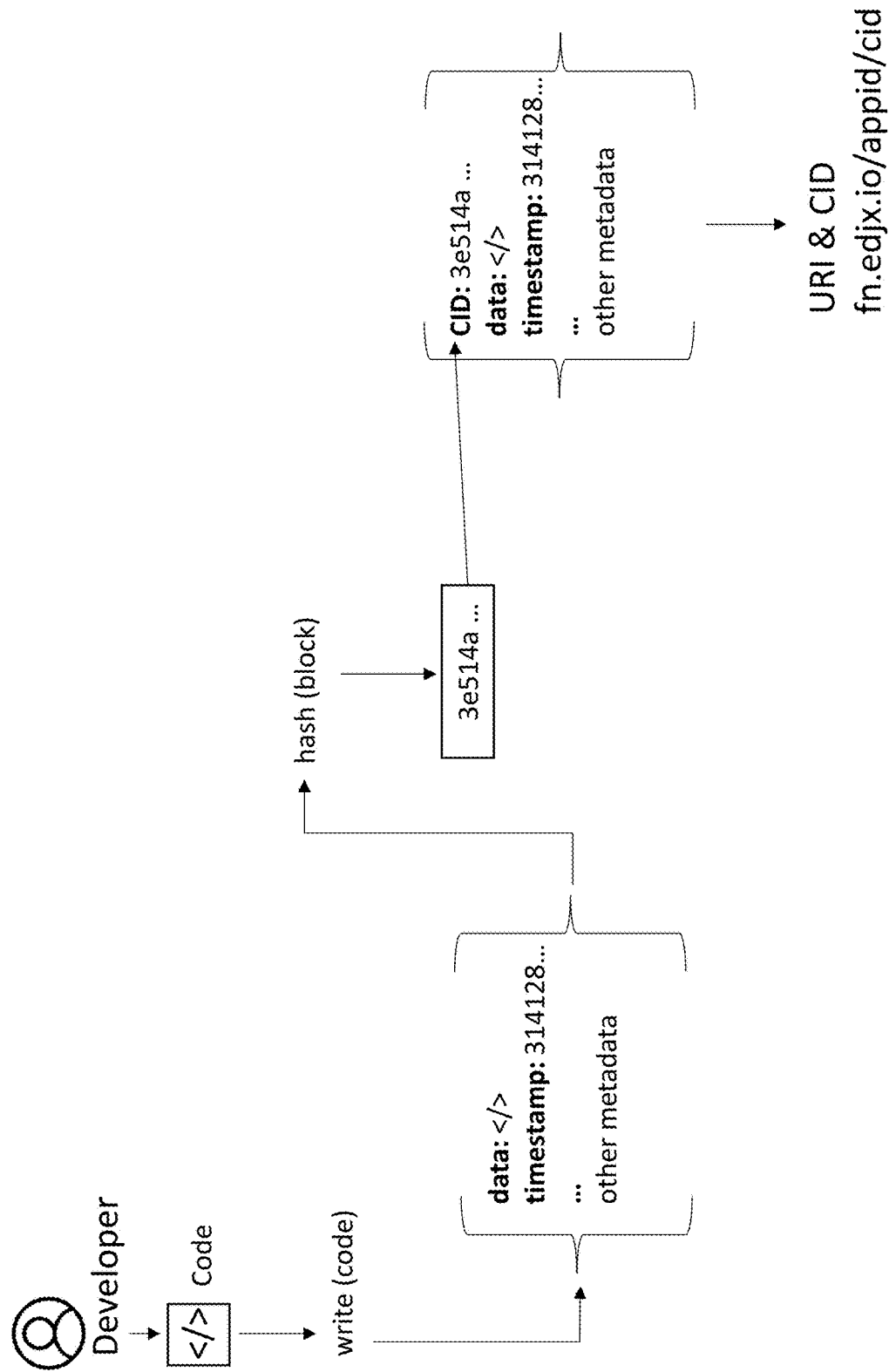
FIG. 27 illustrates one embodiment of serverless computing using the present invention.

FIG. 27 illustrates one embodiment of serverless computing using the present invention. A developer generated a public key and private key pair, CSR, and certificate as described in FIG. 18. The developer authors code and writes the code to the network. A uniform resource indicator (URI) with an application (app) ID and CID are returned. The block is written as described in FIG. 16. The existence of the block is gossiped over the peer-to-peer network and individual nodes decide to cache or not cache the block.

Figure 28:
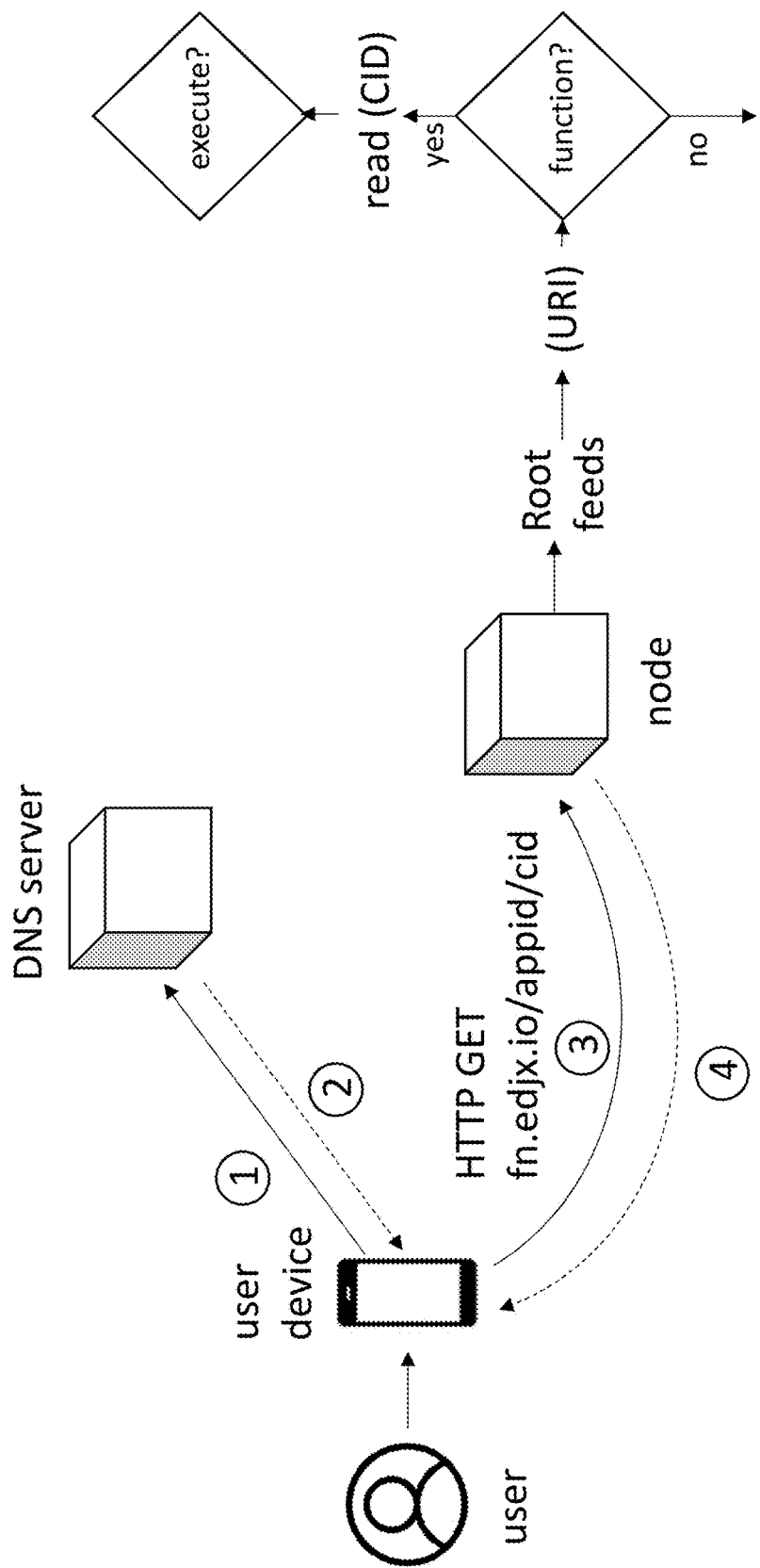
FIG. 28 illustrates one embodiment of executing a function using the present invention.

FIG. 28 illustrates one embodiment of executing a function using the present invention. The DNS server returns the nearest node as previously described in FIG. 24. An HTTP request for the function is sent to the nearest node. The nearest node dereferences the CID, app ID, and URI using the root feeds. The nearest node determines the policy associated with the HTTP request. If the nearest node determines that a function should be executed, the nearest node determines if it has the root block locally or if it needs to fetch the root block and all of its children before it can execute the function. The nearest node loads the function into a secure execution environment running on the node and runs the function end to end. A result of the running the function end to end is written into the content-addressed data network as blocks.

DNS services include, but are not limited to, routing and/or delegating authority. In one embodiment, the platform responds to DNS requests using at least one DNS metric. In one embodiment, the at least one DNS metric includes, but is not limited to, geospatial proximity, performance, and/or availability. The platform is preferably operable to dynamically direct clients to edge nodes. In one embodiment, the platform is operable to delegate DNS authority to the content-addressed data network to disseminate DNS information and routing rules to the global network.

Content-addressed data network nodes coordinate dynamically to deliver cloud services at the far-edge of modern communication networks, across a range of hardware platforms (e.g., IoT, mobile, server, etc.). The content-addressed data network federates a diverse set of physical infrastructures to create a single, global data network, in which data is securely persisted and replicated with assured integrity. Working together, nodes on the distributed edge computing platform deliver cloud services over standard protocols and interfaces.

Advantageously, the distributed edge computing platform of the present invention provides increased responsiveness, improved agility, simplified operations and increased data integrity. The distributed edge computing platform enables proximal data processing and computation in order to reduce application latencies and increase responsiveness. Building decentralized applications with the distributed edge computing platform of the present invention enables near real-time data fusion and algorithms to work seamlessly across a plurality of connected devices.

Additionally, the distributed edge computing platform of the present invention helps developers build distributed applications at planet-scale. All serverless functions are stored on the content-addressed data network as content-addressed data blocks and opportunistically disseminated among the plurality of the content-addressed data network nodes. There is no software to deploy or maintain on edge computing nodes. As a result, deploying functions, cache purges, and/or rolling back or forward between versions of serverless functions are nearly instantaneous.

In a preferred embodiment, every node in the distributed edge computing platform is designed for zero-configuration and all nodes are essentially identical. In one embodiment, the distributed edge computing platform dynamically allocates and schedules resources based on individual node capabilities without operator intervention. Advantageously, this allows developers to focus on building critical functionality because there are no infrastructure dependencies or complex orchestration systems to manage.

The content-addressed data network of the present invention provides self-verification through CRDTs together with data notarization technology to increase the integrity of data, preventing the introduction of misleading or erroneous data (whether accidental or deliberate). The data notarization technology provides federated data for data authentication and integrity. As used herein, "notarization" refers to any authentication process provided by the present invention.

As previously described, in location-address storage systems, a unit of data may be identified by a Uniform Resource Identifier (URI), which may include the DNS network name or internet protocol (IP) address of the storage device, as well as the location of the data on the storage device. This means that resources necessarily end up being centralized on a server or on a set of servers on the Internet. This also means that the party who owns the server has ultimate control over the data in question.

It is difficult to make guarantees about the durability or the integrity of data. On a centralized infrastructure, like the cloud, this is done by creating multiple replicas of the data across multiple physical servers and locations. Additionally, when resources are centralized, the integrity of the data itself is only as reliable as the infrastructure hosting the resource. When a resource is located by location, there is no inherent guarantee that the resource contains the expected data, or that the data in question has not been tampered with by a third party.

Furthermore, the resource's location may not be optimal for a particular purpose. For example, the resource may be on the set of a remote server that is too latent or without enough bandwidth.

One solution is to change the way that resources are addressed. Resources can be located based on a unique identifier and the network can bring content to users, rather than user directing themselves to the location of the data. This is known as content-based addressing.

In content-based addressing schemes, resources are located by a unique identifier that has a mathematical relationship to the content. For example, a cryptographic hash of the content or data itself is operable to be used as a resource identifier. Then, any server or infrastructure is operable to maintain a copy of the resource. A cryptographic checksum allows users to be certain that the data received is as intended.

Content-based addressing can be understood using a simple analogy. If an individual wants to retrieve a particular book from the library and asks for the particular book by title, and then the library gives the individual a street address of another library that has the particular book. The individual must then go to the other library and retrieve the book in question. This is location-based addressing.

Books are identified by an International Standard Book Number (ISBN) number. The ISBN number is uniquely associated with the title in question. In effect, it is content-based addressing. Anytime the ISBN number is requested, the particular book that is desired will be received.

If libraries used cryptographic checksums of books instead of ISBN numbers, users could also be certain that the content of the book had not changed since it was originally published. However, being certain that the data in question matches a cryptographic checksum does not guarantee data integrity. How do users know that a nefarious actor did not write a different book and give users the wrong checksum matching the nefarious actor's content (as in a man-in-the-middle attack)?

In the real world, whenever it is desired to guarantee the integrity of data, delegated hierarchies of trust are used. A practical example of a delegated hierarchy of trust is a notary public. With a notary public, a trusted entity (i.e., the government) maintains a registry of parties whose responsibility it is to witness certain data. When a notary is engaged, individuals present the notary with a piece of data and asks them to sign it using their delegated authority of trust. The notary affixes their seal to the original document, guaranteeing its authenticity.

In the digital world, similar needs exist. For example, a remote piece of equipment sitting at the edge of the network may want to persist data into the rest of the network. Users may want to trust the authenticity and integrity of this data, so that the users can use it to make better decisions, or decisions in real time that affect the status of the real world.

Additional information regarding edge computing systems is available in U.S. application Ser. No. 16/809,181, filed Mar. 4, 2020, U.S. application Ser. No. 16/831,047, filed Mar. 26, 2020, U.S. application Ser. No. 16/831,069, filed Mar. 26, 2020, U.S. Provisional Application No. 62/813,839, filed Mar. 5, 2019, U.S. Provisional Application No. 62/838,666, filed Apr. 25, 2019, U.S. Provisional Application No. 62/838,733, filed Apr. 25, 2019, and U.S. Provisional Application No. 62/930,282, filed Nov. 4, 2019, each of which is incorporated herein by reference in its entirety.

Additional information regarding content addressable storage and/or data integrity is available in U.S. Patent Publication No. 20190036764, U.S. Patent Publication No. 20200125604, U.S. Pat. Nos. 9,880,756, and 9,904,603, each of which is incorporated herein by reference in its entirety.

The distributed ledger is a distributed service that runs on each and every node of the peer-to-peer network. On the peer-to-peer network, each node is identified uniquely by a cryptographic hash that is generated from the node's public-key. In other words, nodes themselves use content-based addressing. In one embodiment, a node is initialized by creating a cryptographic key pair (i.e., public and private key). In another embodiment, the cryptographic key pair uses an Ed25519 digital signature. Keys are stored on persistent media and are not regenerated. In one embodiment, the node identity is a multihash of the public key encoded as base58. In another embodiment, the node identity uses a secure hash algorithm 2 (SHA-2) (e.g., SHA-256).

In one embodiment, the system includes a plurality of node types including, but not limited to, a greedy node, a non-greedy node, a bootstrap node, and/or a super node. A greedy node is a node which is operable to store a large percentage or all of the content propagated on the peer-to-peer network. A greedy node is typically a large node with significant storage capacity. A non-greedy node is a node that is not interested in storing all of the content propagated on the peer-to-peer network. In one embodiment, a non-greedy node is only interested in storing content for which the non-greedy node receives frequent requests. In one embodiment, non-greedy node has a non-significant and/or a more limited storage capacity. A bootstrap node is a special node to which all other nodes on the peer-to-peer network connect to and register with when added to the peer-to-peer network. In one embodiment, the bootstrap node shares with each node its list of peers based on the node's registered geolocation. A super node is a node that is a greedy node and provides additional capabilities of a bootstrap node.

Nodes discover each other by broadcasting their unique identifiers to the local network, or otherwise registering themselves on a centralized registry that is predefined or discoverable. Nodes join the network by connecting to peer nodes, either in their local vicinity or by connecting to super nodes that are discoverable. Each node listens for MDNS queries for a host (e.g., 'edjx'). Nodes first search for peers on the local broadcast network by issuing a MDNS query for the host. The nodes are configured to reply to MDNS queries for the host unless they have already replied in a configurable time window. All hosts on the network observe the MDNS replies for the host, and add new peers to their peer lists for connection.

Bootstrap nodes are hosted by the host (e.g., edjx) or customers in their private environments. Bootstrap nodes are discovered by issuing a DNS query for text (TXT) records to the configured bootstrap domain. For example:

edjx.network. 300 IN TXT "edjx-bootstrap=204.181.40.44"
edjx.network. 300 IN TXT "edjx-bootstrap=190.11.20.191"

Nodes connect first to peers on the local area network discovered through MDNS. The nodes optionally connect to at least one bootstrap node.

The connection negotiation sequence begins with a handshake. In one embodiment, the handshake is an elliptic curve Diffie-Hellman handshake. In another embodiment, the handshake uses an Ed25519 key pair. In yet another embodiment, the handshake uses authenticated encryption with associated data (AEAD). In one embodiment, the AEAD is AEAD advanced encryption standard (AES) 256. In still another embodiment, the handshake uses an Ed25519 key pair followed by AEAD AES 256. Each node enforces the handshake policy by rejecting peers that do not comply.

Nodes authenticate through the use of a pre-shared key after connection setup using an AUTH message. When a peer passes an invalid key to the AUTH message, the node hangs up the connection.

When nodes have successfully connected to appear and are authenticated, the nodes are eligible to send and receive protocol commands. The protocol commands include, but are not limited to, HAVE, WANT, PUT, GET, and SIGN.

After successful connection, peers begin by exchanging JOIN messages for topics the peers are interested in. The default topics include, but are not limited to, network related messages (NET) (e.g., ENTER, EXIT), messaging relating messages (MSG) (e.g., JOIN, LEAVE), application related messages, and/or data related messages (DAT) (e.g., WANT, HAVE). LEAVE messages allow a node to leave a topic. ENTER messages show that a peer nodeid has connected to the node. EXIT messages show that a peer nodeid has disconnected from the node.

Following transmission of JOINS to the peer, the peers exchange HAVE messages. HAVE messages are retransmitted to all connected peers. HAVE messages each consist of a multihash keys in the peer's datastore for a given block. After initial connection, HAVE messages are sent whenever a new block is added to a peer's datastore. HAVE messages are gossiped to all nodes from which a JOIN to DAT has been received.

Following transmission of HAVEs, the peers exchange WANT messages. These are blocks the peer is looking for. WANT messages are retransmitted to all peers. When a node receives a WANT message, it checks its datastore for a block with the associated key. When a key is found, the peer WHISPERs a HAVE message to the requesting node. WANT messages are gossiped to all nodes from which a JOIN to DAT has been received.

A GET message is a request for data stored at a key. A PUT message is a request to save data at a key. A STAT message is a status request for a key.

WHISPER messages are gossiped to peers from which an ENTER message for a connected node has been received. WHISPER messages are gossiped to peers from which a JOIN to NET has been received, and for which a route to nodeid is present.

SHOUT messages are gossiped to peers for whom a JOIN message has been received for a given topic. SHOUT messages are retransmitted to peers from which a JOIN message has been received for a given topic.

An ENTER message is gossiped to all peers whenever a connection is made to a new peer. ENTER messages that are received are retransmitted to all peers.

An EXIT message is gossiped to all peers whenever a connection to a peer is terminated. EXIT messages that are received are retransmitted to all peers.

Request-response messages are blocking messages to a given peer. Nodes handle routing messages to peers by initiating connections to the target peer. Because these messages may be blocked, a new connection may be initiated or a new connection may be negotiated within the message for long running operations (e.g., PUT, GET, SIGN). In another embodiment, messages are WHISPERed or gossiped (e.g., GET, PUT) such that the network routes the messages to the destination node.

When a PING message is received, the node replies with a PONG to the peer. A PONG is sent in response to a PING message on a given connection to a peer.

A GET message sends the peer a block associated with key; otherwise, an empty response of size zero is sent. A STAT message sends the peer the (struct) stat of the block for a given key. A PUT message receives a block associated with a key from a peer unless HAVE block.

A SIGN key message requests a node sign (i.e., notarize) a block. The message contains the hash of a data the requestor wants to be signed. For example:
{
  "Id": "string" //id of the request, usually a hash of the current data
  "hash": "string"
}

When a SIGN message is received, a block associated with a key is looked for, and then the block is digitally signed using a private key. The SIGN message receives a SIGNED reply message. For example:
{
  "Id": "string" //id of the request, usually a hash of the current data
  "signature": "string"
  "publicKeyBase58": "string"
}

As previously described, in a content-addressed storage (CAS) system, a unit of data is assigned a globally unique identifier which is derived from the content of the unit of data itself, and the unit of data is accessed using this unique identifier. In a decentralized content-addressed storage system, location information is exchanged dynamically between storage devices on a network, permitting autonomous ad-hoc access to the unit of data. For example, the unit of data may be provided as the input to a hashing function, the resulting hash of which is used as the content-address of the unit of data. The unit of data is retrieved by the content-addressed storage system from the physical location based on the content address, and the unit of data is provided to the requesting computer.

Figure 29:
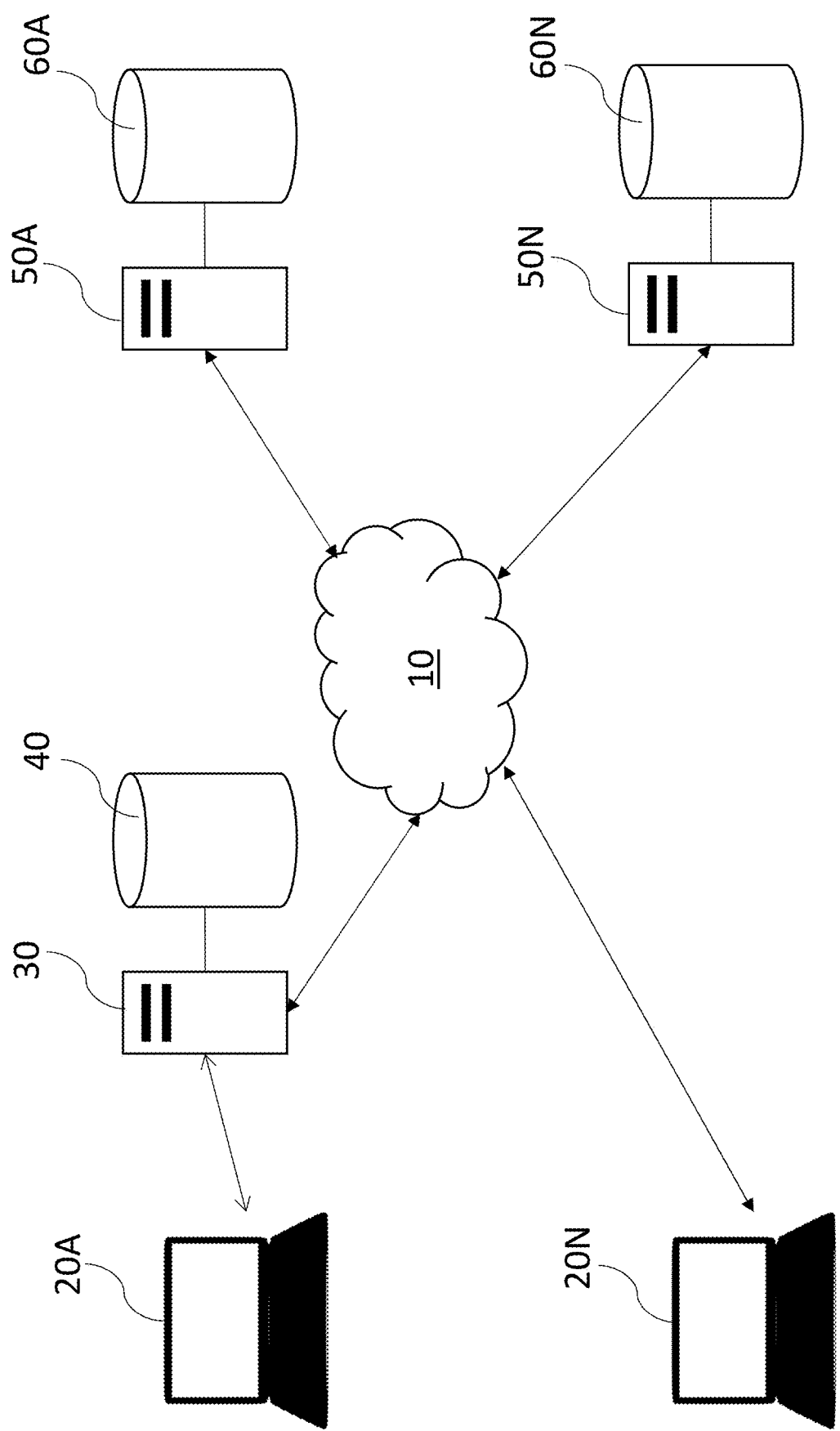
FIG. 29 illustrates a block diagram of one embodiment of a content addressable storage system.

FIG. 29 illustrates a block diagram of one embodiment of a content addressable storage system. A plurality of devices (e.g., computers, servers, etc.) are connected via a network (e.g., the Internet, an intranet, wired network, wireless network). The content addressable storage system includes a plurality of computers 20A-20N. A computer may connect directly to the network 10 (e.g., 20N), or a computer may be connected to the network 10 (e.g., 20A) via an application server 30. In one embodiment, the application server 30 is connected (e.g., wired, wirelessly) to an application database 40. The content addressable storage system includes a plurality of servers 40A-40N connected (e.g., wired, wirelessly) to a plurality of storage devices 50A-50N. The content addressable storage system is operable to store data to the plurality of storage devices 50A-50N. The data is accessed using a content addressing scheme.

Figure 30:
FIG. 30 illustrates an example of a content addressing scheme.

FIG. 30 illustrates an example of a content addressing scheme. The image is converted into raw data. A hash function (e.g., SHA256) takes the raw data and gives an output (i.e., the digest). The output (i.e., the digest) is then converted into a content identifier (CID). To retrieve the image, a user can search for the CID. Advantageously, the digest is unique. If a pixel is changed, the digest changes. This provides for a method of determining if the image has been tampered with. Additionally, the system provides security because only the image and CID are accessible to users.

Figure 31:
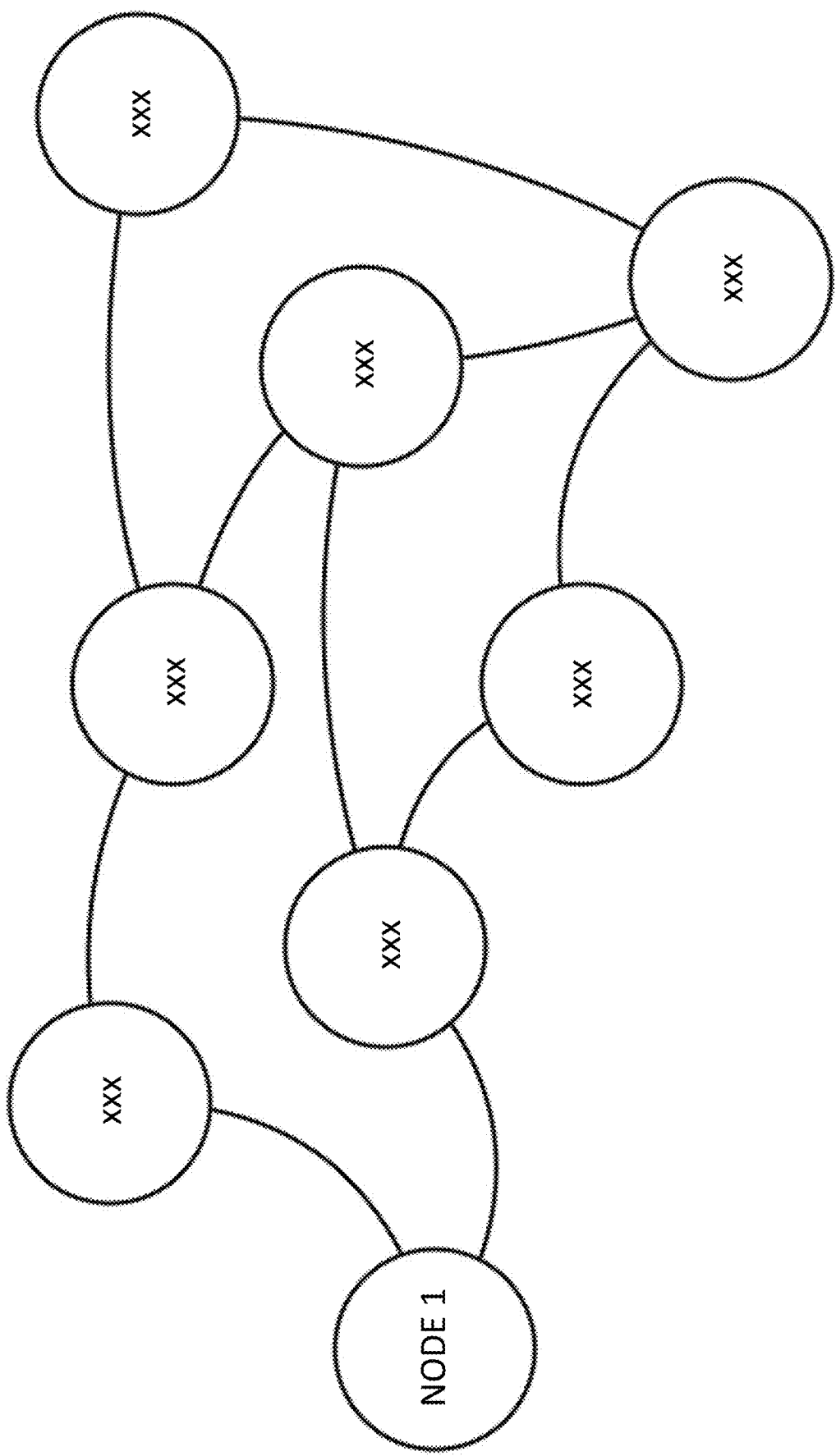
FIG. 31 illustrates a random peer-to-peer network topology.

FIG. 31 illustrates a random peer-to-peer network topology. The nodes form ad-hoc adjacency. Each node preferably has a unique global identifier. In a preferred embodiment, each node maintains a registry of all nodes in the form of data blocks, a registry of data blocks the node possesses or has learned from other nodes, and a number of data blocks which are persisted to the node. Nodes discover one another using a variety of methods, including, but not limited to, multicast Domain Name Server (DNS) and by establishing adjacency with predefined "super nodes". Communication between nodes is preferably encrypted using public key cryptography. One example of public key cryptography is S/Kademlia, which is detailed in I. Baumgart and S. Mies, "S/Kademlia: A practicable approach towards secure key-based routing," 2007 International Conference on Parallel and Distributed Systems, Hsinchu, 2007, pp. 1-8, doi: 10.1109/ICPADS.2007.4447808, which is hereby incorporated herein by reference in its entirety. Alternatively, communication between nodes is via encrypted transmission including, but not limited to, secure socket layers (SSL) and/or secure hypertext transfer protocol (HTTPS).

The nodes connect to each other and transfer objects called data blocks, which represent files and other data structures. When a node has established connections with a number of peers above a configurable threshold, it is eligible to generate new data blocks and disseminate the new data blocks through the network. Discovery and exchange of new data blocks is facilitated through a gossip-based protocol.

Advantageously, the nodes are operable to increase the integrity of the newly generated data blocks by having peer nodes "witness" the creation of new data blocks before they are disseminated to the gossip network. A new data block is instantiated that contains metadata about the data block and the data itself. The metadata includes node information, links to other data blocks (e.g., to facilitate the creation of complex data structures), and a number of cryptographic signatures and node identities.

In one embodiment, the metadata is also stored in a database, directory of files, XML, plain text, etc. In one embodiment, the metadata is searchable (e.g., in the database, plain text, etc.). In one embodiment, the metadata includes a pointer or reference to the content (e.g., file location, CID). In one embodiment, the metadata includes information including, but not limited to, author, creation date, file type, file name, structural metadata, title, abstract, keywords, permissions, data quality, data source, and/or file size.

Figure 32:
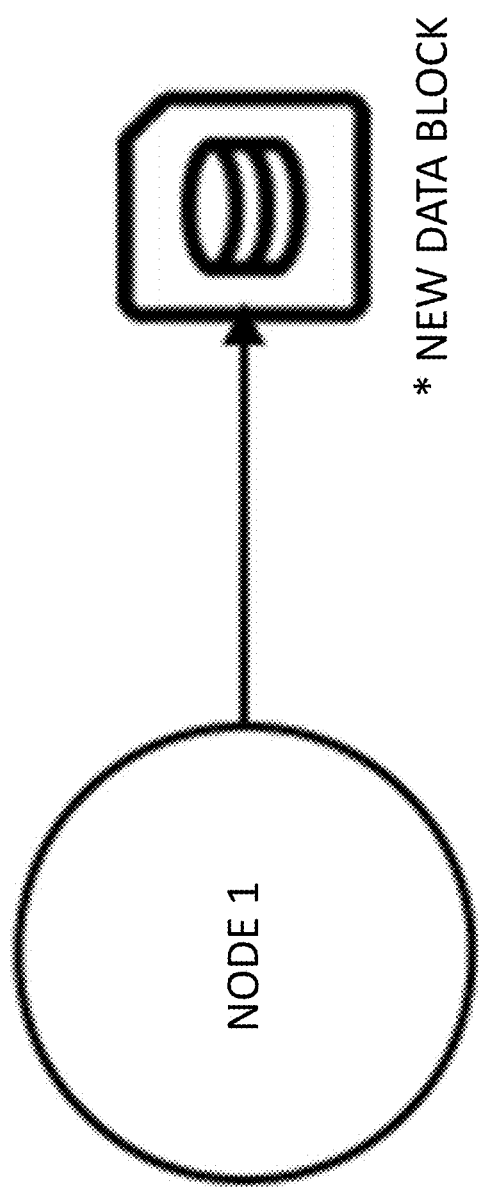
FIG. 32 illustrates generation of a new data block.
Figure 33:
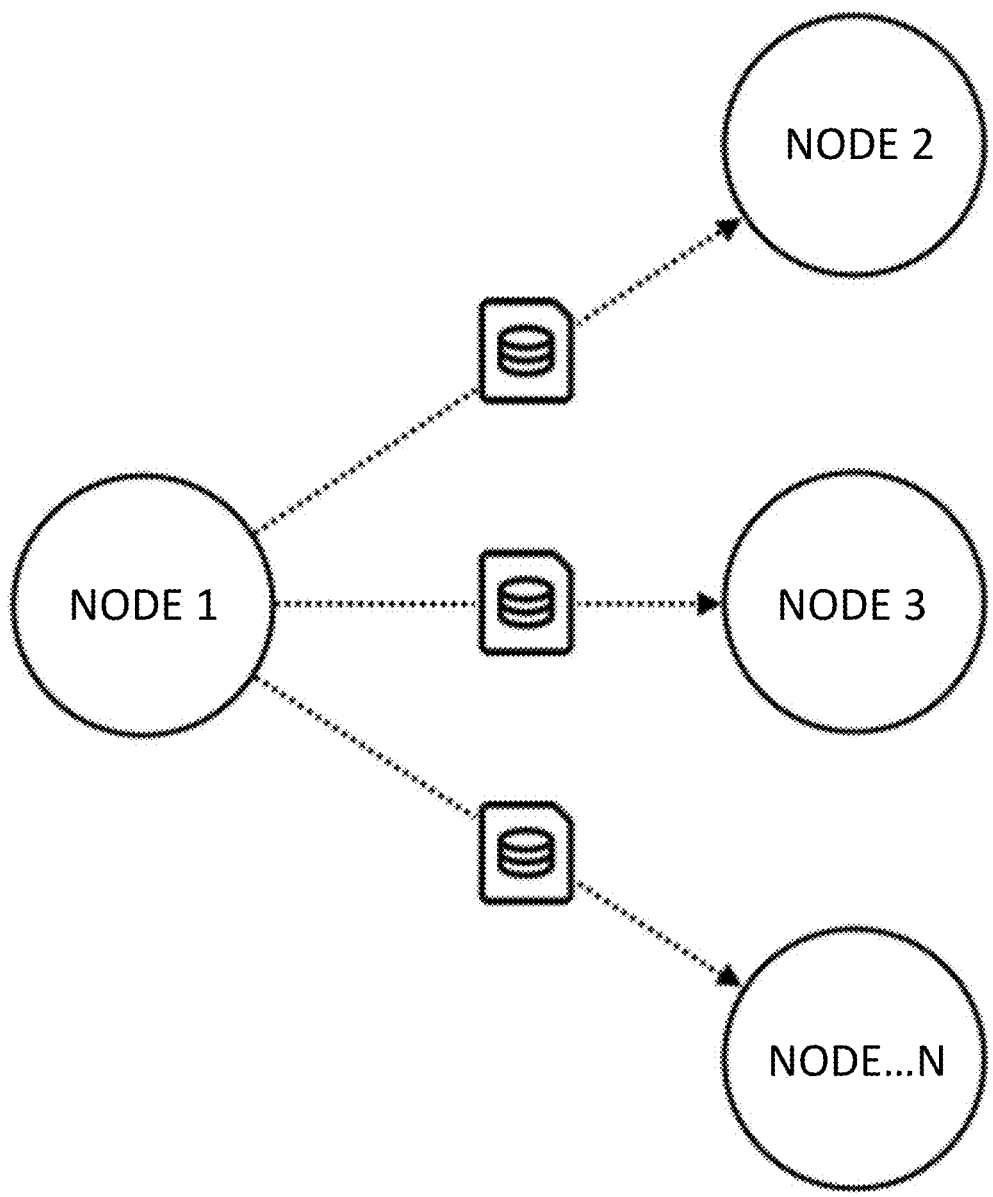
FIG. 33 illustrates a block diagram of one embodiment of a Phase 1 block generation and signature request.
Figure 34:
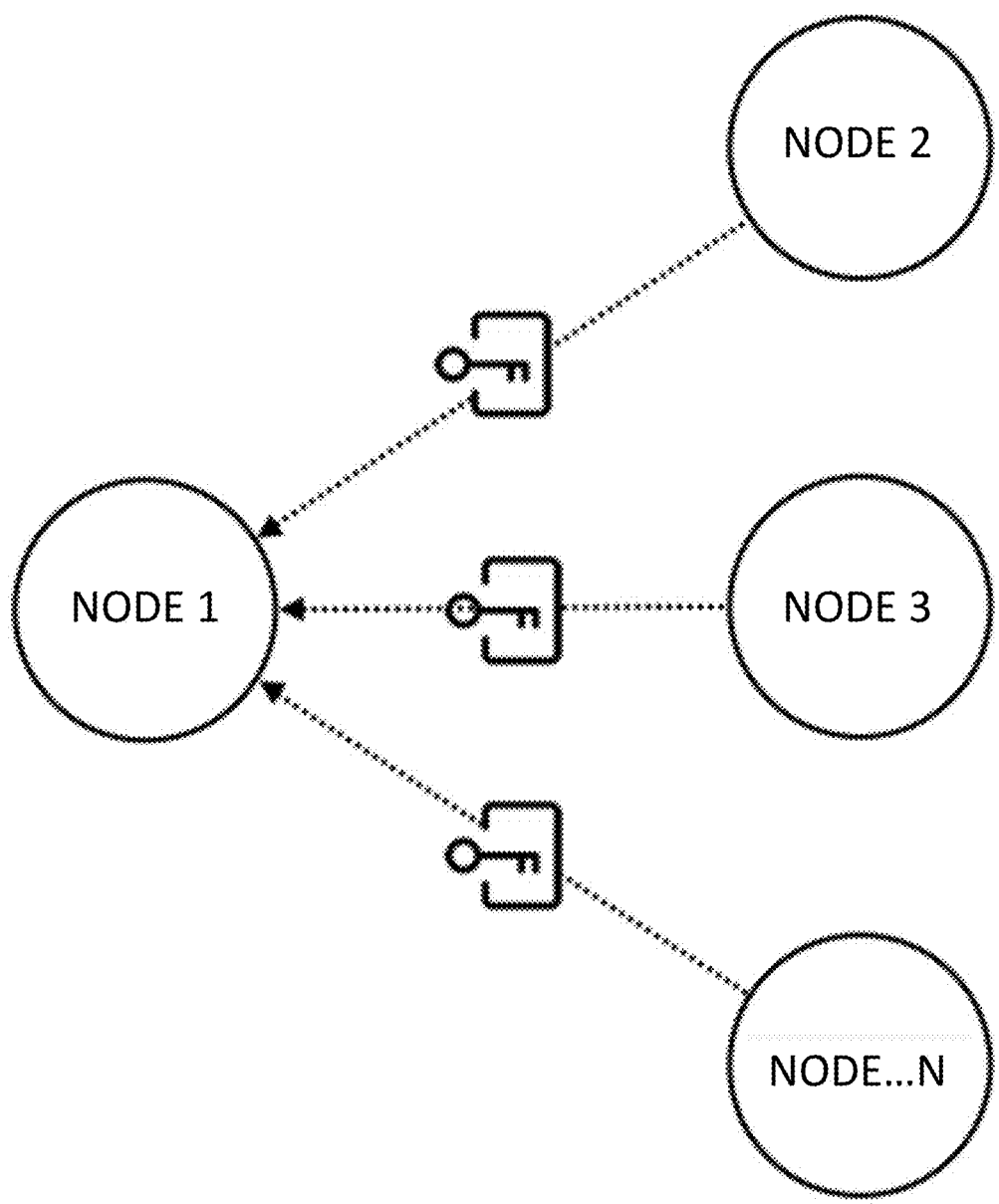
FIG. 34 illustrates a block diagram of one embodiment of a Phase 2 signature response.

Then a three-phase process begins when a node (e.g., Node 1) generates a new block (or the plurality of blocks that represent the data structure) in which are placed the data as shown in FIG. 32. Rather than gossiping the new data block to the network immediately in Phase 1, Node 1 increases the integrity of the data by having peer nodes witness the data block generation event. First, Node 1 randomly selects a configurable number of nodes (i.e., N nodes) from a set of connected peer nodes. A protocol command is sent to each node requesting the signature of the encapsulated data block as shown in FIG. 33. In Phase 2, each node responds to Node 1's signature request with an encoded digital signature of the data using its private key as shown in FIG. 34. In one embodiment, the encoded digital signature is an elliptic curve digital signature (e.g., Ed25519). Bernstein, D. J., Duif, N., Lange, T. et al. J Cryptogr Eng (2012) 2: 77. https://doi.org/10.1007/s13389-012-0027-1 details the Ed25519 digital signature and is hereby incorporated herein by reference in its entirety.

Figure 35:
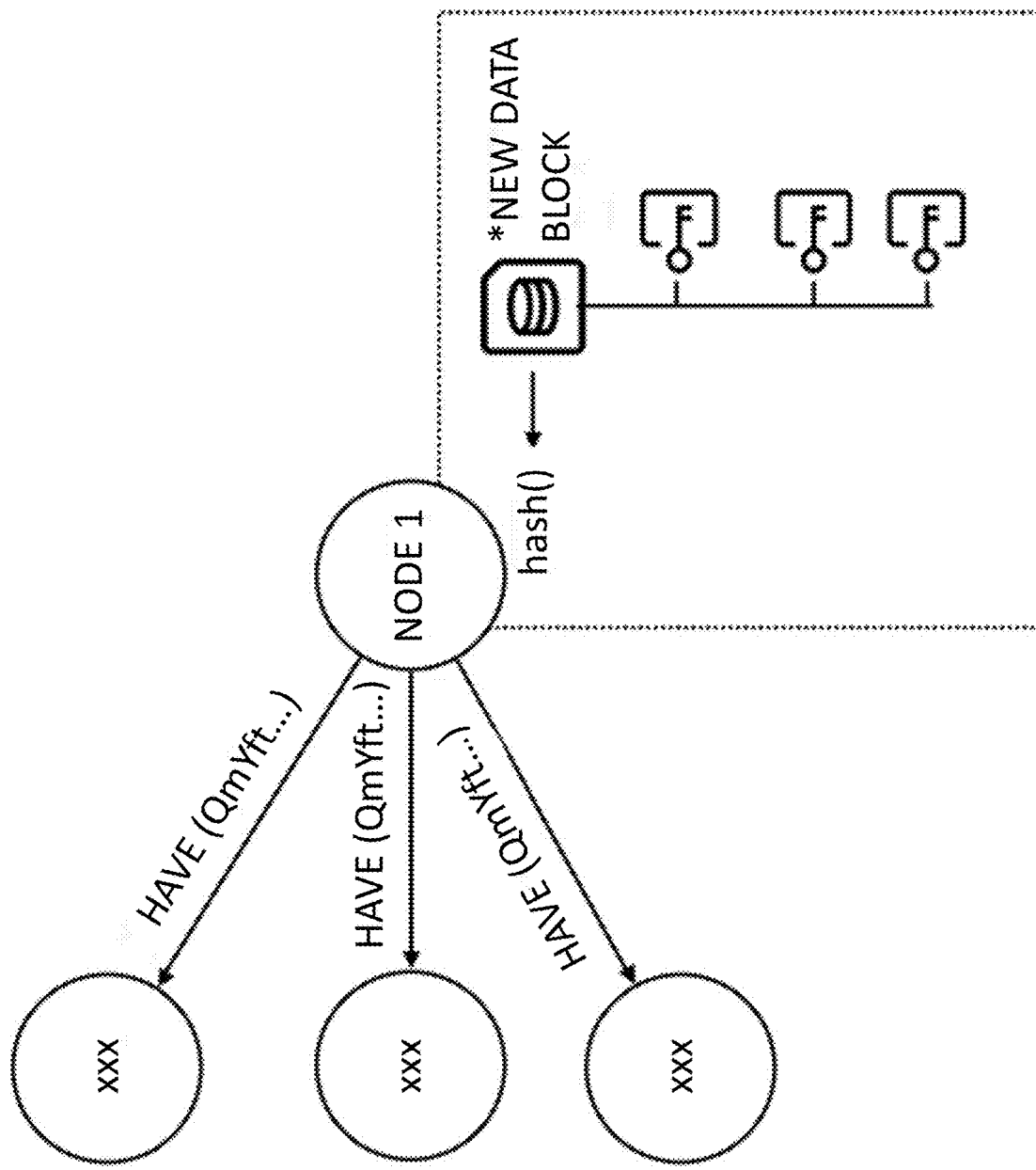
FIG. 35 illustrates a block diagram of one embodiment of a Phase 3 hash and gossip.

In Phase 3, Node 1 appends the digital signature from each witness node to the data block, then generates a cryptographic hash of the entire data block (e.g., including metadata, data, signatures, links), which is used as the identity of the block (i.e., content addressing). The block is then gossiped to a configurable number of peer nodes (e.g., N nodes) as shown in FIG. 35.

Each peer node in turn gossips the existence of the new data block, which is appended to each node's cache or registry of data blocks. Nodes that do not have the new data block are operable to request the block from Node 1 or from any node that stored the new data block. By default, nodes are "greedy" and attempt to retrieve new data blocks when the nodes learn about them. In the event of limited storage, greedy nodes are operable to purge at least one of the least recently used (LRU) data blocks in order to store the new data block. For example, a node purges a data block last accessed twelve months ago (i.e., an LRU data block) to store a new data block.

In one embodiment, a greedy node purges the at least one data block after a predetermined amount of time (e.g., one day, one week, one month, one year) has passed since the at least one data block was accessed. Additionally or alternatively, a percentage of storage capacity is monitored and a greedy node purges the at least one data block after a purging threshold storage level is reached (e.g., 50% capacity, 75% capacity, 80% capacity, 85% capacity, 90% capacity, 95% capacity). In another embodiment, a greedy node purges the at least one data block based on a size of the at least one data block and/or an age of the at least one data block. In one embodiment, the at least one data block is offloaded to another node and/or cloud storage.

A greedy node preferably has a storage capacity of at least 0.5PB. In one embodiment, the storage capacity of the greedy node is operable to be increased as the storage capacity is approached. In a preferred embodiment, the greedy node sends a message to an administrator after a notification threshold storage level is reached (e.g., 50% capacity, 75% capacity, 80% capacity, 85% capacity, 90% capacity, 95% capacity). The notification threshold storage level is preferably smaller than the purging threshold storage level, allowing the administrator to assess the storage capacity issues on the greedy node.

In one embodiment, storing data to a storage device and/or a cloud includes saving the file directly using an interface (e.g., content addressable storage interface), writing to a directory mirrored to the storage device and/or the cloud, writing to a file system interface that interfaces with the storage device and/or the cloud, etc. In one embodiment, mirroring includes storing a mapping of CIDs separately on the storage device and/or the cloud.

In one embodiment, the system is operable to send a notification (e.g., to an administrator) when a new file is saved to the storage device and/or the cloud. In one embodiment, the notification triggers a plurality of events that form an event flow (e.g., review file, approve file, etc.). In one embodiment, a status regarding at least one of the plurality of events is saved within the system. In one embodiment, the status is incorporated into a new data block with the original data, hashed, and saved to the storage device and/or the cloud. The new data block has a different OD than the original data block.

FIG. 36 illustrates an example block that consists of a data structure together with its cryptographic hash.

Figure 37:
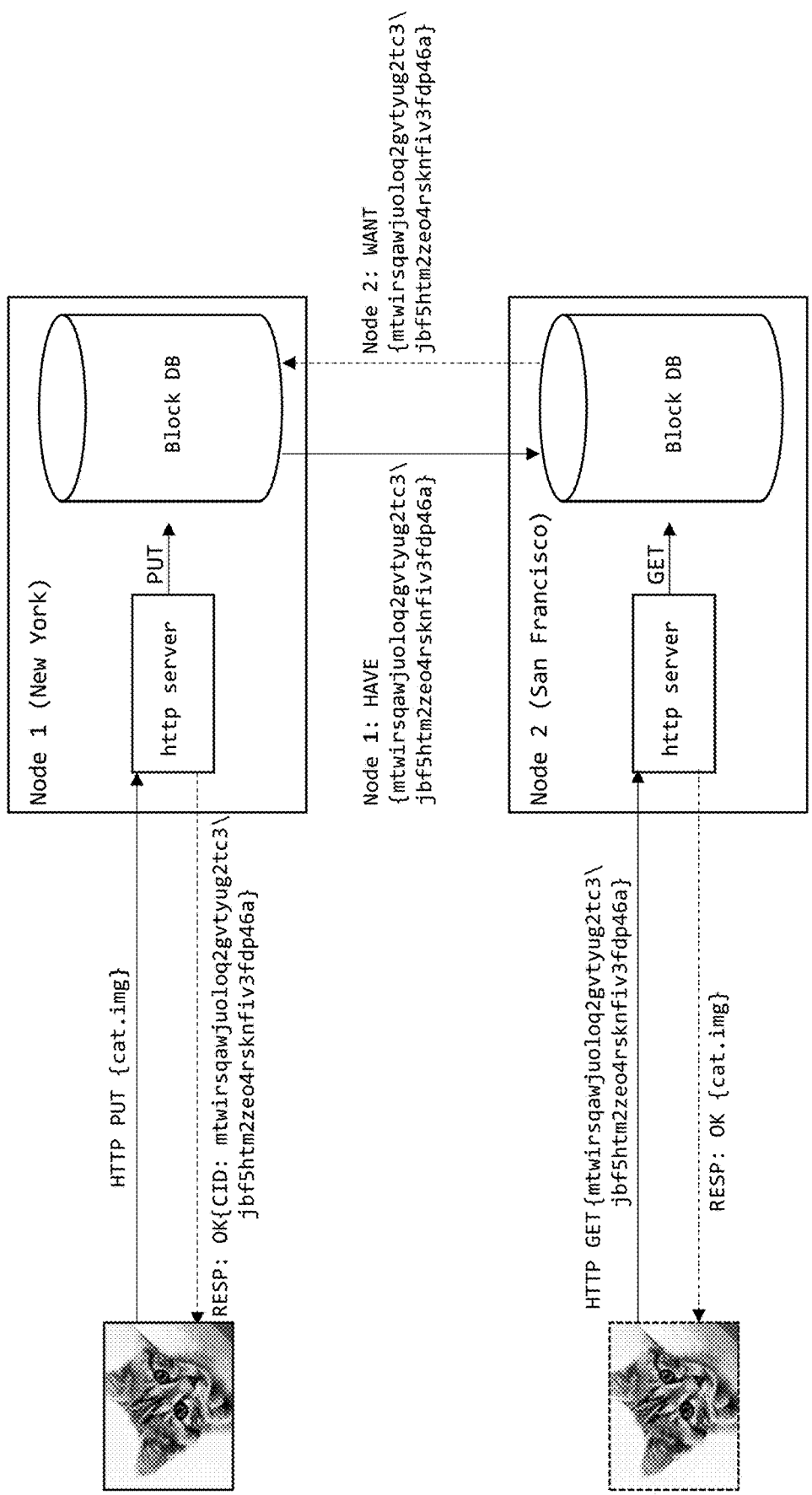
FIG. 37 illustrates an example of a PUT and a GET between two computers and two nodes.

FIG. 37 illustrates an example of a PUT and a GET between two computers and two nodes. A first computer (top) sends a PUT message regarding an image (i.e., cat.img) to an http server in Node 1, which is located in New York. The http server in Node 1 sends an OK response to the first computer with a CID and puts the image in a block database in Node 1 (e.g., via a PUT message). The block database in Node 1 sends a HAVE message to a block database in Node 2 with the CID. The block database in Node 2 then sends a WANT message to the block database in Node 1 with the CID. Thus, cat.img and the CID are stored in both the block database in Node 1 and the block database in Node 2.

A second computer (bottom) later sends a GET message with the CID to an http server in Node 2, which is located in San Francisco. The http server in Node 2 retrieves the image from the block database in Node 2 (e.g., via a GET message), and sends the image to the second computer with an OK response.

Each node is preferably operable to create, store, and/or retrieve a plurality of blocks at the same time. Alternatively, each node is operable to create, store, and/or retrieve a plurality of blocks sequentially.

Figure 38:
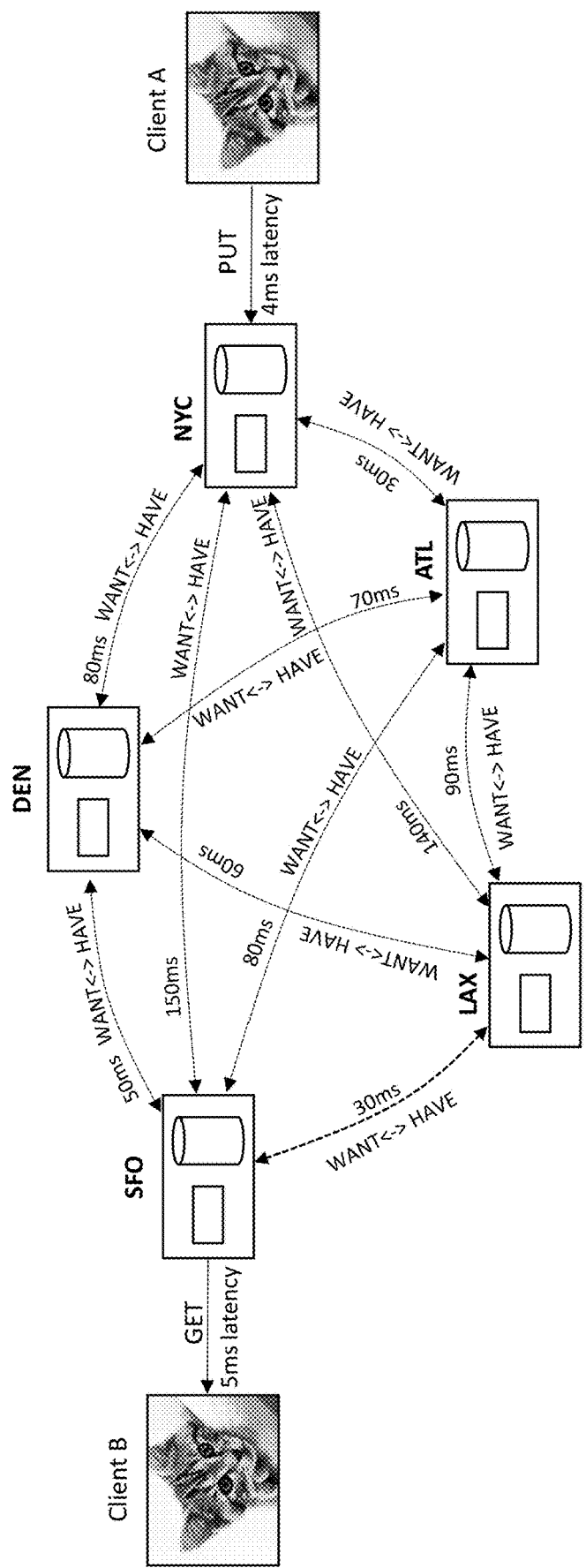
FIG. 38 illustrates an example of a PUT and a GET between two computers and a plurality of nodes.

FIG. 38 illustrates an example of a PUT and a GET between two computers and a plurality of nodes. This is similar to the example shown in FIG. 38, except there are a plurality of nodes. The plurality of nodes shown in FIG. 38 includes an NYC node, a DEN node, an ATL node, a LAX node, and an SFO node. A first computer (Client A) sends a PUT message regarding an image to the NYC node with a latency of 4 ms between the NYC node and the first computer. The NYC node sends a HAVE message with the CID to the DEN node, the ATL node, the LAX node, and the SFO node. The DEN node, the ATL node, the LAX node, and the SFO node each send a WANT message with the CID to the NYC node. There is a different latency between the NYC node the receiving node (e.g., 80 ms latency between the NYC node and the DEN node, 30 ms latency between the NYC node and the ATL node, 140 ms latency between the NYC node and the LAX node, and 150 ms latency between the NYC node and the SFO node).

The DEN node, the ATL node, the LAX node, and the SFO node then gossip the CID (e.g., via a HAVE message) to their connected nodes. For example, the DEN node sends a HAVE message with the CID to the ATL node, the LAX node, and the SFO node; the ATL sends a HAVE message with the CID to the DEN node, the LAX node, and the SFO node; and the LAX node sends a HAVE message with the CID to the DEN node, the ATL node, and the SFO node. Note that a direct path between two nodes is not necessarily the fastest path. For example, there is a lower latency traveling from the NYC node to the SFO node via the ATL node when compared to the direct route between the NYC and the SFO node. If the SFO node already has the image associated with the CID, the second computer is able to retrieve the image from the SFO node with a latency of 5 ms.

If the SFO node does not have the image associated with the CID (e.g., does not exist, gossip has not yet reached the SFO node), the SFO node contacts all connected nodes in parallel (e.g., the NYC node, the DEN node, the ATL node, the LAX node) with a WANT message to try to obtain the image. The SFO node then connects to a node that has the image associated with the CID that has the lowest latency to obtain the image.

Figure 39:
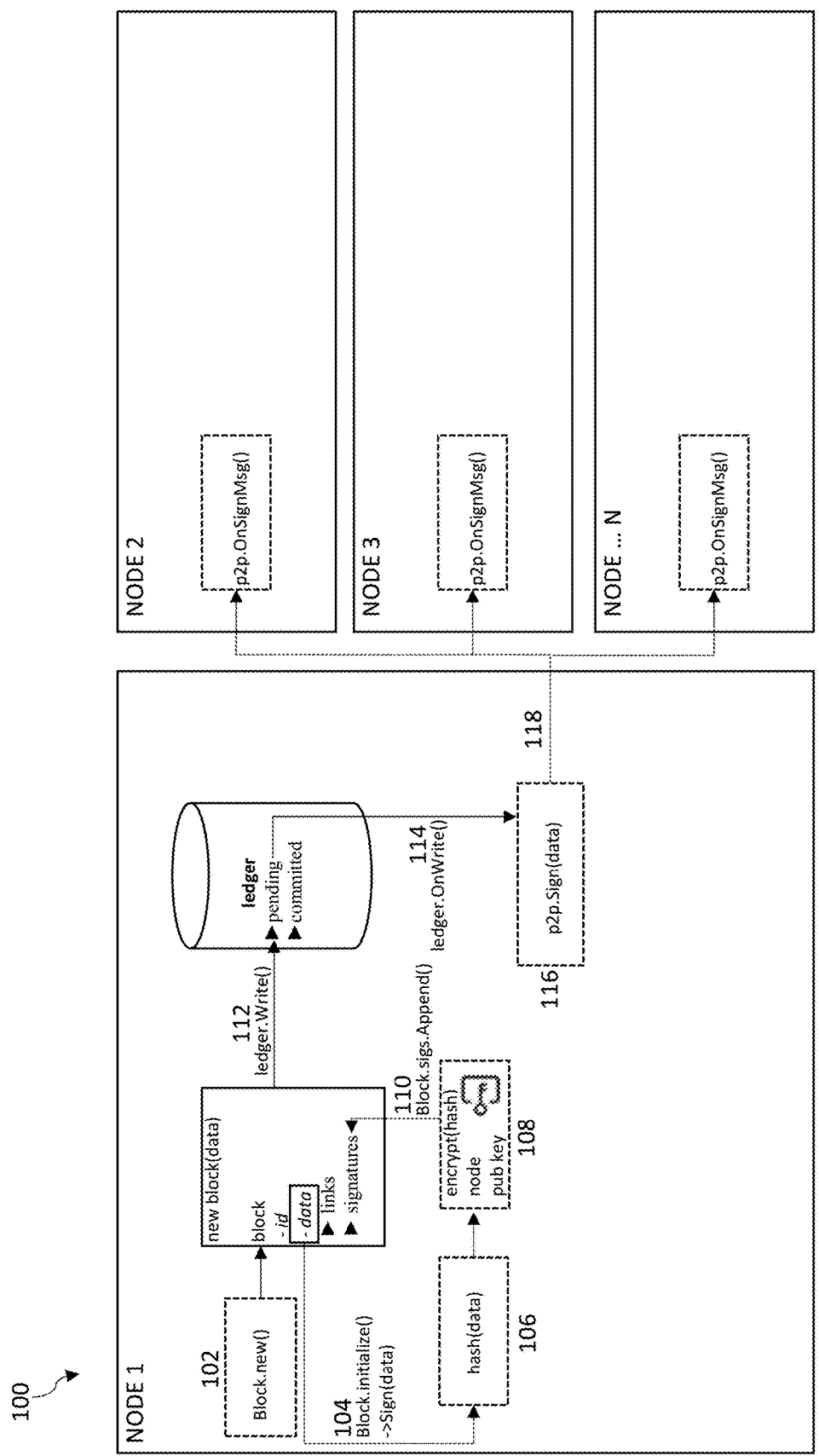
FIG. 39 illustrates one embodiment of Phase 1 of the commit process.

FIG. 39 illustrates one embodiment of Phase 1 of the commit process 100. In step 102, Node 1 generates a new data block that is populated with data. In step 104, the data is signed by the generating node (i.e., Node 1) and the signature is appended to the new data block signatures. In step 106, the data is hashed using a user-specified algorithm. In step 108, a hash of the data is signed using an encoded digital signature (e.g., Ed25519). In step 110, the encoded digital signature is appended to the new data block. In step 112, the new data block is written to a local ledger as pending. In step 114, the new data block commit is confirmed to the local ledger. In step 116, writing to the local ledger triggers an event to an event handler. In step 118, the event handler fires a signature request to a randomly selected set of peer nodes.

Figure 40:
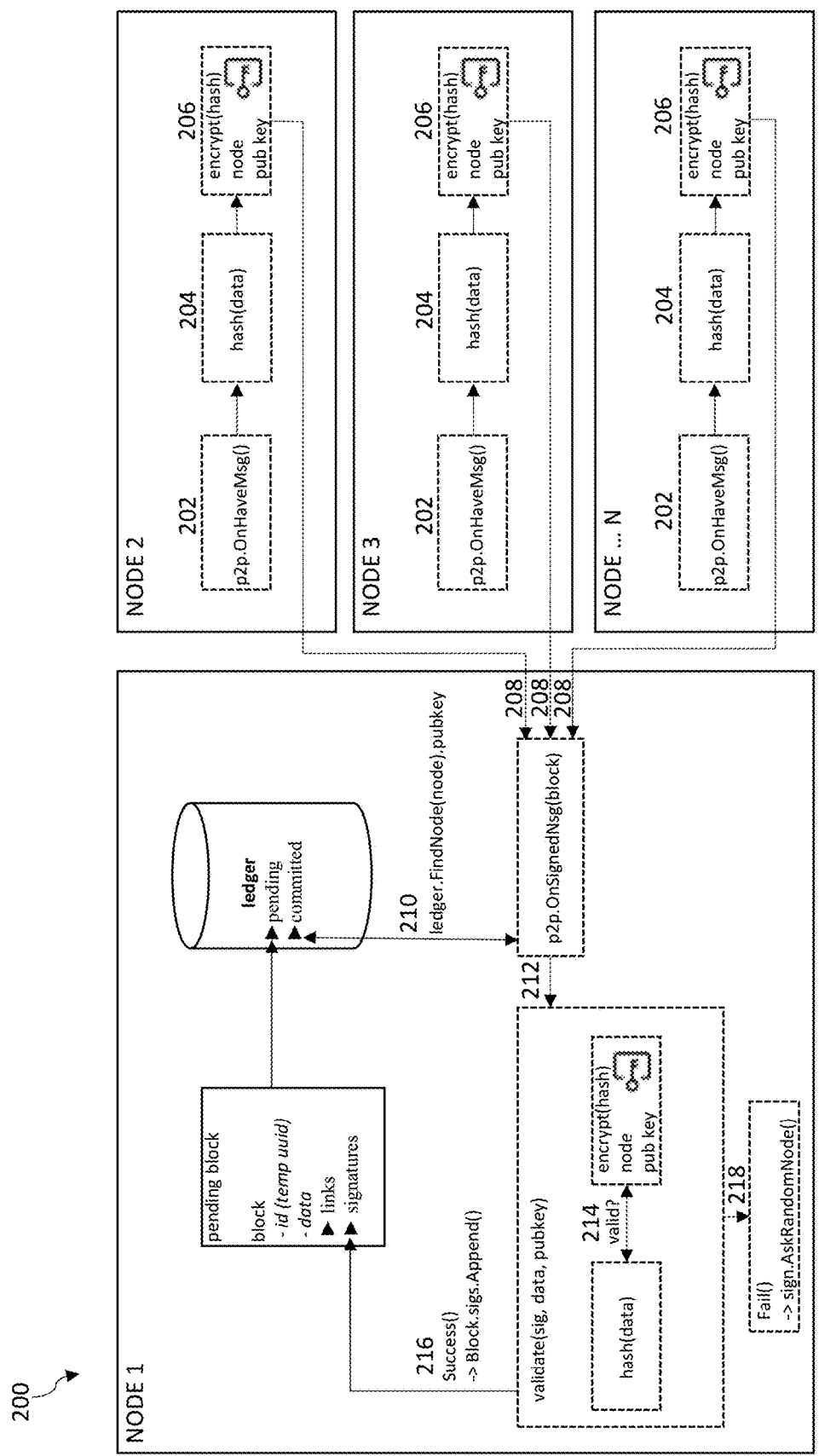
FIG. 40 illustrates one embodiment of Phase 2 of the commit process.

FIG. 40 illustrates one embodiment of Phase 2 of the commit process 200. In step 202, a node receives a signature request with a hash of the data. In step 204, the node extracts the hash from the message. In step 206, the node signs the hash using an encoded digital signature (e.g., Ed25519). Alternatively, the node encrypts the hash and encodes. In step 208, the node sends the signature to the event handler. In step 210, the event handler identifies the pending commit and the connection handler. In step 212, the event handler validates the signature using the remote node's public key. In step 214, the node attempts to validate the signature. In step 216, validation of the signature is successful and the signature is appended to the data block. In step 218, validation of the signature is not successful (i.e., fails) and Node 1 attempts to have another node sign or abandons the commit.

Figure 41:
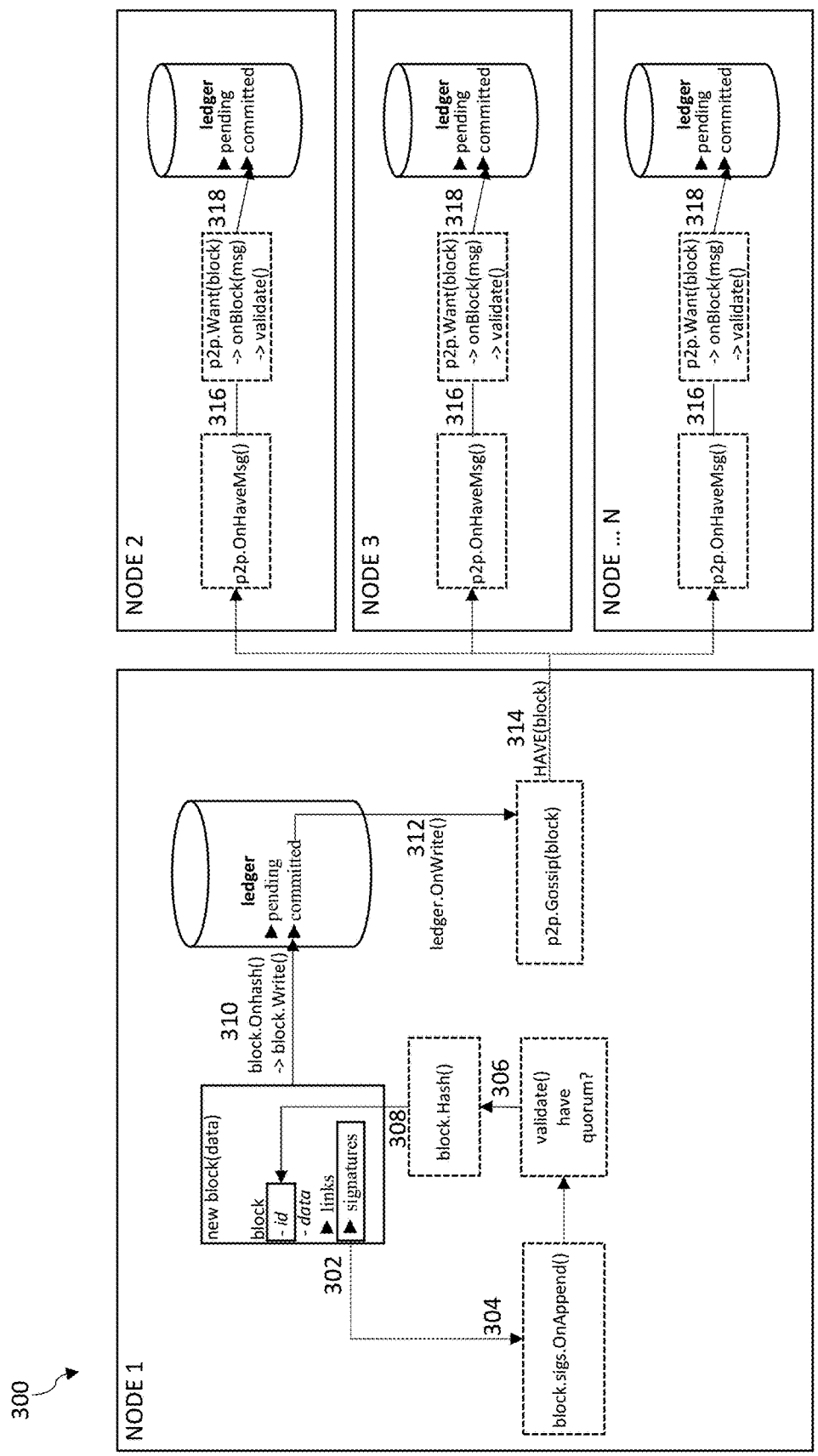
FIG. 41 illustrates one embodiment of Phase 3 of the commit process.

FIG. 41 illustrates one embodiment of Phase 3 of the commit process 300. In step 302, an append of the signatures of the block triggers an event. In step 304, the event handler is invoked. In step 306, the requestor determines if it has a quorum. The quorum is a configurable number of nodes (e.g., N nodes). In step 308, if the requestor has a quorum, it hashes the entire block to generate the block id. In step 310, the block update triggers an update event to the ledger where the block is deleted from the pending queue and added to the committed queue. In step 312, the update of the committed ledger triggers an event. In step 314, the event handler gossips the new block to adjacent nodes. In step 316, a node receives a HAVE message and replies with a WANT message with the id of the block. In step 318, the block is transmitted to the requesting node and saved to the committed ledger. This in turn triggers steps 312 and 314 on the requesting node.

The system is operable to break a large file into a plurality of blocks. In one embodiment, each block has a maximum size. In one embodiment, the maximum size is configurable. For example, a 1 MB file is broken into a plurality of 1 kB blocks. In a preferred embodiment, the plurality of blocks includes a parent block with links to all child blocks. Each child block includes an address of the parent block.

The system supports a plurality of account types including, but not limited to, administrators, developers, node operators, and/or general user. The administrators account type is operable to allow a user to perform any operation on any resource (e.g., node) within an organization. The developers account type is operable to allow a user to perform any operation on all applications within the organization. The node operators account type is operable to allow a user to perform any operation on the nodes and/or related child resources owned by the organization. The general user account type is operable to allow a user to perform function execution operations within the organization. The system is preferably operable to allow for the creation of custom user groups (e.g., by a customer). Additionally, the system is preferably operable to allow for the creation and association of custom policies and/or rules with a group (e.g., human resources allowed to access personnel files).

In one embodiment, the system requires user authentication to access data. In one embodiment, biometric data is used for user authentication, for example, facial features, fingerprints, voices, heartbeats, vein recognition, etc. In another embodiment, a password is used for user authentication. Alternatively, a radio-frequency identification (RFID) chip is read by an RFID reader connected to the system for user authentication.

Figure 42:
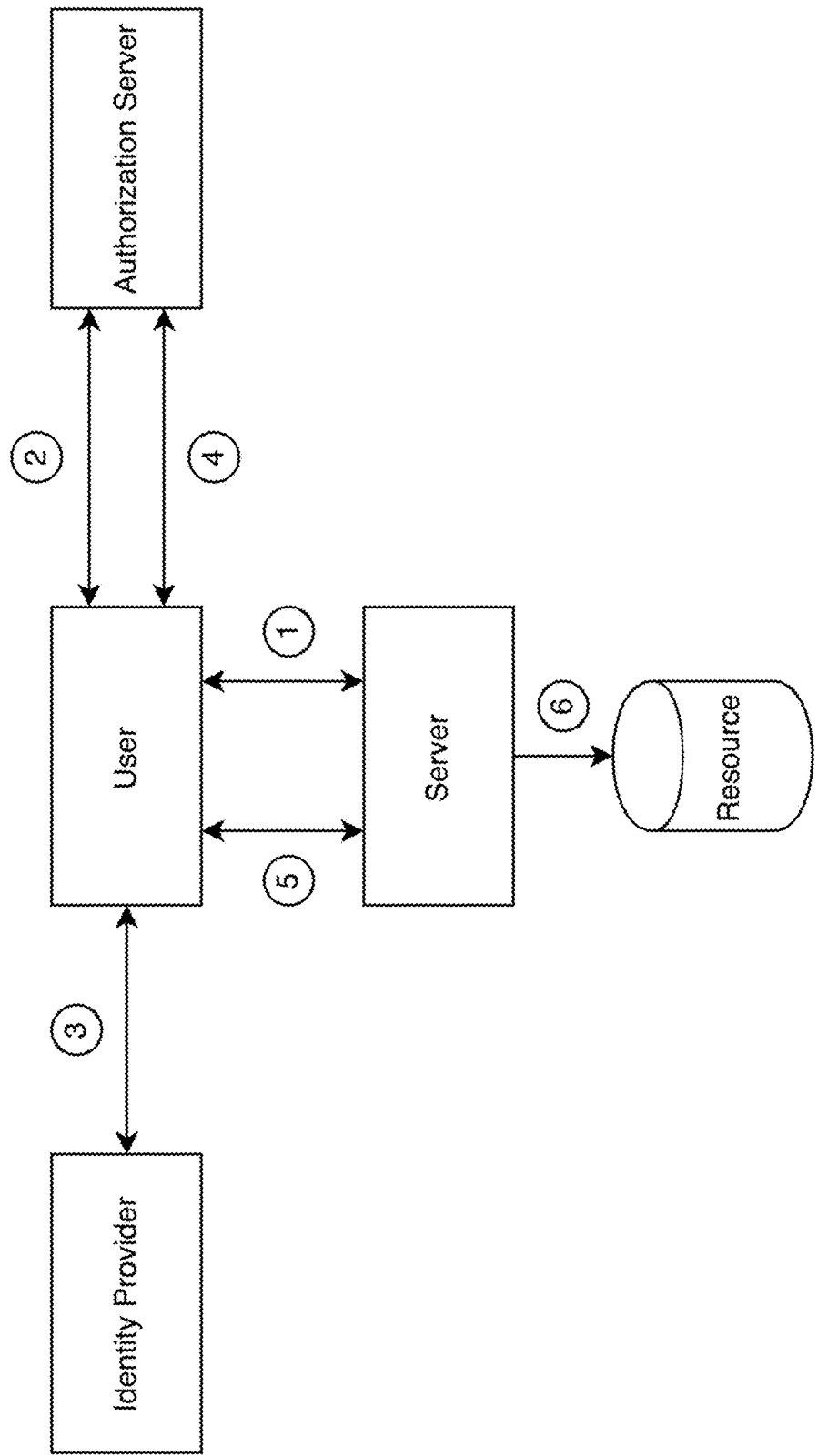
FIG. 42 illustrates one embodiment of user authentication.

FIG. 42 illustrates one embodiment of user authentication. First, a user attempts to access a resource controlled by a server. The user does not have the proper credentials to access the resource, so the server redirects the user to an authorization server. The authorization server is configured to let users log in using credentials managed by an identity provider. The user gets redirected by the authorization server to the identity's provider log-in screen. The user logs in successfully and gets redirected to the authorization server. The authorization server uses the credentials provided by the identity provider to access the credentials required by the resource server. The user gets redirected to the resource server by the authorization server. The request now has the correct credentials required to access the resource. The user gets access to the resource successfully.

Advantageously, the notarized ledger of the present invention requires a digital signature and witness nodes prior to hashing the block. This provides data integrity. A subsequent requestor of the data knows that the correct file is received because it includes the digital signature. Any modification to the data results in a new CID. It is therefore impossible to thwart the data integrity of the block because a hacker does not know which connected nodes were used to witness a block because the witness nodes are selected at random. Because of the data integrity provided by the system, it is useful in both real time scenarios and to reconstruct an event.

In one embodiment, the system monitors a plurality of metrics including, but not limited to, a number of requests handled by each service, a number of requests per minute, a request error rate, a response time latency per node, memory usage, central processing unit (CPU) usage, disk usage, disk input/output (I/O), a number of cache hits, a number of cache misses, a number of DNS requests received per second, a time taken for nearest node requests, a time taken for proxy requests, a notary request count per node, a HAVE count for each node, a WANT count for each node, a GET count for each node, a number of feeds, a number of blocks per feed, and/or feed storage. In one embodiment, an alert and/or a notification occurs when the request error rate is above an error threshold (e.g., 10%, 20%, 30%, etc.).

USE CASE #1

Figure 43:
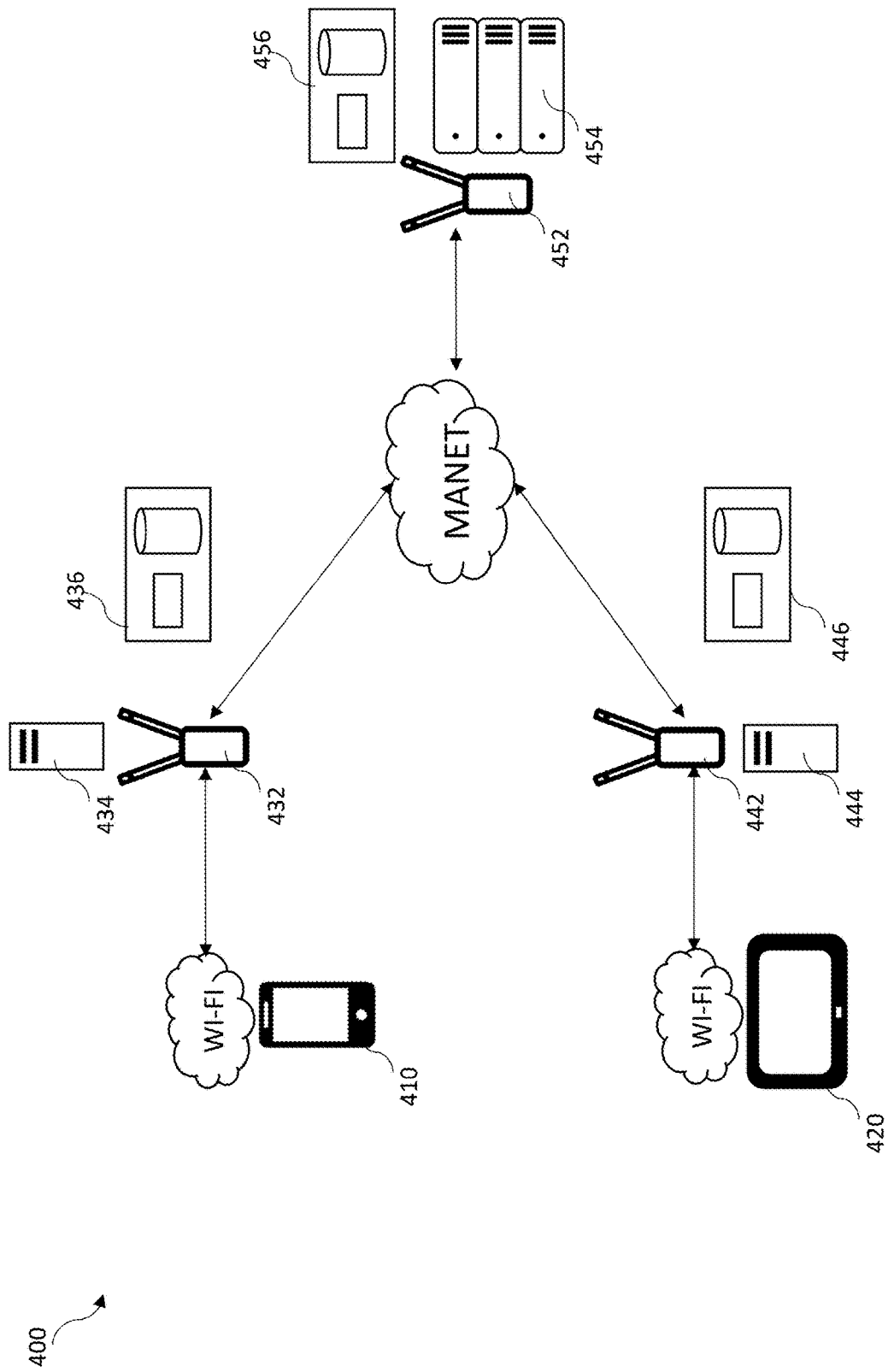
FIG. 43 illustrates an example of a mobile ad hoc network (MANET).

FIG. 43 illustrates an example of a mobile ad hoc network (MANET) 400 (e.g., used by troops). The MANET 400 includes at least one device, at least one radio, at least one computer, at least one node, and/or at least one server. In the example shown in FIG. 43, the MANET 400 includes a first device 410 (e.g., smartphone) and a second device 420 (e.g., tablet). The first device 410 is in network communication (e.g., WI-FI) with a first radio 432, a first computer 434, and/or a first node 436. The second device 420 is in network communication (e.g., WI-FI) with a second radio 442, a second computer 444, and/or a second node 446. The MANET 400 further includes a third radio 452, a server 454, and/or a third node 456. The first radio 432, the second radio 442, and the third radio 452 enable communication between the radio via the MANET 400. Although the MANET 400 is shown with three radios, three nodes, two computers, two devices, and one server, any number of radios, nodes, computers, devices, and/or servers are compatible with the present invention.

In one embodiment, one or more of the at least one computer and/or the at least one server includes an internal transceiver operable to communicate directly within the network, such that a separate radio is not required to communicate on the MANET. In a preferred embodiment, the at least one node is in wired and/or wireless communication with the at least one computer and/or the at least one server.

In a preferred embodiment, each of the at least one device is in communication with at least one sensor. In one embodiment, one or more of the at least one sensor is incorporated into the at least one device. Additionally or alternatively, one or more of the at least one sensor is in wireless and/or wired communication with the at least one device. The at least one sensor includes, but is not limited to, at least one noise sensor (e.g., a ballistic sensor), at least one range sensor, at least one elevation sensor, at least one altitude sensor, at least one camera (e.g., video, static), at least one environmental sensor (e.g., air quality, radiation, airborne chemicals, pressure, temperature, humidity, wind speed), and/or at least one physiological sensor. The at least one noise sensor is preferably operable to detect audible sound (e.g., 20 Hz-20,000 Hz) and/or inaudible sound (e.g., ultrasound). The at least one physiological sensor includes a heart rate sensor, a blood pressure sensor, a skin temperature sensor, a galvanic skin response sensor, a sweat sensor, an analyte sensor, a respiration sensor, and/or a pulse oximeter.

In one embodiment, the MANET 400 further includes at least one laser rangefinder and/or at least one ballistic solver (not shown). The at least one laser rangefinder and/or the at least one ballistic solver is operable to capture data including, but not limited to, a range of a target, an elevation, an altitude, and/or at least one environmental parameter (e.g., air quality, radiation, airborne chemicals, pressure, temperature, humidity, wind speed). Each of the at least one laser rangefinder and/or the at least one ballistic solver uses the captured data with stored ammunition data to calculate an aiming correction. The aiming correction is preferably delivered to at least one optical system (e.g., disturbed reticle of a digital optic system). The at least one optical system is preferably operable to communicate wirelessly over the MANET 400 and/or via a cabled connection (e.g., to the at least one device). The at least one laser rangefinder and/or the at least one ballistic solver is preferably operable to determine at least one location of at least one shooter. Advantageously, this system reduces operator errors and maintains situational awareness while allowing operators to keep eyes on targets and hands on weapons.

Figure 44:
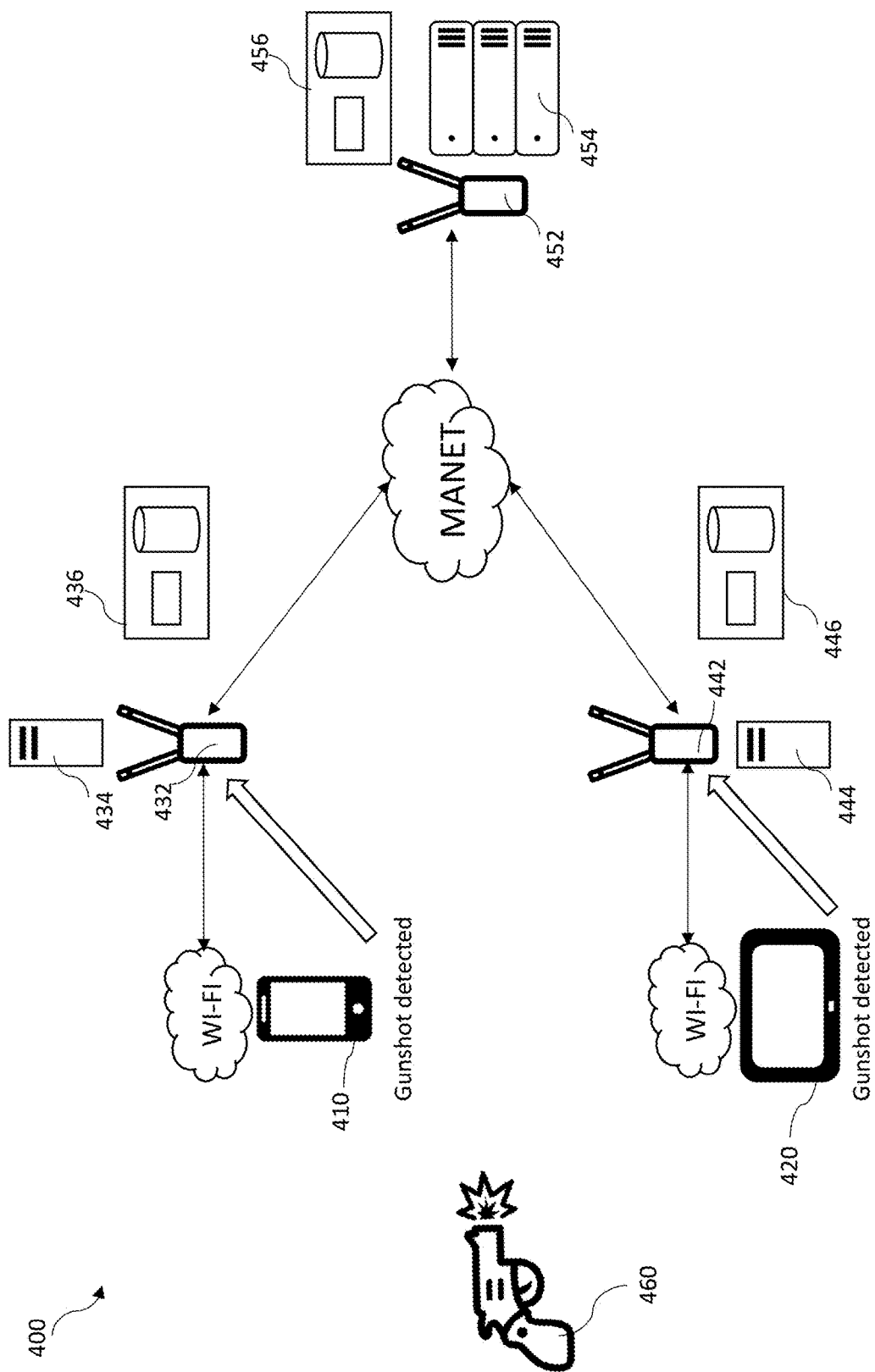
FIG. 44 illustrates the MANET of FIG. 43 with a gunshot detection scenario.

FIG. 44 illustrates the MANET 400 of FIG. 43 with a gunshot detection scenario. The first device 410 and the second device 420 detect a gunshot from a gun 460. The first device 410 sends first device data regarding the gunshot to the first radio 432, the first computer 434, and/or the first node 436. The second device 420 sends second device data regarding the gunshot to the second radio 432, the second computer 444, and/or the second node 446.

Figure 45:
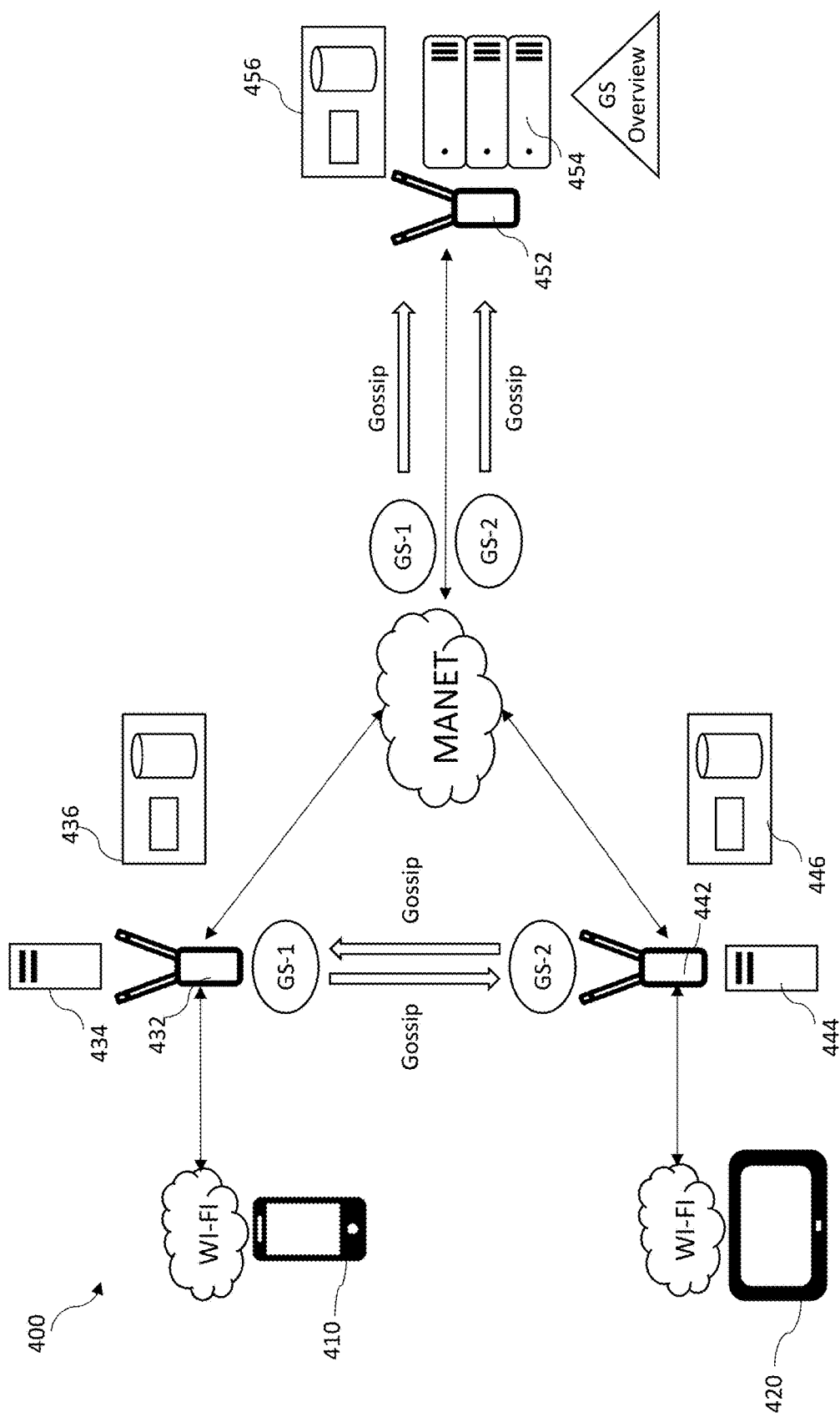
FIG. 45 continues the gunshot detection scenario of FIG. 44.

As shown in FIG. 45, the first computer 434 processes the first device data, thereby creating processed data GS-1. The second computer 444 processes the second device data, thereby creating processed data GS-2. GS-1 is stored in Node 1 436 and GS-2 is stored in Node 2 436. Node 1 436 gossips GS-1 to Node 2 446 and Node 3 456, and Node 2 446 gossips GS-2 to Node 1 436 and Node 3 456. Node 3 456 then processes GS-1 and GS-2, thereby creating GS Overview data.

Figure 46:
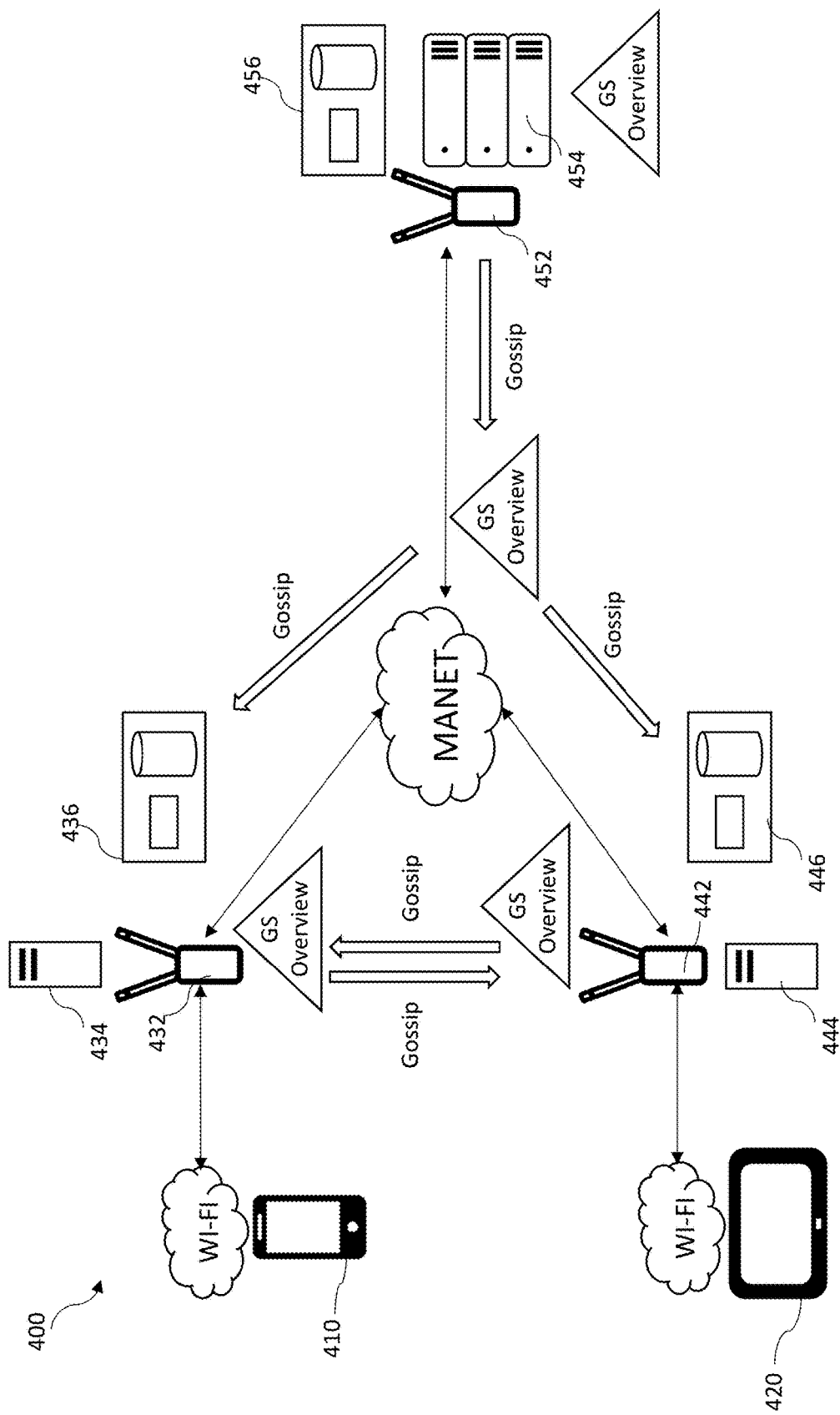
FIG. 46 continues the gunshot detection scenario of FIG. 45.

Node 3 456 then gossips the GS Overview data to Node 1 436 and Node 2 446 as shown in FIG. 46. Node 1 436 gossips the GS Overview data to Node 2 446, and Node 2 446 gossips the GS Overview data to Node 1 436. The gossip system ensures that Node 1 436, Node 2 446, and Node 3 456 each have a copy of GS-1, GS-2, and the GS Overview data. Further, this data is operable to be shared with planes, vehicles (e.g., tank, Humvee), command centers, etc. in the field.

The GS Overview data is operable to be used to determine at least one response to the gunshot. For example, the GS Overview data is transmitted to a first laser rangefinder and/or a first ballistic solver, which provides a first aiming correction for a first operator, a second laser rangefinder and/or a second ballistic solver, which provides a second aiming correction for a second operator, etc.

Advantageously, if there is an accusation that soldiers opened fire for no reason, the system is operable to reconstruct the gunshot scenario with an immutable record of all data captured by the at least one sensor, the at least one device, the at least one computer, the at least one server, and/or the at least one node. Again, because the system uses both a digital signature and witness nodes prior to hashing, data integrity is preserved.

USE CASE #2

Figure 47:
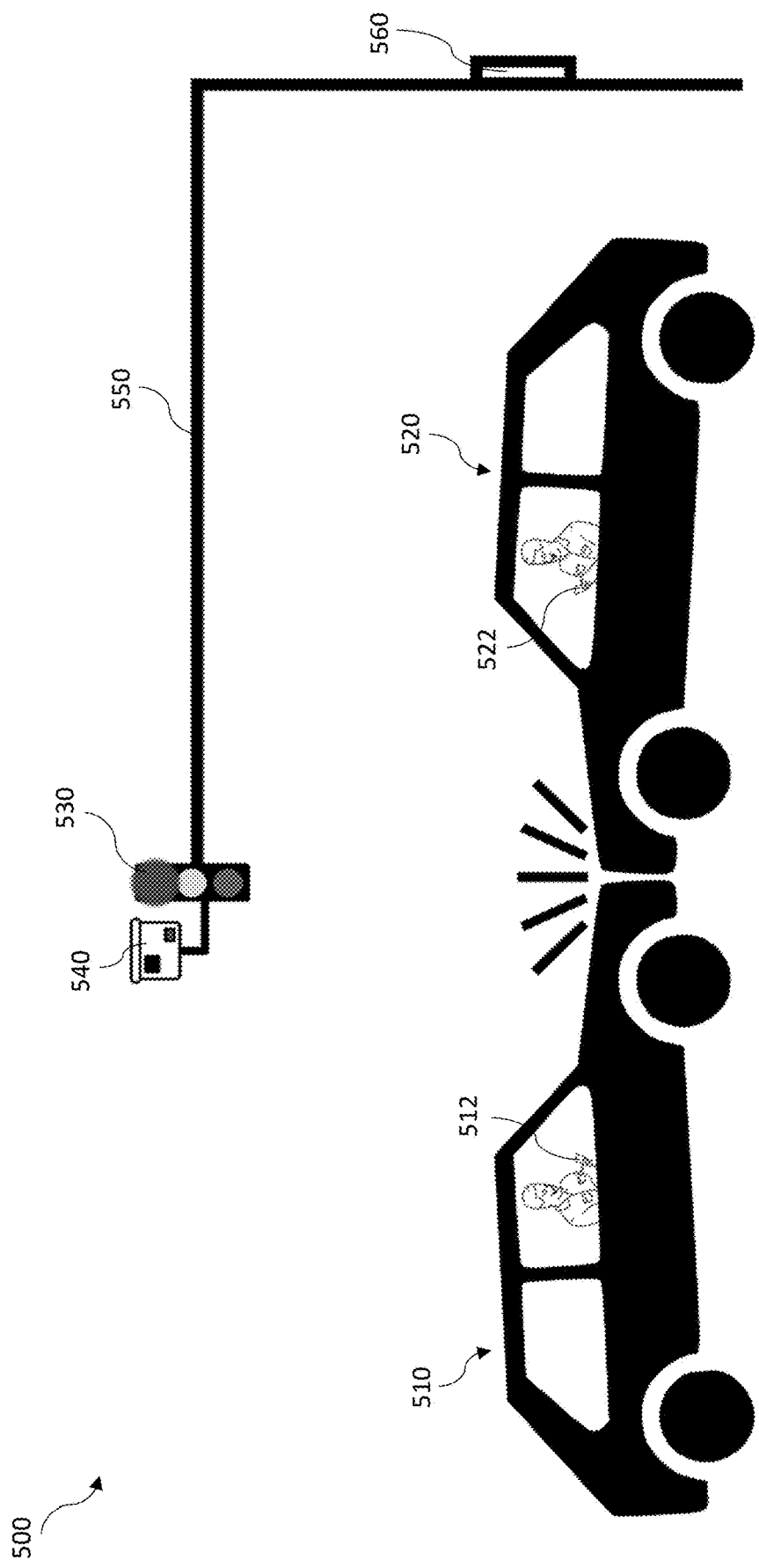
FIG. 47 illustrates an example of a car accident scene with at least one node.

FIG. 47 illustrates an example of a car accident scene 500 with at least one node 560. A first car 510 driven by a first driver 512 includes a plurality of sensors (e.g., tire sensors, temperature sensors, capacitive sensors, etc.). The first driver 512 has a first cell phone 514. In one embodiment, the first driver 512 is wearing at least one first wearable device (e.g., FITBIT, APPLE WATCH, SAMSUNG GALAXY WATCH, OURA RING) measuring at least one first biological signal (e.g., heart rate, respiratory rate, galvanic stress, sleep state). In one embodiment, at least one passenger in the first car 510 has at least one first passenger cell phone and/or at least one first passenger wearable device. A second car 520 driven by a second driver 522 includes a plurality of sensors (e.g., tire sensors, temperature sensors, capacitive sensors, etc.). The second driver 522 has a second cell phone 524. In one embodiment, the second driver 522 is wearing at least one second wearable device (e.g., FITBIT, APPLE WATCH, SAMSUNG GALAXY WATCH, OURA RING) measuring at least one second biological signal. In one embodiment, at least one passenger in the second car 520 has at least one second passenger cell phone and/or at least one second passenger wearable device.

In one embodiment, the accident scene 500 includes at least one traffic light 530 and/or at least one camera 540. In one embodiment, one or more of the at least one traffic light 530 and/or the at least one camera 540 is mounted on a traffic pole 550. In one embodiment, one or more of the at least one camera 540 is mounted in (e.g., on a dashboard) the first car 510 and/or the second car 520. Additionally or alternatively, one or more of the at least one camera 540 is mounted on a building. In the embodiment shown in FIG. 47, one of the at least one node 560 is mounted on the traffic pole. Alternatively, the at least one node 560 is mounted on a building (e.g., on a roof), in or on a light pole, or in a freestanding box.

The node 560 is operable to receive data from the plurality of sensors in the first car 510, the first cell phone 514, the at least one first wearable device, the at least one first passenger cell phone, the at least one first passenger wearable device, the plurality of sensors in the second car 520, the second cell phone 524, the at least one second wearable device, the at least one second passenger cell phone, the at least one second passenger wearable device, the at least one traffic light 530, and/or the at least one camera 540 in real time and/or in near-real time. Advantageously, the data allows the accident scene 500 to be reconstructed to determine how the accident happened. This ability to reconstruct the accident scene 500 is important as cars include more sensors and/or drive autonomously.

In one example, the content-addressable peer-to-peer storage network is used to provide security for an event (e.g., athletic event, concert, theater performance, political rally) and/or a location (e.g., power plant, data center, government facility). In another example, the content-addressable peer-to-peer storage network is used with first responders (e.g., police, firefighters, paramedics, medical personnel) responding to an emergency (e.g., accident, terrorist attack, building collapse). In yet another example, the content-addressable peer-to-peer storage network is used for disaster relief (e.g., hurricane, earthquake, etc.). In still another example, the content-addressable peer-to-peer storage network is used in a medical setting (e.g., to maintain patient records). In another example, the content-addressable peer-to-peer storage network is used in an industrial or manufacturing setting.

Figure 48:
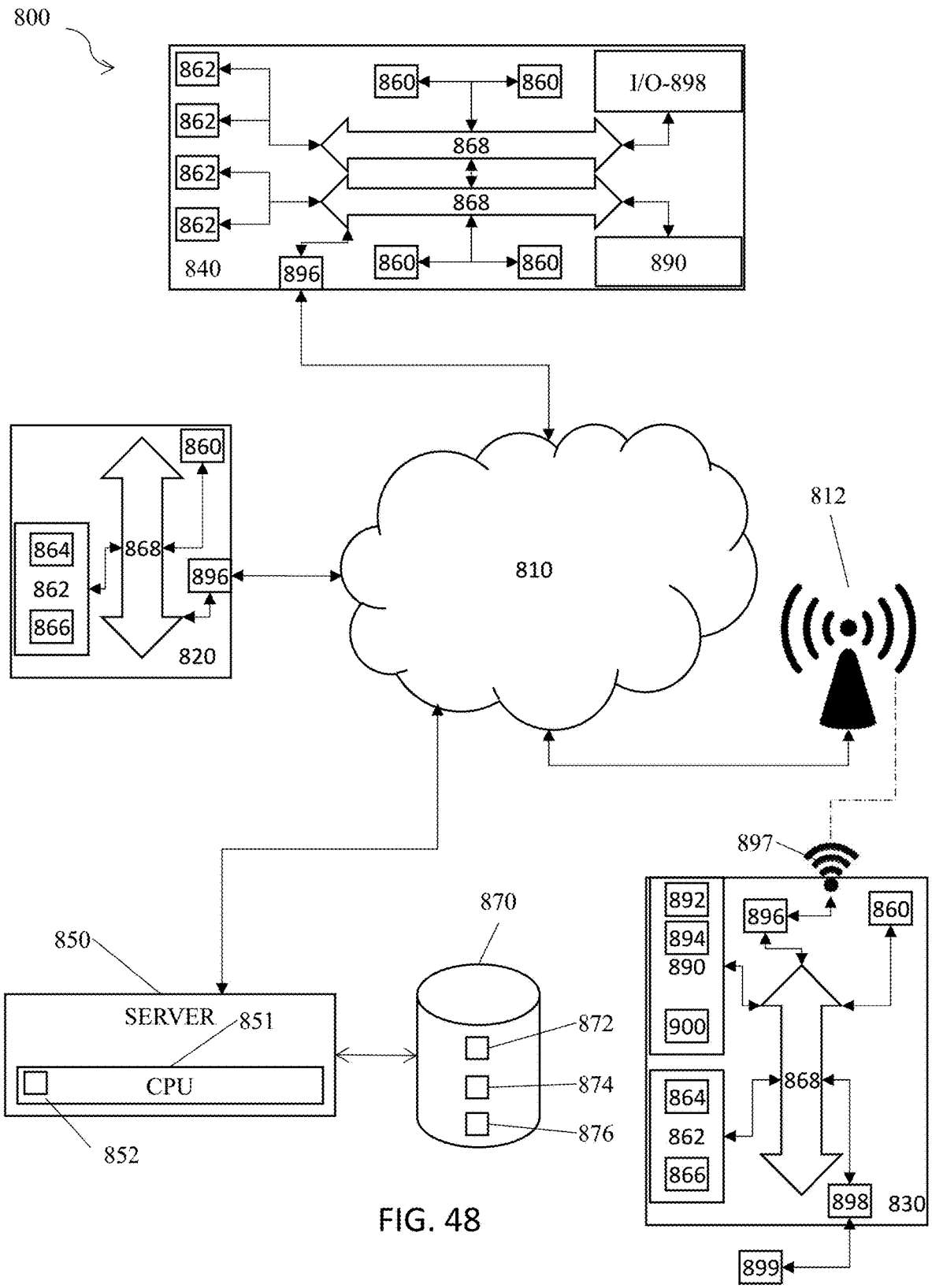
FIG. 48 is a schematic diagram of a system of the present invention.

FIG. 48 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 48, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 48, is operable to include other components that are not explicitly shown in FIG. 48, or is operable to utilize an architecture completely different than that shown in FIG. 48. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A method of retrieving data in a content-addressable peer-to-peer storage network comprising:
    providing at least one cloud platform in network communication with a plurality of server nodes, wherein information associated with each of the plurality of server nodes is stored in a node database on the at least one cloud platform;
    entering a request for a Unique Resource Identifier (URI) into a user device;
    the user device making a Domain Name System (DNS) query to the URI, wherein the URI points to at least one DNS server on one of the plurality of server nodes;
    the at least one DNS server geolocating the user device to determine a nearest node of the plurality of server nodes;
    transmitting a location of the nearest node to the user device;
    the user device connecting to the nearest node;
    the nearest node determining if the request is already in a cache on the nearest node or if the request is operable to be resolved using at least one peer node;
    the nearest node returning content related to the request to the user device;
    wherein the plurality of server nodes are zero-configuration nodes;
    wherein the content is stored on the nearest node or on the at least one peer node using an object storage architecture;
    wherein each object in the object storage architecture includes data, metadata, and a globally unique identifier; and
    wherein a cryptographic checksum of the data is used as the address for the data within the content-addressable peer-to-peer storage network.

2. The method of claim 1, wherein the request is not already in a cache and is not operable to be resolved using at least one peer node, further including fetching the content from an origin server and caching the content in the nearest node before returning the content to the user device.

3. The method of claim 1, further including the at least one DNS server traversing a DNS root feed to find a domain for the URI.

4. The method of claim 3, wherein the domain is found in the DNS root feed, further including searching a domain feed for the domain and finding a policy for the URI.

5. The method of claim 1, wherein the content is returned in near real time.

6. The method of claim 1, wherein one or more of the plurality of server nodes includes a user feed, an applications feed, an objects feed, a blocks feed, a policy feed, a proxy feed, a bucket feed, a DNS feed, a certificate feed, a files mapping feed, a bucket feed, and/or a domain configuration feed.

7. The method of claim 1, wherein the user device makes a Hypertext Transfer Protocol (HTTP) connection to the nearest node.

8. A system for retrieving data in a content-addressable peer-to-peer storage network comprising:
    at least one cloud platform in network communication with a plurality of server nodes, wherein information associated with each of the plurality of server nodes is stored in a node database on the at least one cloud platform; and
    a user device in network communication with the at least one cloud platform;
    wherein the user device is operable to receive a request for a Unique Resource Identifier (URI);
    wherein the user device is operable to make a Domain Name System (DNS) query to the URI, wherein the URI points to at least one DNS server on one of the plurality of server nodes;
    wherein the at least one DNS server is operable to geolocate the user device to determine a nearest node of the plurality of server nodes;
    wherein the at least one DNS server is operable to transmit a location of the nearest node to the user device;
    wherein the user device is operable to connect to the nearest node;
    wherein the nearest node is operable to determine if the request is already in a cache on the nearest node or if the request is operable to be resolved using at least one peer node;
    wherein the nearest node is operable to return content to the user device;
    wherein the content is stored on the nearest node or on the at least one peer node using an object storage architecture;
    wherein each object in the object storage architecture includes data, metadata, and a globally unique identifier; and
    wherein a cryptographic checksum of the data is used as the address for the data within the content-addressable peer-to-peer storage network.

9. The system of claim 8, wherein the request is not already in a cache and is not operable to be resolved using at least one peer node, and wherein the nearest node is operable to fetch the content from an origin server and cache the content before returning the content to the user device.

10. The system of claim 8, wherein the at least one DNS server is operable to traverse a DNS root feed to find a domain for the URI.

11. The system of claim 10, wherein the domain is found in the DNS root feed, and wherein the at least one DNS server is operable to search a domain feed for the domain and find a policy for the URI.

12. The system of claim 8, wherein one or more of the plurality of server nodes includes a user feed, an applications feed, an objects feed, a blocks feed, a policy feed, a proxy feed, a bucket feed, a DNS feed, a certificate feed, a files mapping feed, a bucket feed, and/or a domain configuration feed.

\* \* \* \* \*